US008882592B2

(12) United States Patent
Shikata et al.

(10) Patent No.: US 8,882,592 B2
(45) Date of Patent: Nov. 11, 2014

(54) GAME SYSTEM, GAME APPARATUS, COMPUTER-READABLE STORAGE MEDIUM HAVING STORED THEREIN GAME PROGRAM, AND GAME PROCESSING METHOD

(75) Inventors: Hiromasa Shikata, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 372 days.

(21) Appl. No.: 13/280,731

(22) Filed: Oct. 25, 2011

(65) Prior Publication Data

US 2012/0302338 A1    Nov. 29, 2012

(30) Foreign Application Priority Data

May 23, 2011  (JP) ................. 2011-115099

(51) Int. Cl.
*A63F 9/24* (2006.01)
*G06F 17/00* (2006.01)
*A63F 13/40* (2014.01)
*A63F 13/20* (2014.01)

(52) U.S. Cl.
CPC ......... *A63F 13/06* (2013.01); *A63F 2300/6676* (2013.01); *A63F 2300/105* (2013.01); *A63F 13/10* (2013.01); *A63F 2300/6045* (2013.01); *A63F 2300/1075* (2013.01)

USPC .......................................... 463/31

(58) Field of Classification Search
CPC ................................... G06F 11/3688
USPC ................ 463/2, 7, 30, 31, 36, 37
See application file for complete search history.

(56) References Cited

U.S. PATENT DOCUMENTS

| 7,347,780 B1 * | 3/2008 | Best ............................... 463/37 |
| 2002/0165028 A1 * | 11/2002 | Miyamoto et al. .............. 463/46 |
| 2010/0009754 A1 * | 1/2010 | Shimamura et al. ............ 463/37 |

FOREIGN PATENT DOCUMENTS

JP    2010-17389    1/2010

* cited by examiner

*Primary Examiner* — Paul A D'Agostino
(74) *Attorney, Agent, or Firm* — Nixon & Vanderhye, P.C.

(57) ABSTRACT

An example game apparatus calculates the attitude of a terminal device on the basis of a value of a gyro sensor of the terminal device. The game apparatus sets the position of an aim in a game image on the basis of the calculated attitude of the terminal device, and also sets the attitude of a virtual camera. The game apparatus sets the firing direction of an arrow on the basis of the position of the aim, and causes the arrow to be fired in the firing direction in accordance with the cessation of a touch operation on a touch panel of the terminal device.

40 Claims, 25 Drawing Sheets

GAME SYSTEM, GAME APPARATUS, COMPUTER-READABLE STORAGE MEDIUM HAVING STORED THEREIN GAME PROGRAM, AND GAME PROCESSING METHOD

CROSS REFERENCE TO RELATED APPLICATION

The disclosure of Japanese Patent Application No. 2011-115099, filed on May 23, 2011, is incorporated herein by reference.

FIELD

The exemplary embodiments described herein relate to a computer-readable storage medium having stored therein a game program that performs game processing corresponding to the attitude of an operation device, a game system, a game apparatus, and a game processing method that perform game processing corresponding to the attitude of an operation device.

BACKGROUND AND SUMMARY

Conventionally, there is a game apparatus that detects the attitude of a controller by a gyro sensor, sets the moving direction of a moving object in a game space on the basis of the attitude of the controller, and causes the moving object to move in the moving direction.

Such a game apparatus, however, sets the moving direction of the moving object on the basis of the attitude of the controller, and also fires the moving object in the game space by performing a button operation. Thus, there is room for improvement in the variety of operations performed by a player, and the variety in games.

Therefore, it is a feature of the exemplary embodiments to provide a computer-readable storage medium having stored therein a game program in which the variety of operations performed on an operation device and the variety in games are improved, a game system, a game apparatus, and a game processing method in which the variety of operations performed on an operation device and the variety in games are improved.

The inventors have provided a game system and the like that employ the following configurations, which are non-limiting examples.

As an example, there is provided a game system including a game apparatus and an operation device having an input surface. The operation device includes attitude data output means, touch data output means, and operation data transmission means. The attitude data output means outputs attitude data that changes in accordance with a change in an attitude of the operation device. The touch data output means outputs touch data representing a touch position at which a player performs a touch operation on the input surface. The operation data transmission means transmits the touch data and the attitude data to the game apparatus.

The game apparatus includes first reception means, attitude acquisition means, game processing means, first image generation means, and first image output means. The first reception means receives the touch data and the attitude data. The attitude acquisition means acquires the attitude of the operation device on the basis of the attitude data. The game processing means calculates a control direction in a game space on the basis of the attitude of the operation device, and performs, on the basis of the touch data, game processing based on the control direction. The first image generation means generates a first game image by capturing the game space with a first virtual camera set in the game space. The first image output means outputs the first game image to a first display device different from the operation device.

It should be noted that the attitude data output means may be an inertial sensor that detects a motion, such as a gyro sensor, an angular velocity sensor, or the like that detects the attitude of the operation device. Further, the attitude data output means may be a magnetic sensor that detects an orientation, or may be a capturing section that captures a predetermined capturing target (markers described later or the like). The attitude data output means may be a combination of these components. That is, the attitude data output from the attitude data output means may be data concerning a physical amount output from an inertial sensor, data concerning an orientation output from a magnetic sensor, image data output from a capturing section, data including the above data, or the like. Further, for example, the control direction may be the moving direction of a predetermined object, the capturing direction of the first virtual camera, the direction to which the moving direction of an object is changed, or the like. Furthermore, the game apparatus may be a versatile information processing apparatus such as a personal computer.

With the above configuration, it is possible to calculate the control direction in the game space on the basis of the attitude of the operation device, and perform game processing corresponding to the control direction on the basis of the touch data. For example, when the moving direction of a predetermined object is calculated as the control direction, it is possible to cause the predetermined object to move in its moving direction in accordance with the attitude of the operation device. Further, for example, when the capturing direction of the first virtual camera is calculated as the control direction, the execution of game processing corresponding to the capturing direction causes an image of the game space to be displayed on the first display device in accordance with the attitude of the operation device. The use of the touch data enables a greater variety of operations than a button operation.

In addition, in another configuration, the game processing means may include object control means for setting a moving direction of a predetermined object in the game space on the basis of the control direction.

With the above configuration, it is possible to set the moving direction of the predetermined object in the game space on the basis of the attitude of the operation device.

In addition, in another configuration, the object control means may cause the predetermined object to move on the basis of the touch data.

With the above configuration, it is possible to cause the predetermined object to move on the basis of the touch data. For example, when a touch-on operation has been detected, or when a touch-off operation has been detected, it is possible to cause the predetermined object to move.

In addition, in another configuration, the object control means may determine, on the basis of the touch data, whether or not the touch operation on the input surface has been ceased, and may cause the predetermined object to move in accordance with the cessation of the touch operation.

With the above configuration, when the state where the touch operation is performed on the input surface has made the transition to the state where the touch operation is not performed on the input surface, it is possible to cause the predetermined object to move.

In addition, in another configuration, the object control means may control an attitude of the predetermined object in accordance with the attitude of the operation device.

With the above configuration, it is possible to control the attitude of the predetermined object in accordance with the attitude of the operation device.

In addition, in another configuration, the game processing means may include first virtual camera setting means for setting an attitude of the first virtual camera on the basis of the attitude of the operation device.

With the above configuration, it is possible to set the attitude of the first virtual camera on the basis of the attitude of the operation device, and change, in accordance with the attitude of the operation device, the first game image to be displayed on the first display device.

In addition, in another configuration, the first virtual camera setting means may perform zooming in or zooming out on the game space by changing a setting of the first virtual camera on the basis of the touch data.

With the above configuration, it is possible to perform zooming in or zooming out on the game space in accordance with the touch operation performed on the input surface. For example, it is possible to display the game space in an enlarged or reduced manner by changing the zoom setting of the first virtual camera, or causing the first virtual camera to move in the capturing direction.

In addition, in another configuration, the first virtual camera setting means may determine, on the basis of the touch data, whether or not a slide operation has been performed on the input surface, and, when the slide operation has been performed, may change the setting of the first virtual camera.

With the above configuration, it is possible to change the setting of the first virtual camera in accordance with the slide operation performed on the input surface. This makes it possible to perform zooming in or zooming out on the game space in accordance with the slide operation.

In addition, in another configuration, the first virtual camera setting means may set the attitude of the first virtual camera such that an amount of change in the attitude of the first virtual camera is greater than an amount of change in the attitude of the operation device.

With the above configuration, it is possible to make the amount of change in the attitude of the first virtual camera greater than the amount of change in the attitude of the operation device. This makes it possible that when, for example, the attitude of the operation device has been changed by a predetermined angle, the first virtual camera is rotated by an angle greater than the predetermined angle.

In addition, in another configuration, the game processing means may include aim position setting means for setting a position of an aim object in the first game image on the basis of the attitude of the operation device. In this case, the object control means controls the moving direction of the predetermined object on the basis of the position of the aim object.

With the above configuration, it is possible to set the position of the aim object on the basis of the attitude of the operation device, and control the moving direction of the predetermined object on the basis of the position of the aim object.

In addition, in another configuration, the aim position setting means may set the position of the aim object in a predetermined range in accordance with the attitude of the operation device, and, when the position of the aim object is out of the predetermined range, may set the position of the aim object at a boundary of the predetermined range.

With the above configuration, it is possible to set the aim object in the predetermined range in accordance with the attitude of the operation device. This makes it possible, for example, to prevent the player from changing the attitude of the operation device more significantly than the case where the aim object is always displayed at the center of the first game image.

In addition, in another configuration, the aim position setting means may define the attitude of the operation device as a reference attitude when a predetermined portion of the operation device is directed to a screen of the first display device, and, when the operation device is in the reference attitude, may set the position of the aim object to a predetermined position in the first game image. Further, when the operation device is in an attitude different from the reference attitude, the aim position setting means may set the position of the aim object to a position shifted from the predetermined position in the first game image, in accordance with an amount of change in the attitude of the operation device from the reference attitude.

With the above configuration, the player can change the position of the aim object from the predetermined position (e.g., the center of the first game image) by changing the attitude of the operation device from the reference attitude.

In addition, in another configuration, the game processing means may include aim position setting means for setting a position of an aim object in the first game image on the basis of the attitude of the operation device. In this case, the first virtual camera setting means sets a capturing direction of the first virtual camera on the basis of the position of the aim object.

With the above configuration, it is possible to calculate the position of the aim object on the basis of the attitude of the operation device, and also set the capturing direction of the first virtual camera on the basis of the position of the aim object.

In addition, in another configuration, the first virtual camera setting means may set, as a capturing direction of the first virtual camera, a direction from a position of the first virtual camera to a position located in the game space in a direction determined by a predetermined method, and also to a position corresponding to the position of the aim object.

With the above configuration, it is possible to set, as the capturing direction of the first virtual camera, the direction from the position of the first virtual camera to a position corresponding to the position of the aim object. The position corresponding to the position of the aim object is the position located in the direction, determined by the predetermined method, from the position of the first virtual camera. The direction determined by the predetermined method may be, for example, the facing direction of the player character, may be the direction determined by a predetermined algorithm, or may be the direction determined by the operation performed by the player.

In addition, in another configuration, the game apparatus may further include second image output means for outputting to the operation device a second game image different from the first game image. Further, the operation device may further include second reception means and display processing means. The second reception means receives the second game image from the game apparatus. The display processing means causes the second game image to be displayed on a second display device provided in the operation device.

With the above configuration, the second display device is provided in the operation device. This makes it possible to cause the second game image to be displayed on the second display device.

In addition, in another configuration, the game apparatus may further include second image generation means for generating the second game image by capturing the game space with a second virtual camera set in the game space.

With the above configuration, the second game image captured by the second virtual camera set in the game space can be displayed on the second display device. Further, the second game image is generated by the game apparatus, and is transmitted to the operation device. This makes it possible to manage the game space and generate the game image in a collective manner in the game apparatus.

In addition, in another configuration, the game apparatus may further include second virtual camera setting means for setting an attitude of the second virtual camera in accordance with the attitude of the operation device.

With the above configuration, it is possible to set the attitude of the second virtual camera in accordance with the attitude of the operation device. This allows the player to change the second game image displayed on the second display device, by changing the attitude of the operation device.

In addition, in another configuration, the touch data output means may be a touch panel provided on a screen of the second display device.

With the above configuration, it is possible to use the touch panel as a device that detects the touch position at which the player performs the touch operation on the input surface.

In addition, in another configuration, the attitude data output means may be an inertial sensor.

With the above configuration, it is possible to use at least either one of an acceleration sensor and an angular velocity sensor as the attitude data output means.

It should be noted that another example may be a game apparatus included in the game system. Yet another example may be a computer-readable storage medium having stored therein a game program that causes a computer of a game apparatus (including an information processing apparatus) to function as the means described above. Yet another example may be a game processing method performed by the game apparatus or in the game system.

It should be noted that when used in the present specification, the term "computer-readable storage medium" refers to a given device or medium capable of storing a program, code, and/or data to be used in a computer system. The computer-readable storage medium may be volatile or nonvolatile so long as it can be read in the computer system. Examples of the computer-readable storage medium include, but are not limited to, magnetic tapes, Hard Disk Drives (HDD), Compact Discs (CD), Digital Versatile Discs (DVD), Blu-ray Discs (BD), and semiconductor memories.

Based on the exemplary embodiments described above, it is possible to perform game processing in accordance with various operations performed on an operation device, and provide an interesting game.

These and other objects, features, aspects and advantages will become more apparent from the following detailed description of non-limiting example embodiments when taken in conjunction with the accompanying drawings.

DETAILED DESCRIPTION OF NON-LIMITING EXAMPLE EMBODIMENTS

[1. Overall Configuration of Game System]

Figure 1:
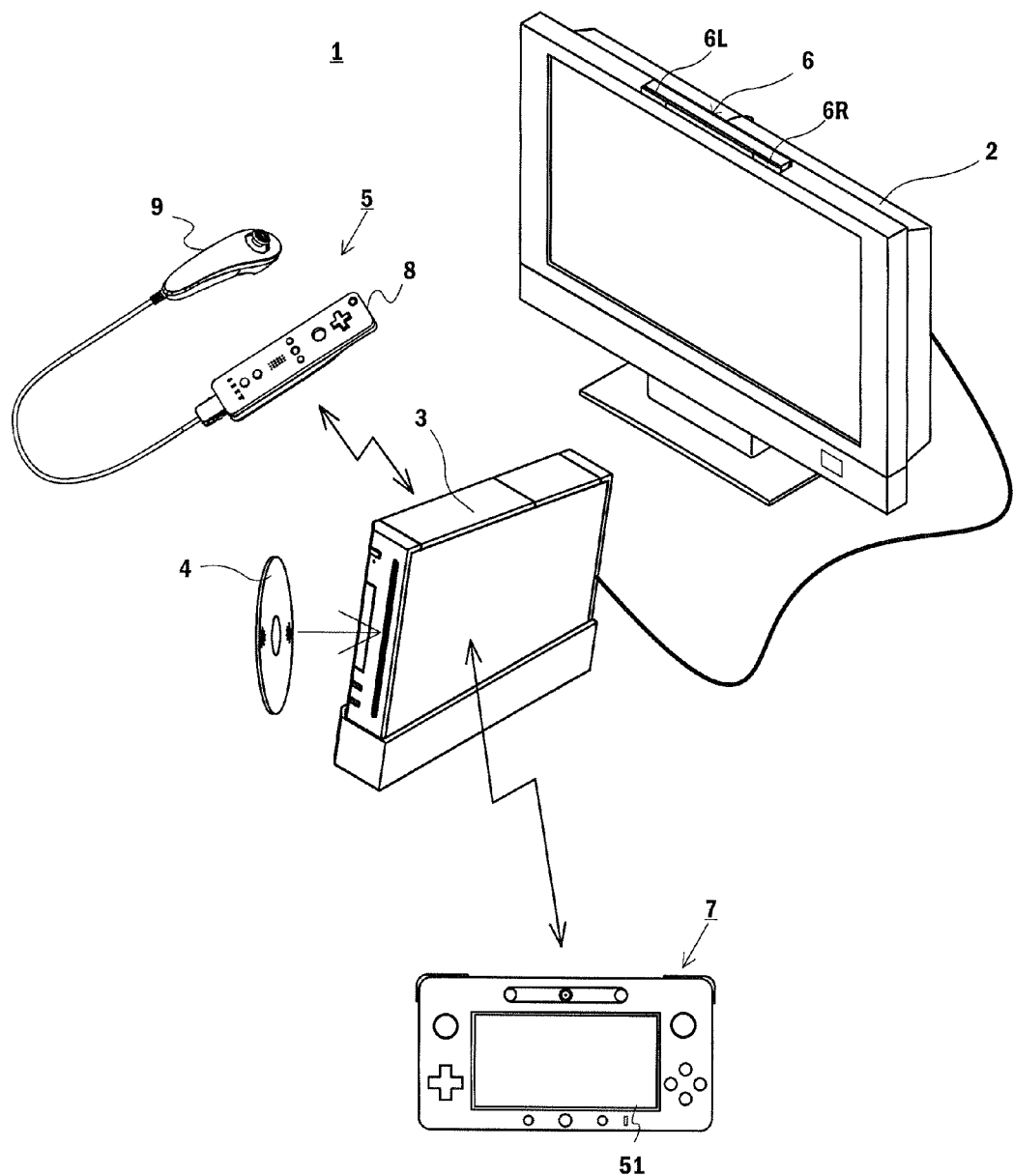
FIG. 1 is an external view showing a non-limiting example of a game system 1.

With reference to the drawings, a description is given of a game system 1 according to an exemplary embodiment. FIG. 1 is an external view showing a non-limiting example of the game system 1. Referring to FIG. 1, the game system 1 includes a stationary display device (hereinafter referred to as a "television") 2 typified by, for example, a television receiver, a stationary game apparatus 3, an optical disk 4, a controller 5, a marker device 6, and a terminal device 7. In the game system 1, the game apparatus 3 performs game processing on the basis of a game operation performed using the controller 5, and a game image obtained by the game processing is displayed on the television 2 and/or the terminal device 7.

The optical disk 4 is detachably inserted into the game apparatus 3, the optical disk 4 being an example of an information storage medium exchangeably used for the game apparatus 3. The optical disk 4 has stored therein an information processing program (typically, a game program) to be executed by the game apparatus 3. On the front surface of the game apparatus 3, an insertion opening for the optical disk 4 is provided. The game apparatus 3 reads and executes the information processing program stored in the optical disk 4 inserted in the insertion opening, and thereby performs the game processing.

Figure 2:
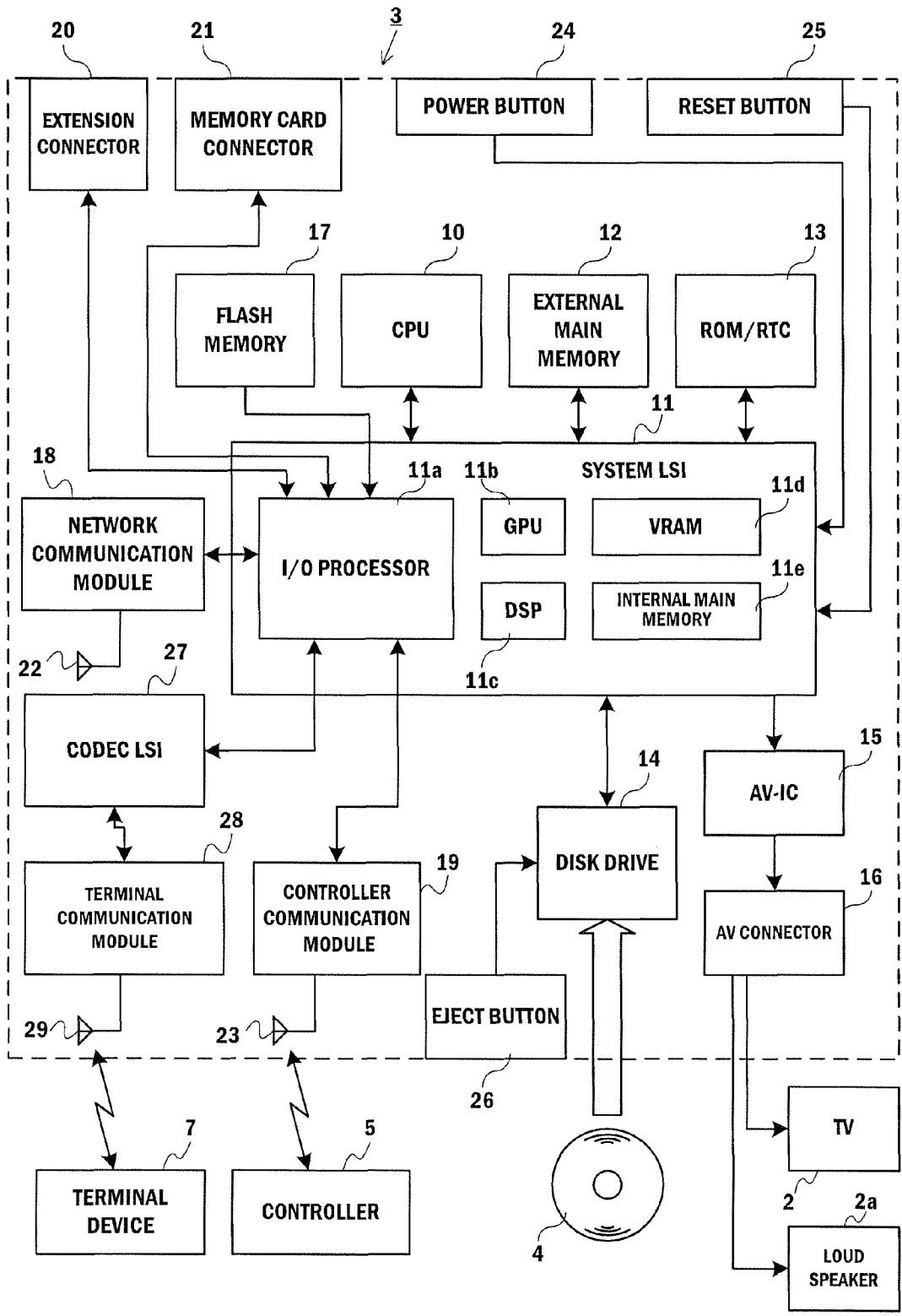
FIG. 2 is block diagram showing the internal configuration of a non-limiting example of a game apparatus 3.

The game apparatus 3 is connected to the television 2 via a connection cord. The television 2 displays the game image obtained by the game processing performed by the game apparatus 3. The television 2 has a loudspeaker 2a (FIG. 2). The loudspeaker 2a outputs a game sound obtained as a result of the game processing. It should be noted that in another embodiment, the game apparatus 3 and the stationary display device may be integrated together. Further, the communication between the game apparatus 3 and the television 2 may be wireless communication.

In the periphery of the screen of the television 2 (above the screen in FIG. 1), the marker device 6 is installed. Although described in detail later, a user (player) can perform a game operation of moving the controller 5. The marker device 6 is used by the game apparatus 3 to calculate the motion, the position, the attitude, and the like of the controller 5. The marker device 6 includes two markers 6R and 6L at its two ends. The marker 6R (the same applies to the marker 6L) is composed of one or more infrared LEDs (Light Emitting Diodes), and outputs infrared light forward from the television 2. The marker device 6 is connected to the game apparatus 3 in a wireless (or wired) manner. This enables the game apparatus 3 to control each of the infrared LEDs included in the marker device 6 to be lit on or off. It should be noted that the marker device 6 is portable, which allows the user to install the marker device 6 at a given position. FIG. 1 shows the form where the marker device 6 is installed on the television 2. The installation position and the facing direction of the marker device 6, however, are a given position and a given direction.

The controller 5 provides the game apparatus 3 with operation data based on the operation performed on the controller 5 itself. In the present embodiment, the controller 5 has a main controller 8 and a sub-controller 9, and the sub-controller 9 is detachably attached to the main controller 8. The controller 5 and the game apparatus 3 are capable of communicating with each other by wireless communication. In the present embodiment, the wireless communication between the controller 5 and the game apparatus 3 uses, for example, the Bluetooth (registered trademark) technology. It should be noted that in another embodiment, the controller 5 and the game apparatus 3 may be connected together in a wired manner. Further, in FIG. 1, the game system 1 includes one controller 5; however, the game system 1 may include a plurality of controllers 5. That is, the game apparatus 3 is capable of communicating with a plurality of controllers, and therefore, the simultaneous use of a predetermined number of controllers allows a plurality of people to play a game. A detailed configuration of the controller 5 will be described later.

The terminal device 7 is small enough to be held by a user. This allows the user to use the terminal device 7 by moving the terminal device 7 while holding it, or placing the terminal device 7 at a given position. Although a detailed configuration will be described later, the terminal device 7 includes an LCD (Liquid Crystal Display) 51, which serves as display means, and input means (a touch panel 52, a gyro sensor 64, and the like described later). The terminal device 7 and the game apparatus 3 are capable of communicating with each other in a wireless (or wired) manner. The terminal device 7 receives, from the game apparatus 3, data of an image (e.g., a game image) generated by the game apparatus 3, and displays the image on the LCD 51. It should be noted that in the present embodiment, an LCD is employed as a display device. Alternatively, the terminal device 7 may have another given display device such as a display device using EL (electroluminescence), for example. Further, the terminal device 7 transmits, to the game apparatus 3, operation data based on the operation performed on the terminal device 7 itself.

[2. Internal Configuration of Game Apparatus 3]

Next, with reference to FIG. 2, the internal configuration of the game apparatus 3 is described. FIG. 2 is a block diagram showing the internal configuration of a non-limiting example of the game apparatus 3. The game apparatus 3 includes a CPU (Central Processing Unit) 10, a system LSI 11, an external main memory 12, a ROM/RTC 13, a disk drive 14, an AV-IC 15, and the like.

The CPU 10 performs the game processing by executing the game program stored in the optical disk 4, and functions as a game processor. The CPU 10 is connected to the system LSI 11. The system LSI 11 is connected to, as well as the CPU 10, the external main memory 12, the ROM/RTC 13, the disk drive 14, and the AV-IC 15. The system LSI 11, for example, controls data transfer between the components connected thereto, generates images to be displayed, and obtains data from external devices. It should be noted that the internal configuration of the system LSI 11 will be described later. The volatile-type external main memory 12 stores a program, such as the game program read from the optical disk 4 or the game program read from a flash memory 17, and various other data. The external main memory 12 is used as a work area or a buffer area of the CPU 10. The ROM/RTC 13 has a ROM (a so-called boot ROM) having incorporated therein a program for starting up the game apparatus 3, and also has a clock circuit (RTC: Real Time Clock) for counting time. The disk drive 14 reads program data, texture data, and the like from the optical disk 4, and writes the read data into an internal main memory 11e described later or the external main memory 12.

The system LSI 11 includes an input/output processor (I/O processor) 11a, a GPU (Graphics Processor Unit) 11b, a DSP (Digital Signal Processor) 11c, a VRAM (Video RAM) 11d, and an internal main memory 11e. Although not shown in the figures, the components 11a through 11e are connected together via an internal bus.

The GPU 11b forms a part of drawing means, and generates an image in accordance with a graphics command (a command to draw an image) from the CPU 10. The VRAM 11d stores data (such as polygon data and texture data) that is necessary for the GPU 11b to execute the graphics command. When the image is generated, the GPU 11b uses the data stored in the VRAM 11d to generate image data. It should be noted that in the present embodiment, the game apparatus 3 generates both a game image to be displayed on the television 2 and a game image to be displayed on the terminal device 7. Hereinafter, occasionally, the game image to be displayed on the television 2 is referred to as a "television game image", and the game image to be displayed on the terminal device 7 is referred to as a "terminal game image".

The DSP 11c functions as an audio processor, and generates audio data using sound data and acoustic waveform (timbre) data that are stored in the internal main memory 11e or the external main memory 12. It should be noted that in the present embodiment, a game sound is generated in a similar manner to a game image, that is, both a game sound to be output from the loudspeaker of the television 2 and a game sound to be output from the loudspeakers of the terminal device 7 are generated. Hereinafter, occasionally, the game sound to be output from the television 2 is referred to as a "television game sound", and the game sound to be output from the terminal device 7 is referred to as a "terminal game sound".

Data of, among images and sounds generated by the game apparatus 3 as described above, an image and a sound to be output from the television 2 is read by the AV-IC 15. The AV-IC 15 outputs the read data of the image to the television 2 through an AV connector 16, and also outputs the read data of the sound to the loudspeaker 2a built into the television 2. This causes the image to be displayed on the television 2, and also causes the sound to be output from the loudspeaker 2a.

In addition, data of, among images and sounds generated by the game apparatus 3, an image and a sound to be output from the terminal device 7 is transmitted to the terminal device 7 by the input/output processor 11a or the like. The transmission of the data to the terminal device 7 by the input/output processor 11a or the like will be described later.

The input/output processor 11a transmits and receives data to and from the components connected thereto, or downloads data from external devices. The input/output processor 11a is connected to the flash memory 17, a network communication module 18, a controller communication module 19, an extension connector 20, a memory card connector 21, and a codec LSI 27. The network communication module 18 is connected to an antenna 22. The controller communication module 19 is connected to an antenna 23. The codec LSI 27 is connected to a terminal communication module 28. The terminal communication module 28 is connected to an antenna 29.

The game apparatus 3 is connected to a network such as the Internet, and is thereby capable of communicating with external information processing apparatuses (e.g., other game apparatuses, various servers, and various information processing apparatuses). That is, the input/output processor 11a is connected to a network such as the Internet via the network communication module 18 and the antenna 22, and is thereby capable of communicating with external information processing apparatuses also connected to the network. The input/output processor 11a periodically accesses the flash memory 17, and detects the presence or absence of data that needs to be transmitted to the network. When such data is present, the input/output processor 11a transmits the data to the network through the network communication module 18 and the antenna 22. The input/output processor 11a also receives data transmitted from an external information processing apparatus or data downloaded from a download server, through the network, the antenna 22, and the network communication module 18, and stores the received data in the flash memory 17. The CPU 10 executes the game program to thereby read the data stored in the flash memory 17 and use the read data for the game program. The flash memory 17 may have stored therein data (data stored after or during the game) saved as a result of playing the game using the game apparatus 3, as well as data to be transmitted to, or data received from, an external information processing apparatus. Further, the flash memory 17 may have stored therein the game program.

In addition, the game apparatus 3 can receive operation data from the controller 5. That is, the input/output processor 11a receives operation data transmitted from the controller 5 through the antenna 23 and the controller communication module 19, and stores (temporarily stores) the operation data in a buffer area of the internal main memory 11e or the external main memory 12.

In addition, the game apparatus 3 can transmit and receive data of an image, a sound, and the like to and from the terminal device 7. When transmitting a game image (terminal game image) to the terminal device 7, the input/output processor 11a outputs data of the game image generated by the GPU 11b to the codec LSI 27. The codec LSI 27 performs a predetermined compression process on the image data from the input/output processor 11a. The terminal communication module 28 wirelessly communicates with the terminal device 7. Accordingly, the image data compressed by the codec LSI 27 is transmitted from the terminal communication module 28 to the terminal device 7 through the antenna 29. It should be noted that in the present embodiment, the image data transmitted from the game apparatus 3 to the terminal device 7 is used in the game. Therefore, in the game, a delay in the display of the image adversely affects the operability of the game. Thus, it is preferable that a delay in the transmission of the image data from the game apparatus 3 to the terminal device 7 should be prevented as far as possible. Accordingly, in the present embodiment, the codec LSI 27 compresses the image data using a highly efficient compression technique such as the H.264 standard. It should be noted that another compression technique may be used, or the image data may be transmitted without being compressed if the communication speed is fast enough. Further, the terminal communication module 28 may be, for example, a Wi-Fi-certified communication module and may wirelessly communicate with the terminal device 7 at a high speed, using, for example, MIMO (Multiple Input Multiple Output) technology employed based on the IEEE 802.11n standard, or may use another communication method.

In addition, the game apparatus 3 transmits, as well as the image data, audio data to the terminal device 7. That is, the input/output processor 11a outputs audio data generated by the DSP 11c to the terminal communication module 28 through the codec LSI 27. The codec LSI 27 performs a compression process on the audio data in a similar manner to that performed on the image data. Any method of compression may be performed on the audio data. It is, however, preferable that the method should have a high compression ratio, and should not cause a significant deterioration of the sound. In another embodiment, the audio data may be transmitted without being compressed. The terminal communication module 28 transmits the compressed image data and audio data to the terminal device 7 through the antenna 29.

In addition, the game apparatus 3 transmits, as well as the image data and the audio data described above, various control data to the terminal device 7 where necessary. The control data is data representing a control instruction to be given to a component included in the terminal device 7. The control data represents, for example, an instruction to control a marker section (a marker section 55 shown in FIG. 11), and an instruction to control a camera (a camera 56 shown in FIG. 11) to capture an image. The input/output processor 11a transmits the control data to the terminal device 7 in accordance with an instruction from the CPU 10. It should be noted that in the present embodiment, the codec LSI 27 does not perform a compression process on the control data. Alternatively, in another embodiment, the codec LSI 27 may perform a compression process on the control data. It should be noted that the above data transmitted from the game apparatus 3 to the terminal device 7 may be encrypted where necessary, or may not be encrypted.

In addition, the game apparatus 3 can receive various data from the terminal device 7. Although described in detail later, in the present embodiment, the terminal device 7 transmits operation data, image data, and audio data. The data transmitted from the terminal device 7 is received by the terminal communication module 28 through the antenna 29. Here, the image data and the audio data from the terminal device 7 are subjected to compression processes similarly to those performed on the image data and the audio data, respectively, from the game apparatus 3 to the terminal device 7. Accordingly, the image data and the audio data are transmitted from the terminal communication module 28 to the codec LSI 27, are subjected to decompression processes by the codec LSI 27, and are output to the input/output processor 11a. On the other hand, the operation data from the terminal device 7 may not be subjected to a compression process because the operation data is smaller in amount than the image data and the audio data. Further, the operation data may be encrypted where necessary, or may not be encrypted. Thus, the operation data is received by the terminal communication module 28, and is subsequently output to the input/output processor 11a through the codec LSI 27. The input/output processor 11a stores (temporarily stores) the data received from the terminal device 7 in a buffer area of the internal main memory 11e or the external main memory 12.

In addition, the game apparatus 3 can be connected to another device and an external storage medium. That is, the input/output processor 11a is connected to the extension connector 20 and the memory card connector 21. The extension connector 20 is a connector for an interface such as USB or SCSI. The extension connector 20 can be connected to a medium such as an external storage medium, or can be connected to a peripheral device such as another controller, or can be connected to a wired communication connector and thereby communicate with a network instead of the network communication module 18. The memory card connector 21 is a connector for connecting an external storage medium such as a memory card. For example, the input/output processor 11a can access an external storage medium through the extension connector 20 or the memory card connector 21, and thereby can store data in, or read data from, the external storage medium.

The game apparatus 3 includes a power button 24, a reset button 25, and an eject button 26. The power button 24 and the reset button 25 are connected to the system LSI 11. When the power button 24 has been turned on, power is supplied to each component of the game apparatus 3 from an external power supply through an AC adaptor not shown in the figures. When the reset button 25 has been pressed, the system LSI 11 restarts a start-up program for the game apparatus 3. The eject button 26 is connected to the disk drive 14. When the eject button 26 has been pressed, the optical disk 4 is ejected from the disk drive 14.

It should be noted that in another embodiment, some components among all the components of the game apparatus 3 may be configured as an extension device different from the game apparatus 3. In this case, the extension device may be connected to the game apparatus 3 via, for example, the extension connector 20 described above. Specifically, the extension device may include components such as the codec LSI 27, the terminal communication module 28, and the antenna 29, and may be attachable to and detachable from the extension connector 20. This enables the game apparatus to communicate with the terminal device 7 by connecting the extension device to a game apparatus that does not include all the components described above.

[3. Configuration of Controller 5]

Figure 3:
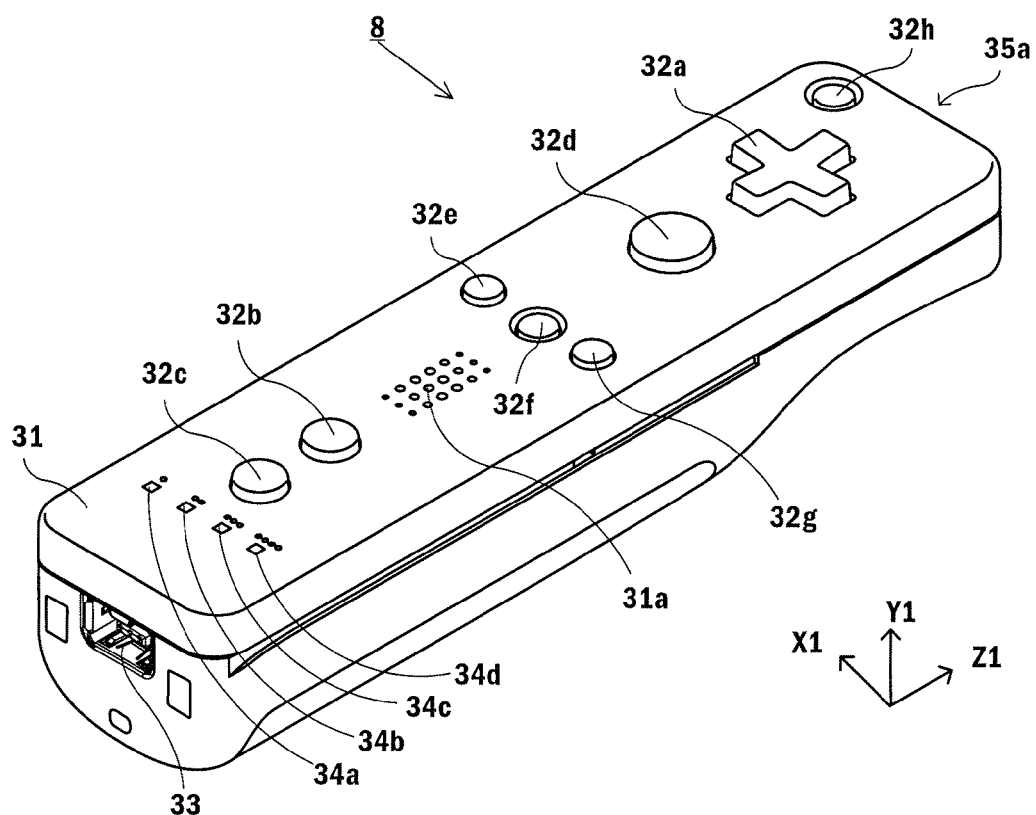
FIG. 3 is a perspective view showing the external configuration of a non-limiting example of a main controller 8.
Figure 4:
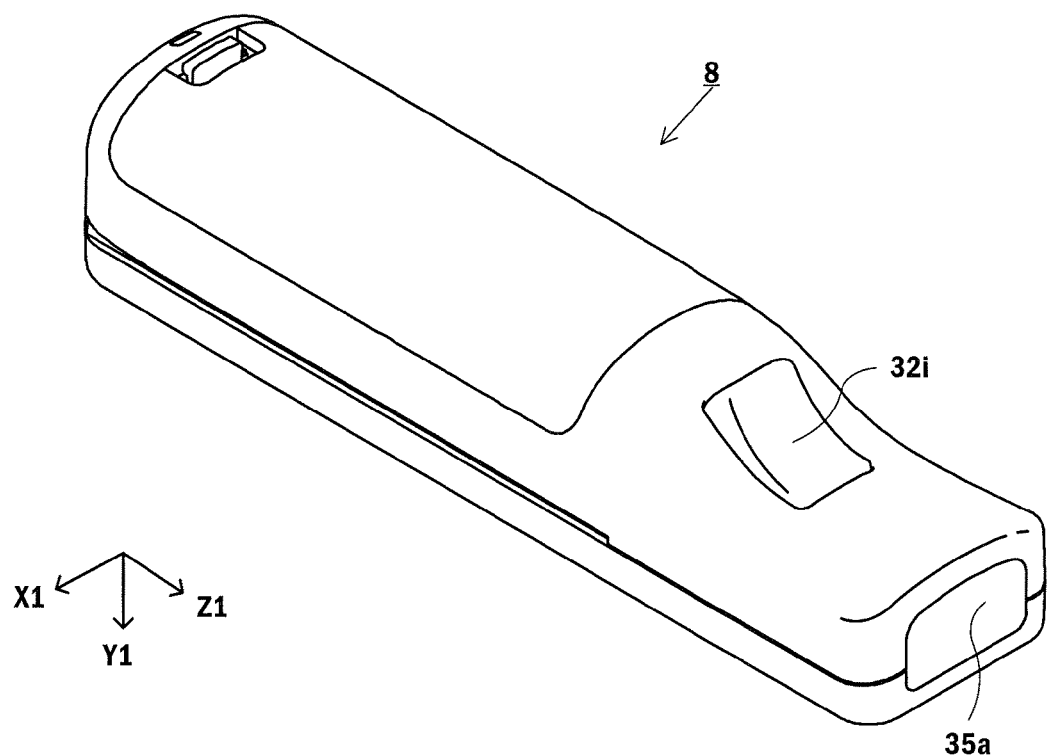
FIG. 4 is a perspective view showing the external configuration of a non-limiting example of the main controller 8.

Next, with reference to FIGS. 3 through 7, the controller 5 is described. As described above, the controller 5 includes the main controller 8 and the sub-controller 9. FIG. 3 is a perspective view showing the external configuration of a non-limiting example of the main controller 8. FIG. 4 is a perspective view showing the external configuration of a non-limiting example of the main controller 8. FIG. 3 is a perspective view of a non-limiting example of the main controller 8 from the top rear thereof. FIG. 4 is a perspective view of a non-limiting example of the main controller 8 from the bottom front thereof.

Referring to FIGS. 3 and 4, the main controller 8 includes a housing 31 formed by, for example, plastic molding. The housing 31 has a generally parallelepiped shape extending in its longitudinal direction from front to rear (the Z1-axis direction shown in FIG. 3). The entire housing 31 can be held with one hand by an adult or even a child. A user can perform a game operation by pressing buttons provided on the main controller 8, and moving the main controller 8 per se to change the position and the attitude (tilt) thereof.

The housing 31 includes a plurality of operation buttons. As shown in FIG. 3, on the top surface of the housing 31, the following are provided: a cross button 32a; a 1-button 32b; a 2-button 32c; an A-button 32d; a minus button 32e; a home button 32f; a plus button 32g; and a power button 32h. In the present specification, the top surface of the housing 31, on which the buttons 32a through 32h are provided, is occasionally referred to as a "button surface". On the other hand, as shown in FIG. 4, on the bottom surface of the housing 31, a recessed portion is formed. On the slope surface of the recessed portion on the rear surface side, a B-button 32i is provided. The operation buttons (switches) 32a through 32i are each appropriately assigned a function in accordance with the information processing program to be executed by the game apparatus 3. Further, the power switch 32h is used to remotely turn on/off the power to the game apparatus 3. The top surfaces of the home button 32f and the power button 32h are buried in the top surface of the housing 31. This makes it possible to prevent the user from inadvertently pressing the home button 32*f* or the power button 32*h*.

On the rear surface of the housing 31, a connector 33 is provided. The connector 33 is used to connect the main controller 8 to another device (e.g., the sub-controller 9 or another sensor unit). Further, on the rear surface of the housing 31, latch holes 33*a* are provided to the respective sides of the connector 33 in order to prevent said another device from easily separating from the housing 31.

In the posterior of the top surface of the housing 31, a plurality of (four in FIG. 3) LEDs 34*a* through 34*d* are provided. Here, the controller 5 (the main controller 8) is appropriately assigned a controller type (number) in order to distinguish the controller 5 from other controllers 5. The LEDs 34*a* through 34*d* are used to, for example, notify the user of the controller type currently set for the controller 5 that they are using, or to notify the user of the remaining battery charge. Specifically, when a game operation is performed using the controller 5, one of the plurality of LEDs 34*a* through 34*d* is lit on in accordance with the corresponding controller type.

Figure 6:
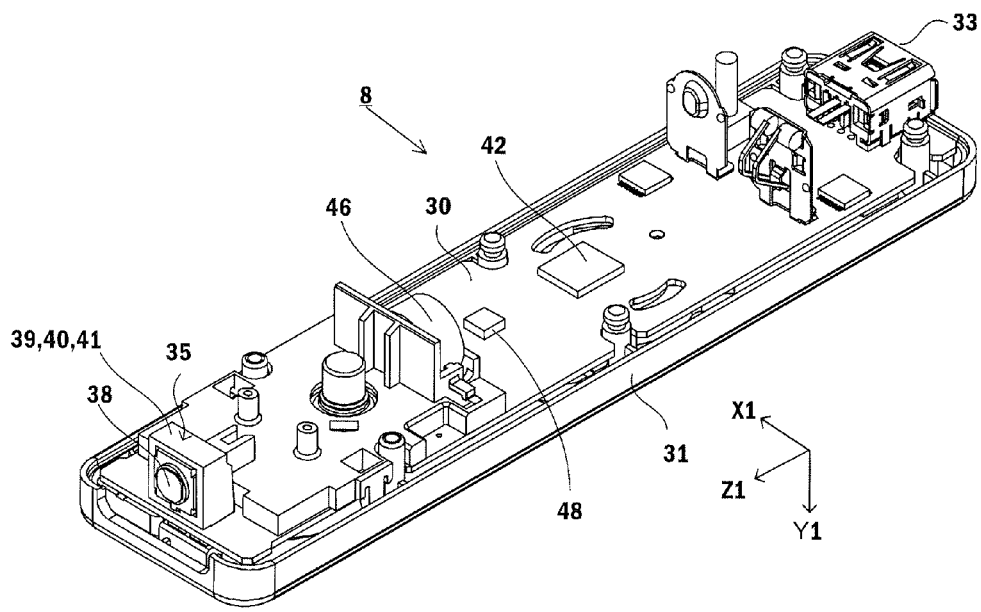
FIG. 6 is a diagram showing the internal structure of a non-limiting example of the main controller 8.

In addition, the controller 5 includes an imaging information calculation section 35 (FIG. 6). As shown in FIG. 4, on the front surface of the housing 31, a light incident surface 35*a* of the imaging information calculation section 35 is provided. The light incident surface 35*a* is formed of a material that allows the infrared light from the markers 6R and 6L to at least pass therethrough.

Between the first button 32*b* and the home button 32*f* on the top surface of the housing 31, sound holes 31*a* are formed so as to emit a sound from a loudspeaker 47 (FIG. 5) built into the main controller 8 to the outside.

Figure 5:
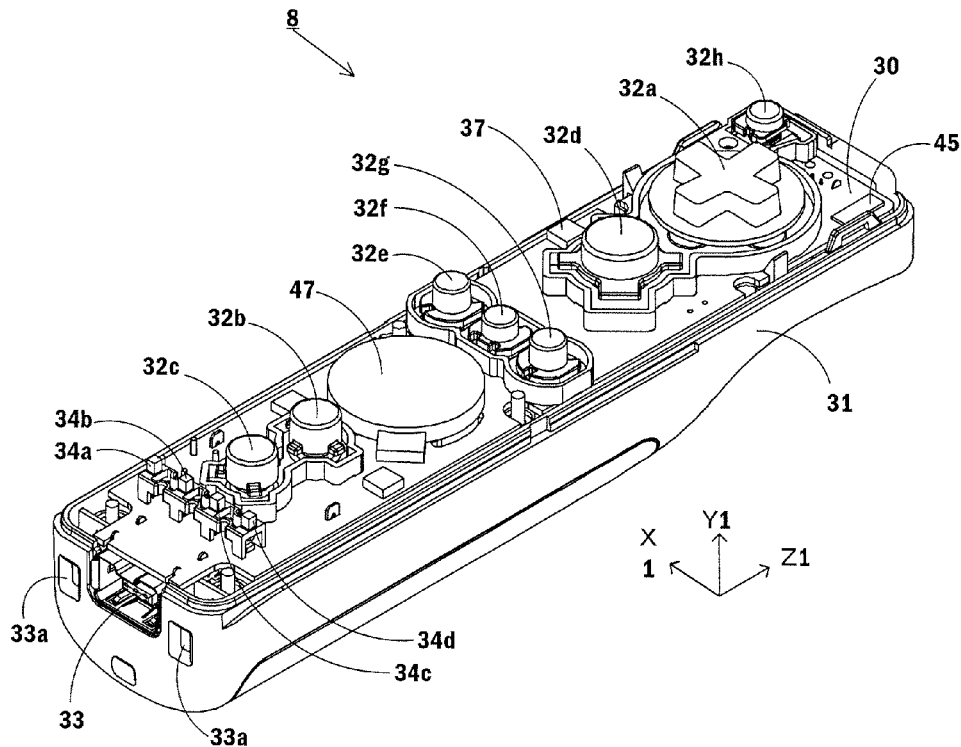
FIG. 5 is a diagram showing the internal structure of a non-limiting example of the main controller 8.

Next, with reference to FIGS. 5 and 6, the internal structure of the main controller 8 is described. FIGS. 5 and 6 are diagrams showing the internal structure of a non-limiting example of the main controller 8. It should be noted that FIG. 5 is a perspective view showing the state where an upper casing (a part of the housing 31) of the main controller 8 is removed. FIG. 6 is a perspective view showing the state where a lower casing (a part of the housing 31) of the main controller 8 is removed. FIG. 6 is a perspective view showing the reverse side of a substrate 30 shown in FIG. 5.

Referring to FIG. 5, a substrate 30 is fixed within the housing 31. On the top main surface of the substrate 30, the following are provided: the operation buttons 32*a* through 32*h*; the LEDs 34*a* through 34*d*; an acceleration sensor 37; an antenna 45; a loudspeaker 47; and the like. These components are connected to a microcomputer 42 (see FIG. 6) via wiring (not shown) formed on the substrate 30 and the like. In the present embodiment, the acceleration sensor 37 is located off the center of the main controller 8 along an X1-axis direction. This facilitates the calculation of the motion of the main controller 8 when the main controller 8 is rotated about a Z1-axis. Further, the acceleration sensor 37 is also located anterior to the center of the main controller 8 along its longitudinal direction (the Z1-axis direction). A wireless module 44 (FIG. 6) and the antenna 45 allow the controller 5 (the main controller 8) to function as a wireless controller.

On the other hand, referring to FIG. 6, at the front edge of the bottom main surface of the substrate 30, the imaging information calculation section 35 is provided. The imaging information calculation section 35 includes an infrared filter 38, a lens 39, an image pickup device 40, and an image processing circuit 41 that are placed in order starting from the anterior of the controller 5. The members 38 through 41 are each attached to the bottom main surface of the substrate 30.

In addition, on the bottom main surface of the substrate 30, a vibrator 46 is attached. The vibrator 46 is, for example, a vibration motor or a solenoid, and is connected to the microcomputer 42 via wiring formed on the substrate 30 and the like. The main controller 8 is vibrated by the actuation of the vibrator 46 on the basis of an instruction from the microcomputer 42. This makes it possible to achieve a so-called vibration-feedback game where the vibration is conveyed to the player's hand holding the main controller 8. In the present embodiment, the vibrator 46 is located slightly anterior to the center of the housing 31. The location of the vibrator 46 closer to the front end than the center of the main controller 8 makes it possible to vibrate the entire main controller 8 significantly by the vibration of the vibrator 46. Further, the connector 33 is attached to the rear edge of the main bottom surface of the substrate 30. It should be noted that the main controller 8 includes, as well as the components shown in FIGS. 5 and 6, a quartz oscillator that generates a reference clock of the microcomputer 42, an amplifier that outputs an audio signal to the loudspeaker 47, and the like.

Figure 7:
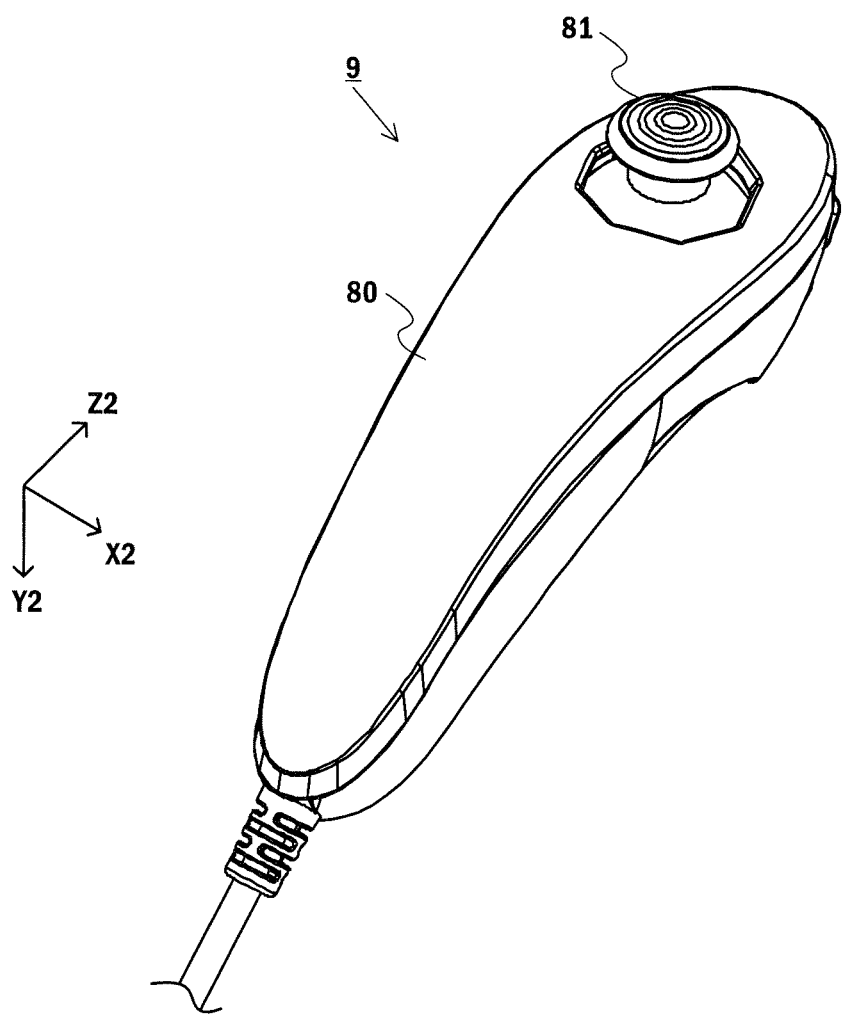
FIG. 7 is a perspective view showing the external configuration of a non-limiting example of a sub-controller 9.

FIG. 7 is a perspective view showing the external configuration of a non-limiting example of the sub-controller 9. The sub-controller 9 includes a housing 80 formed by, for example, plastic molding. The entire housing 80 can be held with one hand by an adult or even a child. Also the use of the sub-controller 9 allows a player to perform a game operation by operating buttons and a stick, and changing the position and the facing direction of the controller per se.

As shown in FIG. 7, on the front end side (a Z2-axis positive side) of the top surface (the surface on a Y2-axis negative direction side) of the housing 80, an analog joystick 81 is provided. Further, although not shown in the figures, at the front end of the housing 80, a front end surface slightly inclined backward is provided. On the front end surface, a C-button and a Z-button are provided so as to be arranged in the up-down direction (the Y2-axis direction shown in FIG. 7). The analog joystick 81 and the buttons (the C-button and the Z-button) are each appropriately assigned a function in accordance with the game program to be executed by the game apparatus 3. It should be noted that the analog joystick 81 and the buttons are occasionally collectively referred to as an "operation section 82" (see FIG. 8).

In addition, although not shown in FIG. 7, the sub-controller 9 has an acceleration sensor (an acceleration sensor 83 shown in FIG. 8) within the housing 80. In the present embodiment, the acceleration sensor 83 is one similar to the acceleration sensor 37 of the main controller 8. The acceleration sensor 83 may be, however, one different from the acceleration sensor 37, and may be one that detects the acceleration in one predetermined axis, or the accelerations in two predetermined axes.

In addition, as shown in FIG. 7, one end of a cable is connected to the rear end of the housing 80. Although not shown in FIG. 7, a connector (a connector 84 shown in FIG. 8) is connected to the other end of the cable. The connector can be connected to the connector 33 of the main controller 8. That is, the connection between the connector 33 and the connector 84 causes the main controller 8 and the sub-controller 9 to be connected together.

It should be noted that in FIG. 3 through 7, the shapes of the main controller 8 and the sub-controller 9, the shapes of the operation buttons, the numbers and the installation positions of the acceleration sensor and the vibrator, and the like are merely illustrative, and may be other shapes, numbers, and installation positions. In the present embodiment, the capturing direction of capturing means of the main controller 8 is the Z1-axis positive direction, but the capturing direction may be any direction. That is, the position of the imaging information calculation section 35 (the light incident surface 35*a* of the imaging information calculation section 35) of the controller 5 is not necessarily on the front surface of the housing 31, and may be on another surface so long as light can be obtained from outside the housing 31.

Figure 8:
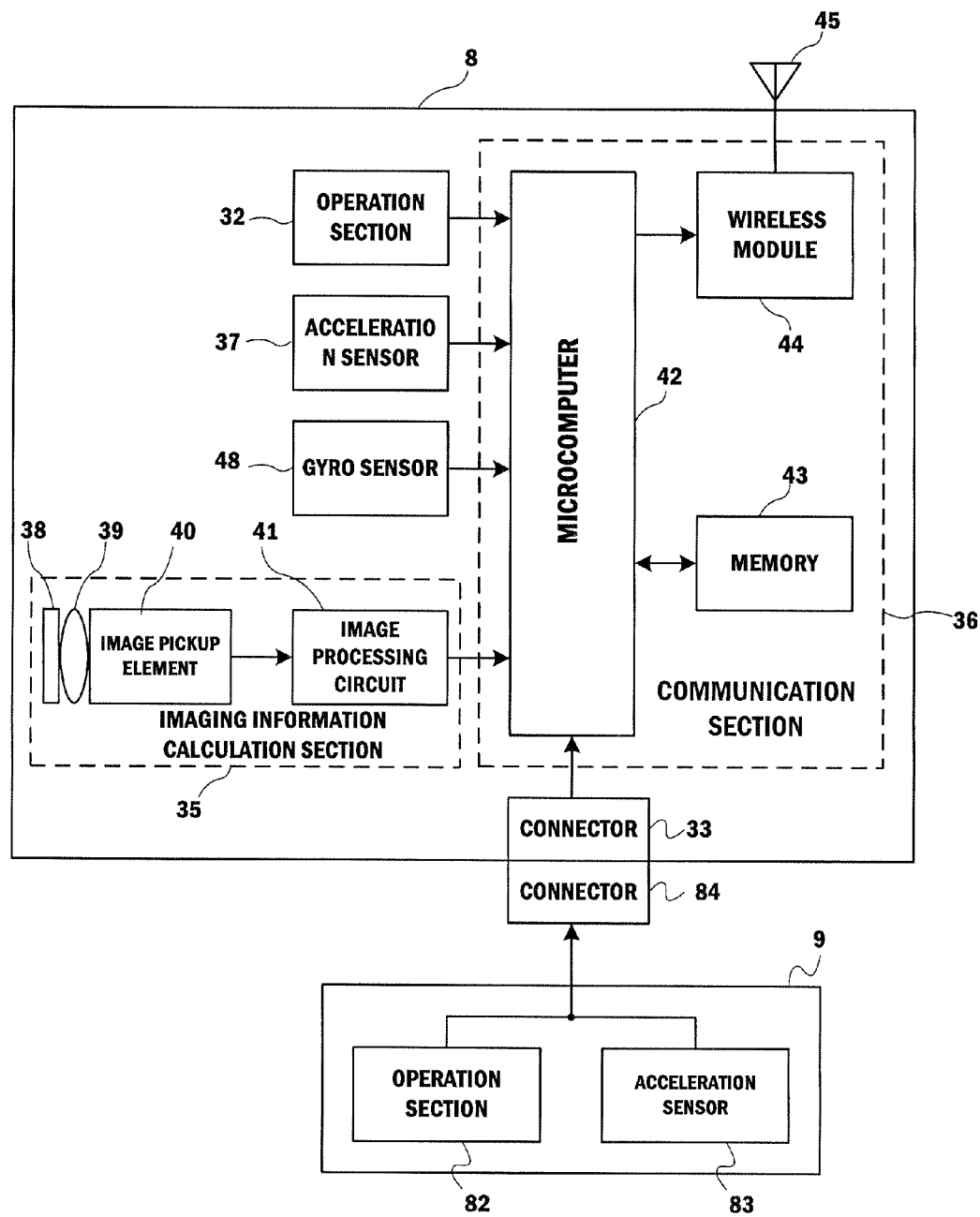
FIG. 8 is a block diagram showing the configuration of a non-limiting example of a controller 5.

FIG. 8 is a block diagram showing the configuration of a non-limiting example of the controller 5. As shown in FIG. 8, the main controller 8 includes an operation section 32 (the operation buttons 32*a* through 32*i*), the imaging information calculation section 35, a communication section 36, the acceleration sensor 37, and a gyro sensor 48. Further, the sub-controller 9 includes the operation section 82 and the acceleration sensor 83. The controller 5 transmits data representing the particulars of the operation performed on the controller 5 itself, to the game apparatus 3 as operation data. It should be noted that, hereinafter, occasionally, the operation data to be transmitted from the controller 5 is referred to as "controller operation data", and the operation data to be transmitted from the terminal device 7 is referred to as "terminal operation data".

The operation section 32 includes the operation buttons 32*a* through 32*i* described above, and outputs data representing the input state of each of the operation buttons 32*a* through 32*i* (whether or not each of the operation buttons 32*a* through 32*i* has been pressed), to the microcomputer 42 of the communication section 36.

The imaging information calculation section 35 is a system for analyzing image data of an image captured by the capturing means, determining an area having a high brightness in the image data, and calculating the center of gravity, the size, and the like of the area. The imaging information calculation section 35 has, for example, a maximum sampling period of about 200 frames/seconds, and therefore can trace and analyze even a relatively fast motion of the controller 5.

The imaging information calculation section 35 includes the infrared filter 38, the lens 39, the image pickup element 40, and the image processing circuit 41. The infrared filter 38 allows only infrared light, among the light incident on the front surface of the controller 5, to pass therethrough. The lens 39 collects the infrared light having passed through the infrared filter 38, and makes the infrared light incident on the image pickup element 40. The image pickup element 40 is a solid-state image pickup element such as a CMOS sensor or a CCD sensor. The image pickup element 40 receives the infrared light collected by the lens 39, and outputs an image signal. Here, capturing targets, namely the marker section 55 of the terminal device 7 and the marker device 6, each include markers that output infrared light. The provision of the infrared filter 38 allows the image pickup element 40 to receive only the infrared light having passed through the infrared filter 38, and generate image data. This makes it possible to accurately capture the capturing targets (the marker section 55 and/or the marker device 6). Hereinafter, an image captured by the image pickup element 40 is referred to as a "captured image". The image data generated by the image pickup element 40 is processed by the image processing circuit 41. The image processing circuit 41 calculates the positions of the capturing targets in the captured image. The image processing circuit 41 outputs coordinates representing the calculated positions to the microcomputer 42 of the communication section 36. Data of the coordinates is transmitted from the microcomputer 42 to the game apparatus 3 as operation data. Hereinafter, the coordinates described above are referred to as "marker coordinates". The marker coordinates change in accordance with the facing direction (tilt angle) and the position of the controller 5 per se. This enables the game apparatus 3 to calculate the facing direction and the position of the controller 5 using the marker coordinates.

It should be noted that in another embodiment, the controller 5 may not include the image processing circuit 41, and the captured image per se may be transmitted from the controller 5 to the game apparatus 3. In this case, the game apparatus 3 may have a circuit or a program that has functions similar to those of the image processing circuit 41, and may calculate the marker coordinates described above.

The acceleration sensor 37 detects the acceleration (including the gravitational acceleration) of the controller 5. That is, the acceleration sensor 37 detects the force (including the force of gravity) applied to the controller 5. The acceleration sensor 37 detects the values of, among the accelerations applied to a detection section of the acceleration sensor 37, the accelerations in linear directions along sensing axes (linear accelerations). For example, in the case of using a multi-axis (at least two-axis) acceleration sensor, the component of the acceleration in each axis is detected as the acceleration applied to the detection section of the acceleration sensor. It should be noted that the acceleration sensor 37 is, for example, an electrostatic capacitance type MEMS (Micro Electro Mechanical System) acceleration sensor, but may be another type of acceleration sensor.

In the present embodiment, the acceleration sensor 37 detects the linear accelerations in three axial directions, namely the up-down direction (the Y1-axis direction shown in FIG. 3), the left-right direction (the X1-axis direction shown in FIG. 3), and the front-rear direction (the Z1-axis direction shown in FIG. 3) based on the controller 5. The acceleration sensor 37 detects the acceleration in the linear direction along each axis, and therefore, the output from the acceleration sensor 37 represents the value of the linear acceleration in each of the three axes. That is, the detected accelerations are represented as a three-dimensional vector in an X1-Y1-Z1 coordinate system (a controller coordinate system) set on the basis of the controller 5.

Data (acceleration data) representing the accelerations detected by the acceleration sensor 37 is output to the communication section 36. It should be noted that the accelerations detected by the acceleration sensor 37 change in accordance with the facing direction (tilt angle) and the motion of the controller 5 per se. This enables the game apparatus 3 to calculate the direction and the facing direction of the controller 5 using the acquired acceleration data. In the present embodiment, the game apparatus 3 calculates the attitude, the tilt angle, and the like of the controller 5 on the basis of the acquired acceleration data.

It should be noted that those skilled in the art will readily understand from the description herein that a computer such as a processor (e.g., the CPU 10) of the game apparatus 3 or a processor (e.g., the microcomputer 42) of the controller 5 may perform processing on the basis of signals of the accelerations output from the acceleration sensor 37 (the same applies to an acceleration sensor 63 described later), whereby it is possible to estimate or calculate (determine) further information about the controller 5. For example, the case is considered where the computer performs processing on the assumption that the controller 5 having the acceleration sensor 37 is in a static state (i.e., on the assumption that the acceleration detected by the acceleration sensor 37 is limited to the gravitational acceleration). If the controller 5 is actually in a static state, it is possible to determine, on the basis of the detected acceleration, whether or not the controller 5 is tilted relative to the direction of gravity, and also determine the degree of the tilt of the controller 5. Specifically, based on the state where the detection axis of the acceleration sensor 37 is directed vertically downward, it is possible to determine, on the basis of only whether or not 1G (a gravitational acceleration) is applied to the acceleration sensor 37, whether or not the controller 5 is tilted. Further, it is also possible to determine the degree of the tilt of the controller 5 relative to the reference, on the basis of the magnitude of the gravitational acceleration. Alternatively, in the case of using a multi-axis acceleration sensor 37, the computer may perform processing on the acceleration signal of each axis, whereby it is possible to determine the degree of the tilt of the controller 5 in more detail. In this case, a processor may calculate the tilt angle of the controller 5 on the basis of the output from the acceleration sensor 37, or may calculate the tilt direction of the controller 5 without calculating the tilt angle. Thus, the use of the acceleration sensor 37 in combination with a processor makes it possible to determine the tilt angle or the attitude of the main controller 5.

On the other hand, when it is assumed that the controller 5 having the acceleration sensor 37 is in a dynamic state (the state where the controller 5 is being moved), the acceleration sensor 37 detects the accelerations corresponding to the motion of the controller 5 in addition to the gravitational acceleration. This makes it possible to determine the motion direction of the controller 5 by removing the component of the gravitational acceleration from the detected accelerations by a predetermined process. Further, even when it is assumed that the acceleration sensor 37 is in a dynamic state, it is possible to determine the tilt of the controller 5 relative to the direction of gravity by removing the component of the acceleration corresponding to the motion of the acceleration sensor 37 from the detected accelerations by a predetermined process. It should be noted that in another embodiment, the acceleration sensor 37 may include an embedded processing apparatus or another type of dedicated processing apparatus for performing a predetermined process on acceleration signals, detected by built-in acceleration detection means, before outputting the acceleration signals to the microcomputer 42. For example, when the acceleration sensor 37 is used to detect a static acceleration (e.g., the gravitational acceleration), the embedded or dedicated processor may convert the acceleration signal into a tilt angle (or another preferable parameter).

The gyro sensor 48 detects the angular velocities about three axes (the X1, Y1, and Z1 axes in the present embodiment). In the present specification, on the basis of the capturing direction of the controller 5 (the Z1-axis positive direction), the direction of rotation about the X1-axis is referred to as a "pitch direction"; the direction of rotation about the Y1-axis is referred to as a "yaw direction"; and the direction of rotation about the Z1-axis is referred to as a "roll direction". Any number and any combination of gyro sensors may be used so long as the gyro sensor 48 can detect the angular velocities about the three axes. For example, the gyro sensor 48 may be a three-axis gyro sensor, or may be one that detects the angular velocities about the three axes by combining a two-axis gyro sensor and a one-axis gyro sensor. Data representing the angular velocities detected by the gyro sensor 48 is output to the communication section 36. Alternatively, the gyro sensor 48 may be one that detects the angular velocity about one axis, or the angular velocities about two axes.

In addition, the operation section 82 of the sub-controller 9 includes the analog joystick 81, the C-button, and the Z-button that are described above. The operation section 82 outputs, to the main controller 8 through the connector 84, stick data (referred to as "sub-stick data") representing the direction of tilt and the amount of tilt of the analog joystick 81, and operation button data (referred to as "sub-operation button data") representing the input state of each button (whether or not the button has been pressed).

In addition, the acceleration sensor 83 of the sub-controller 9 is one similar to the acceleration sensor 37 of the main controller 8, and detects the acceleration (including the gravitational acceleration) of the sub-controller 9. That is, the acceleration sensor 83 detects the force (including the force of gravity) applied to the sub-controller 9. The acceleration sensor 83 detects the values of, among the accelerations applied to a detection section of the acceleration sensor 83, the accelerations in linear directions along predetermined three-axial directions (linear accelerations). Data (referred to as "sub-acceleration data") representing the detected accelerations is output to the main controller 8 through the connector 84.

As described above, the sub-controller 9 outputs to the main controller 8 the sub-controller data including the sub-stick data, the sub-operation button data, and the sub-acceleration data.

The communication section 36 of the main controller 8 includes the microcomputer 42, a memory 43, the wireless module 44, and the antenna 45. Using the memory 43 as a storage area while performing processing, the microcomputer 42 controls the wireless module 44 that wirelessly transmits the data acquired by the microcomputer 42 to the game apparatus 3.

The sub-controller data from the sub-controller 9 is input to the microcomputer 42, and is temporarily stored in the memory 43. Further, the following are temporarily stored in the memory 43: the operation section 32; the imaging information calculation section 35; the acceleration sensor 37; and data (referred to as "main controller data") output from the gyro sensor 48 to the microcomputer 42. The main controller data and the sub-controller data are transmitted as the operation data (controller operation data) to the game apparatus 3. That is, when the time for transmission to the controller communication module 19 has arrived, the microcomputer 42 outputs the operation data stored in the memory 43 to the wireless module 44. The wireless module 44 modulates a carrier wave of a predetermined frequency by the operation data, and radiates the resulting weak radio signal from the antenna 45, using, for example, the Bluetooth (registered trademark) technology. That is, the operation data is modulated into a weak radio signal by the wireless module 44, and is transmitted from the controller 5. The weak radio signal is received by the controller communication module 19 on the game apparatus 3 side. This enables the game apparatus 3 to obtain the operation data by demodulating or decoding the received weak radio signal. The CPU 10 of the game apparatus 3 performs the game processing using the operation data obtained from the controller 5. It should be noted that the wireless communication from the communication section 36 to the controller communication module 19 is sequentially performed every predetermined cycle. Generally, the game processing is performed in a cycle of 1/60 seconds (as one frame time), and therefore, it is preferable that the wireless transmission should be performed in a shorter cycle than this cycle. The communication section 36 of the controller 5 outputs the operation data to the controller communication module 19 of the game apparatus 3 every 1/200 seconds, for example.

As described above, the main controller 8 can transmit marker coordinate data, the acceleration data, the angular velocity data, and the operation button data, as the operation data representing the operation performed on the main controller 8 itself. The sub-controller 9 can transmit the acceleration data, the stick data, and the operation button data, as the operation data representing the operation performed on the sub-controller 9 itself. Further, the game apparatus 3 performs the game processing using the operation data as a game input. Accordingly, the use of the controller 5 allows the user to perform an operation of moving the controller 5 per se, in addition to a conventional general game operation of pressing the operation buttons. For example, it is possible to perform: an operation of tilting the main controller 8 and/or the sub-controller 9 to a given attitude; an operation of indicating a given position on the screen with the main controller 8; an operation of moving the main controller 8 and/or the sub-controller 9 per se; and the like.

In addition, in the present embodiment, the controller 5 does not have display means for displaying a game image. Alternatively, the controller 5 may have display means for displaying, for example, an image representing the remaining battery charge.

[4. Configuration of Terminal Device 7]

Figure 9:
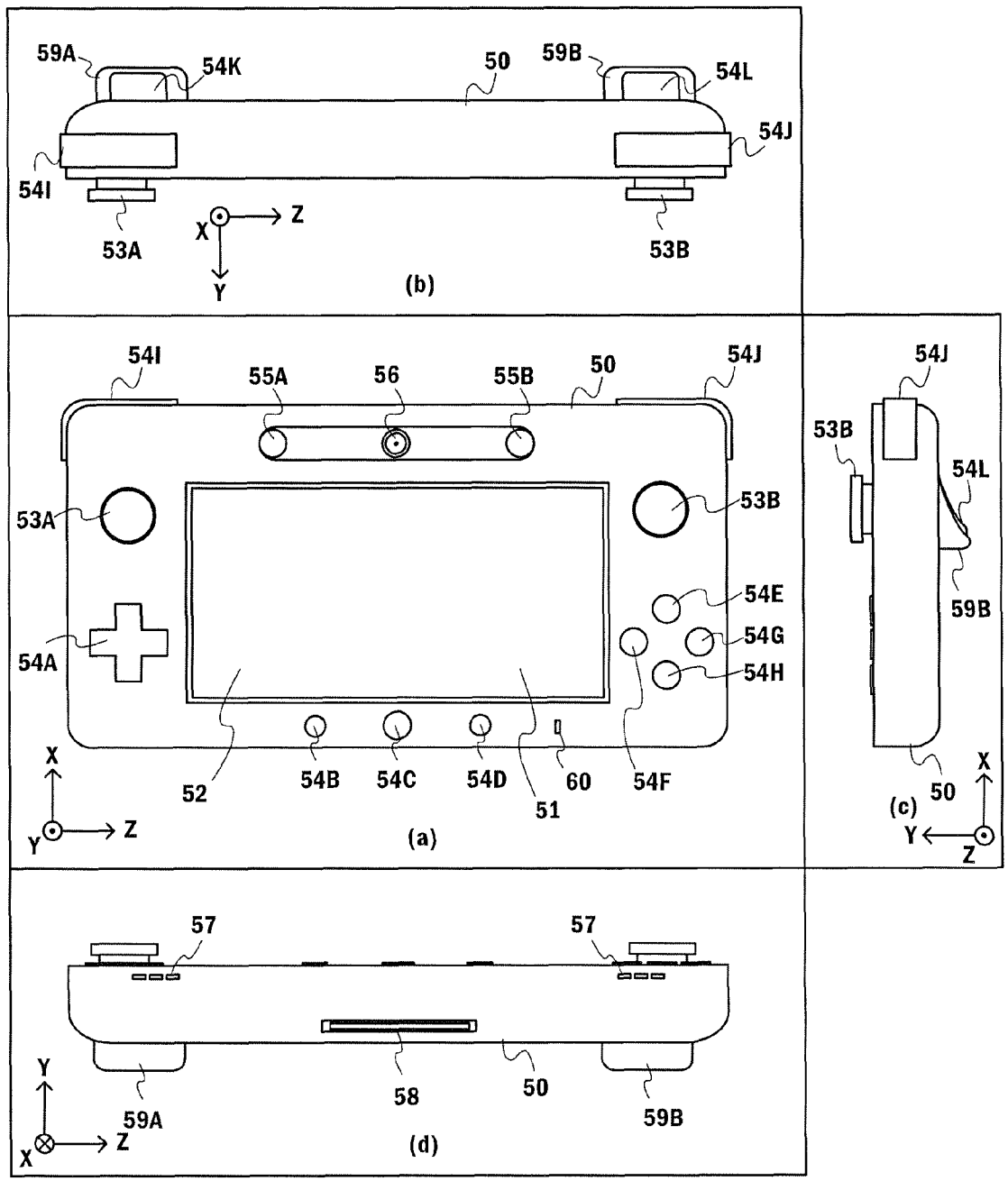
FIG. 9 is a diagram showing the external configuration of a non-limiting example of a terminal device 7.
Figure 10:
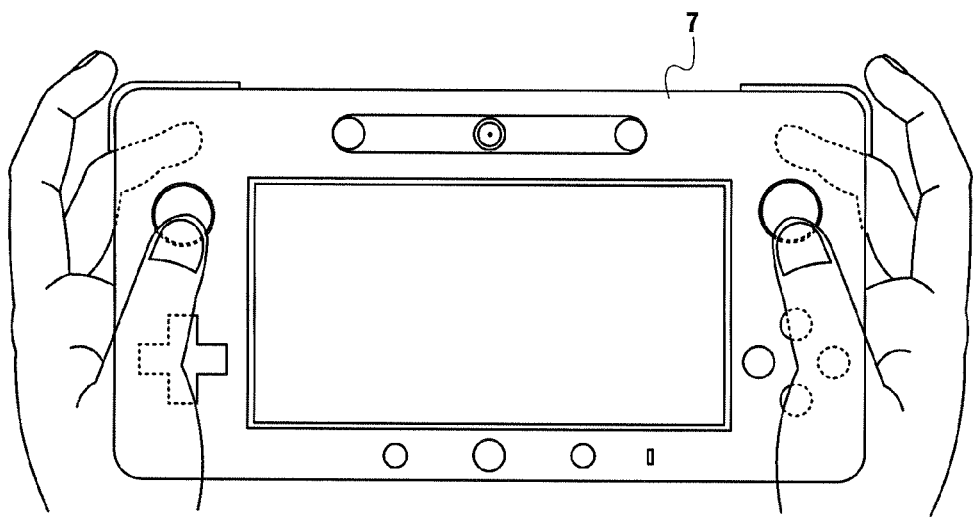
FIG. 10 is a diagram showing a non-limiting example of the state where a user holds the terminal device 7.
Figure 11:
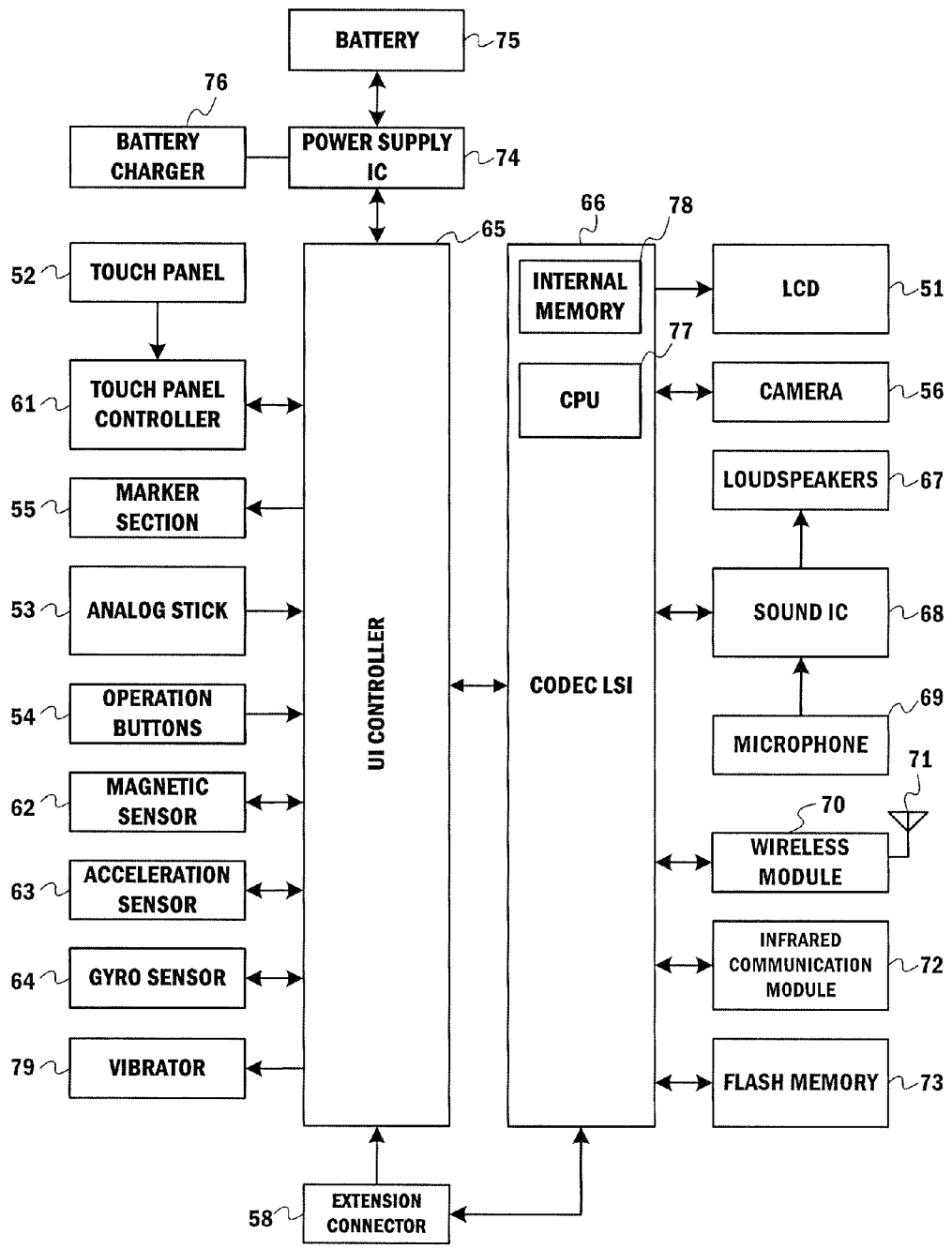
FIG. 11 is a block diagram showing the internal configuration of a non-limiting example of the terminal device 7.

Next, with reference to FIGS. 9 through 11, the configuration of the terminal device 7 is described. FIG. 9 is a diagram showing the external configuration of a non-limiting example of the terminal device 7. In FIG. 9: (a) is a front view of the terminal device 7; (b) is a top view; (c) is a right side view; and (d) is a bottom view. Further, FIG. 10 is a diagram showing a non-limiting example of the state where a user holds the terminal device 7.

As shown in FIG. 9, the terminal device 7 includes a housing 50 that generally has a horizontally long plate-like rectangular shape. The housing 50 is small enough to be held by a user. This allows the user to move the terminal device 7 while holding it, and to change the location of the terminal device 7.

The terminal device 7 has an LCD 51 on the front surface of the housing 50. The LCD 51 is provided near the center of the front surface of the housing 50. Accordingly, as shown in FIG. 10, the user can hold and move the terminal device 7 while viewing a screen of the LCD 51, by holding the housing 50 at portions to the right and left of the LCD 51. It should be noted that FIG. 10 shows an example where the user holds the terminal device 7 horizontally (i.e., such that the terminal device 7 is oriented horizontally) by holding the housing 50 at portions to the right and left of the LCD 51. The user, however, may hold the terminal device 7 vertically (i.e., such that the terminal device 7 is oriented vertically).

As shown in (a) of FIG. 9, the terminal device 7 includes a touch panel 52 on the screen of the LCD 51, as operation means. In the present embodiment, the touch panel 52 is, but is not limited to, a resistive film type touch panel. The touch panel may be of a given type such as an electrostatic capacitance type. The touch panel 52 may be of a single touch type or a multiple touch type. In the present embodiment, the touch panel 52 has the same resolution (detection accuracy) as that of the LCD 51. The resolution of the touch panel 52 and the resolution of the LCD 51, however, may not necessarily be the same. Generally, an input to the touch panel 52 is provided using a touch pen; however, an input may be provided to the touch panel 52 not only by a touch pen but also by a finger of the user. It should be noted that the housing 50 may include an insertion opening for accommodating a touch pen used to perform an operation on the touch panel 52. The terminal device 7 thus includes the touch panel 52. This allows the user to operate the touch panel 52 while moving the terminal device 7. That is, the user can directly (through the touch panel 52) provide an input to the screen of the LCD 51 while moving the LCD 51.

As shown in FIG. 9, the terminal device 7 includes two analog sticks 53A and 53B and a plurality of buttons 54A through 54L, as operation means. The analog sticks 53A and 53B are each a device for indicating a direction. The analog sticks 53A and 53B are each configured such that a stick part thereof to be operated by a finger of the user is slidable or tiltable in a given direction (at an given angle in any of the upward, downward, rightward, leftward, and diagonal directions). The left analog stick 53A is provided to the left of the screen of the LCD 51, and the right analog stick 53B is provided to the right of the screen of the LCD 51. This allows the user to provide an input for indicating a direction using an analog stick with either the right or left hand. Further, as shown in FIG. 10, the analog sticks 53A and 53B are placed so as to be operated by the user holding the right and left portions of the terminal device 7. This allows the user to easily operate the analog sticks 53A and 53B when the user holds and moves the terminal device 7.

The buttons 54A through 54L are each operation means for providing a predetermined input. As described below, the buttons 54A through 54L are placed so as to be operated by the user holding the right and left portions of the terminal device 7 (see FIG. 10). This allows the user to easily operate the operation means even when the user holds and moves the terminal device 7.

As shown in (a) of FIG. 9, among the operation buttons 54A through 54L, the cross button (direction input button) 54A and the buttons 54B through 54H are provided on the front surface of the housing 50. That is, the buttons 54A through 54H are placed so as to be operated by a thumb of the user (see FIG. 10).

The cross button 54A is provided to the left of the LCD 51 and below the left analog stick 53A. That is, the cross button 54A is placed so as to be operated by the left hand of the user. The cross button 54A is cross-shaped, and is capable of indicating an upward, a downward, a leftward, or a rightward direction. Further, the buttons 54B through 54D are provided below the LCD 51. The three buttons 54B through 54D are placed so as to be operated by the right and left hands of the user. Furthermore, the four buttons 54E through 54H are provided to the right of the LCD 51 and below the right analog stick 53B. That is, the four buttons 54E through 54H are placed so as to be operated by the right hand of the user. In addition, the four buttons 54E through 54H are placed above, below, to the left, and to the right (relative to the center position of the four buttons 54E through 54H). This enables the terminal device 7 to cause the four buttons 54E through 54H to function as buttons that allow the user to indicate an upward, a downward, a leftward, or a rightward direction.

In addition, as shown in (a), (b), and (c) of FIG. 9, the first L button 54I and the first R button 54J are provided on upper diagonal portions (an upper left portion and an upper right portion) of the housing 50. Specifically, the first L button 54I is provided at the left end of the upper side surface of the plate-shaped housing 50 so as to be exposed through the upper and left side surfaces. The first R button 54J is provided at the right end of the upper side surface of the housing 50 so as to be exposed through the upper and right side surfaces. As described above, the first L button 54I is placed so as to be operated by the index finger of the left hand of the user, and the first R button 54J is placed so as to be operated by the index finger of the right hand of the user (see FIG. 10).

In addition, as shown in (b) and (c) of FIG. 9, the second L button 54K and the second R button 54L are provided on leg parts 59A and 59B, respectively, the leg parts 59A and 59B provided so as to protrude from the rear surface (i.e., the surface opposite to the front surface on which the LCD 51 is provided) of the plate-shaped housing 50. Specifically, the second L button 54K is provided in a slightly upper portion of the left side (the left side as viewed from the front surface side) of the rear surface of the housing 50, and the second R button 54L is provided in a slightly upper portion of the right side (the right side as viewed from the front surface side) of the rear surface of the housing 50. In other words, the second L button 54K is provided at a position substantially opposite to the left analog stick 53A provided on the front surface, and the second R button 54L is provided at a position substantially opposite to the right analog stick 53B provided on the front surface. As described above, the second L button 54K is placed so as to be operated by the middle finger of the left hand of the user, and the second R button 54L is placed so as to be operated by the middle finger of the right hand of the user (see FIG. 10). Further, as shown in (c) of FIG. 9, the second L button 54K and the second R button 54L are provided on the surfaces of the leg parts 59A and 59B, respectively, that face obliquely upward. Thus, the second L button 54K and the second R button 54L have button surfaces facing obliquely upward. It is considered that the middle fingers of the user move vertically when the user holds the terminal device 7. Accordingly, the upward-facing button surfaces allow the user to easily press the second L button 54K and the second R button 54L by directing the button surfaces upward. Further, the provision of the leg parts on the rear surface of the housing 50 allows the user to easily hold the housing 50. Furthermore, the provision of the operation buttons on the leg parts allows the user to easily operate the housing 50 while holding it.

It should be noted that in the terminal device 7 shown in FIG. 9, the second L button 54K and the second R button 54L are provided on the rear surface of the housing 50. Accordingly, if the terminal device 7 is placed with the screen of the LCD 51 (the front surface of the housing 50) facing upward, the screen of the LCD 51 may not be completely horizontal. Thus, in another embodiment, three or more leg parts may be provided on the rear surface of the housing 50. In this case, in the state where the screen of the LCD 51 faces upward, the terminal device 7 can be placed on a floor (or another horizontal surface) such that the leg parts are in contact with the floor. This makes it possible to place the terminal device 7 such that the screen of the LCD 51 is horizontal. Such a horizontal placement of the terminal device 7 may be achieved by adding attachable and detachable leg parts.

The buttons 54A through 54L are each appropriately assigned a function in accordance with the game program. For example, the cross button 54A and the buttons 54E through 54H may be used for a direction indication operation, a selection operation, and the like, and the buttons 54B through 64E may be used for a determination operation, a cancellation operation, and the like.

It should be noted that although not shown in the figures, the terminal device 7 includes a power button for turning on/off the power to the terminal device 7. The terminal device 7 may include a button for turning on/off screen display of the LCD 51, a button for performing a connection setting (pairing) with the game apparatus 3, and a button for adjusting the volume of loudspeakers (loudspeakers 67 shown in FIG. 11).

As shown in (a) of FIG. 9, the terminal device 7 includes a marker section (the marker section 55 shown in FIG. 11) including markers 55A and 55B on the front surface of the housing 50. The marker section 55 may be provided at any position, but is provided above the LCD 51 here. Similarly to the markers 8L and 8R of the marker device 6, the markers 55A and 55B are each composed of one or more infrared LEDs. Similarly to the marker device 6 described above, the marker section 55 is used to cause the game apparatus 3 to calculate the motion of the controller 5 (the main controller 8) and the like. The game apparatus 3 is capable of controlling the infrared LEDs of the marker section 55 to be lit on or off.

The terminal device 7 includes a camera 56 as capturing means. The camera 56 includes an image pickup element (e.g., a CCD image sensor or a CMOS image sensor) having a predetermined resolution, and a lens. As shown in FIG. 9, in the present embodiment, the camera 56 is provided on the front surface of the housing 50. This enables the camera 56 to capture the face of the user holding the terminal device 7, and therefore to capture, for example, the user playing the game while viewing the LCD 51. It should be noted that in another embodiment, one or more cameras may be provided in the terminal device 7.

It should be noted that the terminal device 7 includes a microphone (a microphone 69 shown in FIG. 11) as audio input means. A microphone hole 60 is provided on the front surface of the housing 50. The microphone 69 is provided within the housing 50 at the back of the microphone hole 60. The microphone 69 detects a sound surrounding the terminal device 7, such as the user's voice. It should be noted that in another embodiment, one or more microphones may be provided in the terminal device 7.

The terminal device 7 has loudspeakers (loudspeakers 67 shown in FIG. 11) as audio output means. As shown in (d) of FIG. 9, loudspeaker holes 57 are provided on the lower side surface of the housing 50. A sound from the loudspeakers 67 is output through the loudspeaker holes 57. In the present embodiment, the terminal device 7 includes two loudspeakers, and the loudspeaker holes 57 are provided at positions corresponding to a left loudspeaker and a right loudspeaker. It should be noted that any number of loudspeakers may be included in the terminal device 7. For example, additional loudspeaker may be provided in the terminal device 7 in addition to the two loudspeakers described above.

In addition, the terminal device 7 includes an extension connector 58 for connecting another device to the terminal device 7. In the present embodiment, as shown in (d) of FIG. 9, the extension connector 58 is provided on the lower side surface of the housing 50. It should be noted that any device may be connected to the extension connection 58. For example, a controller (e.g., a gun-shaped controller) used in a specific game, or an input device such as a keyboard may be connected to the extension connector 58. If it is not necessary to connect another device, the extension connector 58 may not need to be provided.

It should be noted that in the terminal device 7 shown in FIG. 9, the shapes of the operation buttons and the housing 50, the numbers and the installation positions of the components are merely illustrative, and may be other shapes, numbers, and installation positions.

Next, with reference to FIG. 11, the internal configuration of the terminal device 7 is described. FIG. 11 is a block diagram showing the internal configuration of a non-limiting example of the terminal device 7. As shown in FIG. 11, the terminal device 7 includes, as well as the components shown in FIG. 9, a touch panel controller 61, a magnetic sensor 62, an acceleration sensor 63, a gyro sensor 64, a user interface controller (UI controller) 65, a codec LSI 66, the loudspeakers 67, a sound IC 68, the microphone 69, a wireless module 70, an antenna 71, an infrared communication module 72, a flash memory 73, a power supply IC 74, a battery 75, and a vibrator 79. These electronic components are mounted on an electronic circuit board and accommodated in the housing 50.

The UI controller 65 is a circuit for controlling the input of data to various input sections and the output of data from various output sections. The UI controller 65 is connected to the touch panel controller 61, the analog stick 53 (the analog sticks 53A and 53B), the operation buttons 54 (the operation buttons 54A through 54L), the marker section 55, the magnetic sensor 62, the acceleration sensor 63, the gyro sensor 64, and the vibrator 79. Further, the UI controller 65 is connected to the codec LSI 66 and the extension connector 58. The power supply IC 74 is connected to the UI controller 65, so that power is supplied to each component through the UI controller 65. The built-in internal battery 75 is connected to the power supply IC 74, so that power is supplied from the battery 75. Furthermore, the power supply IC 74 can be connected, via a connector or the like, to a battery charger 76 or a cable through which power can be acquired from an external power supply. This enables the terminal device 7 to be supplied with power and charged from the external power supply, using the battery charger 76 or the cable. It should be noted that the terminal device 7 may be charged by attaching the terminal device 7 to a cradle not shown in the figures that has a charging function.

The touch panel controller 61 is a circuit that is connected to the touch panel 52 and controls the touch panel 52. The touch panel controller 61 generates touch position data in a predetermined form on the basis of a signal from the touch panel 52, and outputs the touch position data to the UI controller 65. The touch position data represents the coordinates of the position (or a plurality of positions, in the case where the touch panel 52 is of a multiple touch type) where an input has been provided on an input surface of the touch panel 52. The touch panel controller 61 reads a signal from the touch panel 52, and generates touch position data every predetermined time. Further, various control instructions to be given to the touch panel 52 are output from the UI controller 65 to the touch panel controller 61.

The analog stick 53 outputs, to the UI controller 65, stick data representing the direction in which the stick part operated by a finger of the user has slid (or tilted), and the amount of the sliding (tilting). Further, the operation buttons 54 output, to the UI controller 65, operation button data representing the input state of each of the operation buttons 54A through 54L (whether or not the operation button has been pressed).

The magnetic sensor 62 detects an orientation by sensing the magnitude and the direction of a magnetic field. Orientation data representing the detected orientation is output to the UI controller 65. Further, the UI controller 65 outputs to the magnetic sensor 62 a control instruction to be given to the magnetic sensor 62. Examples of the magnetic sensor 62 include MI (Magnetic Impedance) sensors, fluxgate sensors, Hall sensors, GMR (Giant Magneto Resistance) sensors, TMR (Tunneling Magneto Resistance) sensors, and AMR (Anisotropic Magneto Resistance) sensors. Any sensor, however, may be used so long as the sensor can detect an orientation. It should be noted that, strictly speaking, the obtained orientation data does not indicate an orientation at the place where a magnetic field other than geomagnetism is produced. Even in such a case, however, it is possible to calculate a change in the attitude of the terminal device 7 because the orientation data changes when the terminal device 7 has moved.

The acceleration sensor 63 is provided within the housing 50. The acceleration sensor 63 detects the magnitudes of the linear accelerations in three axial directions (the X, Y, and Z axes shown in (a) of FIG. 9). Specifically, in the acceleration sensor 63, the long side direction of the housing 50 is defined as an X-axis direction; the short side direction of the housing 50 is defined as a Y-axis direction; and the direction orthogonal to the front surface of the housing 50 is defined as a Z-axis direction. Thus, the acceleration sensor 63 detects the magnitudes of the linear accelerations in the respective axes. Acceleration data representing the detected accelerations is output to the UI controller 65. Further, the UI controller 65 outputs to the acceleration sensor 63 a control instruction to be given to the acceleration sensor 63. In the present embodiment, the acceleration sensor 63 is, for example, an electrostatic capacitance type MEMS acceleration sensor, but, in another embodiment, may be another type of acceleration sensor. Further, the acceleration sensor 63 may be an acceleration sensor for detecting the magnitude of the acceleration in one axial direction, or the magnitudes of the accelerations in two axial directions.

The gyro sensor 64 is provided within the housing 50. The gyro sensor 64 detects the angular velocities about three axes, namely the X, Y, and Z axes described above. Angular velocity data representing the detected angular velocities is output to the UI controller 65. The UI controller 65 outputs to the gyro sensor 64 a control instruction to be given to the gyro sensor 64. It should be noted that any number and any combination of gyro sensors may be used to detect the angular velocities about the three axes. Similarly to the gyro sensor 48, the gyro sensor 64 may be constituted of a two-axis gyro sensor and a one-axis gyro sensor. Alternatively, the gyro sensor 64 may be one that detects the angular velocity about one axis, or the angular velocities about two axes.

The vibrator 79 is, for example, a vibration motor or a solenoid, and is connected to the UI controller 65. The terminal device 7 is vibrated by the actuation of the vibrator 79 on the basis of an instruction from the UI controller 65. This makes it possible to achieve a so-called vibration-feedback game where the vibration is conveyed to the user's hand holding the terminal device 7.

The UI controller 65 outputs to the codec LSI 66 the operation data (terminal operation data) including the touch position data, the stick data, the operation button data, the orientation data, the acceleration data, and the angular velocity data that have been received from each component described above. It should be noted that if another device is connected to the terminal device 7 via the extension connector 58, data representing the operation performed on said another device may be further included in the operation data.

The codec LSI 66 is a circuit for performing a compression process on data to be transmitted to the game apparatus 3, and a decompression process on data transmitted from the game apparatus 3. The codec LSI 66 is connected to the LCD 51, the camera 56, the sound IC 68, the wireless module 70, the flash memory 73, and the infrared communication module 72. Further, the codec LSI 66 includes a CPU 77 and an internal memory 78. Although the terminal device 7 is configured not to perform game processing per se, the terminal device 7 needs to execute a minimum program for the management and the communication of the terminal device 7. A program stored in the flash memory 73 is load into the internal memory 78 and executed by the CPU 77 when the terminal device 7 has been powered on, whereby the terminal device 7 is started up. Further, a part of the area of the internal memory 78 is used as a VRAM for the LCD 51.

The camera 56 captures an image in accordance with an instruction from the game apparatus 3, and outputs data of the captured image to the codec LSI 66. Further, the codec LSI 66 outputs to the camera 56 a control instruction to be given to the camera 56, such as an instruction to capture an image. It should be noted that the camera 56 is also capable of capturing a moving image. That is, the camera 56 is also capable of repeatedly capturing images, and repeatedly outputting image data to the codec LSI 66.

The sound IC 68 is connected to the loudspeakers 67 and the microphone 69. The sound IC 68 is a circuit for controlling the input of audio data from the microphone 69 to the codec LSI 66 and the output of audio data from the codec LSI 66 to the loudspeakers 67. That is, when the sound IC 68 has received audio data from the codec LSI 66, the sound IC 68 outputs to the loudspeakers 67 an audio signal obtained by performing D/A conversion on the audio data, and causes a sound to be output from the loudspeakers 67. Further, the microphone 69 detects a sound conveyed to the terminal device 7 (e.g., the user's voice), and outputs an audio signal representing the sound to the sound IC 68. The sound IC 68 performs A/D conversion on the audio signal from the microphone 69, and outputs audio data in a predetermined form to the codec LSI 66.

The codec LSI 66 transmits the image data from the camera 56, the audio data from the microphone 69, and the operation data from the UI controller 65 as terminal operation data, to the game apparatus 3 through the wireless module 70. In the present embodiment, the codec LSI 66 performs a compression process, similar to that performed by the codec LSI 27, on the image data and the audio data. The terminal operation data and the compressed image data and audio data are output to the wireless module 70 as transmission data. The wireless module 70 is connected to the antenna 71, and the wireless module 70 transmits the transmission data to the game apparatus 3 through the antenna 71. The wireless module 70 has the same functions as those of the terminal communication module 28 of the game apparatus 3. That is, the wireless module 70 has the function of establishing connection with a wireless LAN by a method based on, for example, the IEEE 802.11n standard. The transmitted data may be encrypted where necessary, or may not be encrypted.

As described above, the transmission data transmitted from the terminal device 7 to the game apparatus 3 includes the operation data (terminal operation data), the image data, and the audio data. If another device is connected to the terminal device 7 via the extension connector 58, data received from said another device may be further included in the transmission data. Further, the infrared communication module 72 performs infrared communication based on, for example, the IRDA standard with another device. The codec LSI 66 may include, in the transmission data, data received by the infrared communication, and transmit the resulting transmission data to the game apparatus 3, where necessary.

In addition, as described above, the compressed image data and audio data are transmitted from the game apparatus 3 to the terminal device 7. The compressed image data and audio data are received by the codec LSI 66 through the antenna 71 and the wireless module 70. The codec LSI 66 decompresses the received image data and audio data. The decompressed image data is output to the LCD 51, and an image is displayed on the LCD 51. Meanwhile, the decompressed audio data is output to the sound IC 68, and the sound IC 68 causes a sound to be output from the loudspeakers 67.

In addition, when the control data is included in the data received from the game apparatus 3, the codec LSI 66 and the UI controller 65 give control instructions to each component in accordance with the control data. As described above, the control data represents control instructions to be given to each component (the camera 56, the touch panel controller 61, the marker section 55, the sensors 62 through 64, the infrared communication module 72, and the vibrator 79 in the present embodiment) included in the terminal device 7. In the present embodiment, possible control instructions represented by the control data may be an instruction to start and halt (stop) the operation of each component described above. That is, the components that are not used in the game may be halted in order to reduce power consumption. In this case, data from the halted components are not included in the transmission data transmitted from the terminal device 7 to the game apparatus 3. It should be noted that the marker section 55 is composed of infrared LEDs, and therefore may be controlled by simply turning on/off the supply of power thereto.

As described above, the terminal device 7 includes the operation means, namely the touch panel 52, the analog stick 53, and the operation buttons 54. Alternatively, in another embodiment, the terminal device 7 may include another operation means instead of, or in addition to, the above operation means.

In addition, the terminal device 7 includes the magnetic sensor 62, the acceleration sensor 63, and the gyro sensor 64 as sensors for calculating the motion (including the position and the attitude, or changes in the position and the attitude) of the terminal device 7. Alternatively, in another embodiment, the terminal device 7 may include only one or two of these sensors. Alternatively, in yet another embodiment, the terminal device 7 may include another sensor instead of, or in addition to, these sensors.

In addition, the terminal device 7 includes the camera 56 and the microphone 69. Alternatively, in another embodiment, the terminal device 7 may not include the camera 56 and the microphone 69, or may include only either one of the camera 56 and the microphone 69.

In addition, the terminal device 7 includes the marker section 55 as a component for calculating the positional relationship between the terminal device 7 and the main controller 8 (e.g., the position and/or the attitude of the terminal device 7 as viewed from the main controller 8). Alternatively, in another embodiment, the terminal device 7 may not include the marker section 55. In yet another embodiment, the terminal device 7 may include another means as a component for calculating the positional relationship described above. In yet another embodiment, for example, the main controller 8 may include a marker section, and the terminal device 7 may include an image pickup element. Further, in this case, the marker device 6 may include an image pickup element instead of the infrared LEDs.

[5. Overview of Game Processing]

Next, a description is given of an overview of the game processing performed in the game system 1 according to the present embodiment. A game according to the present embodiment is a game performed by a plurality of players. In the present embodiment, the game apparatus 3 is connected to one terminal device 7 and a plurality of main controllers 8 by wireless communication. It should be noted that in the game according to the present embodiment, sub-controllers 9 are not used for a game operation, and therefore do not need to be connected to the main controllers 8. It is, however, possible to perform the game in the state where the main controllers 8 and the sub-controllers 9 are connected together. Further, in the game according to the present embodiment, the number of main controllers 8 that can be connected to the game apparatus 3 is up to three.

In the present embodiment, one first player operates the terminal device 7, while a plurality of second players operate the main controllers 8. A description is given below of the case where the number of second players is two (a second player A and a second player B). Further, in the present embodiment, a television game image is displayed on the television 2, and a terminal game image is displayed on the terminal device 7.

Figure 12:
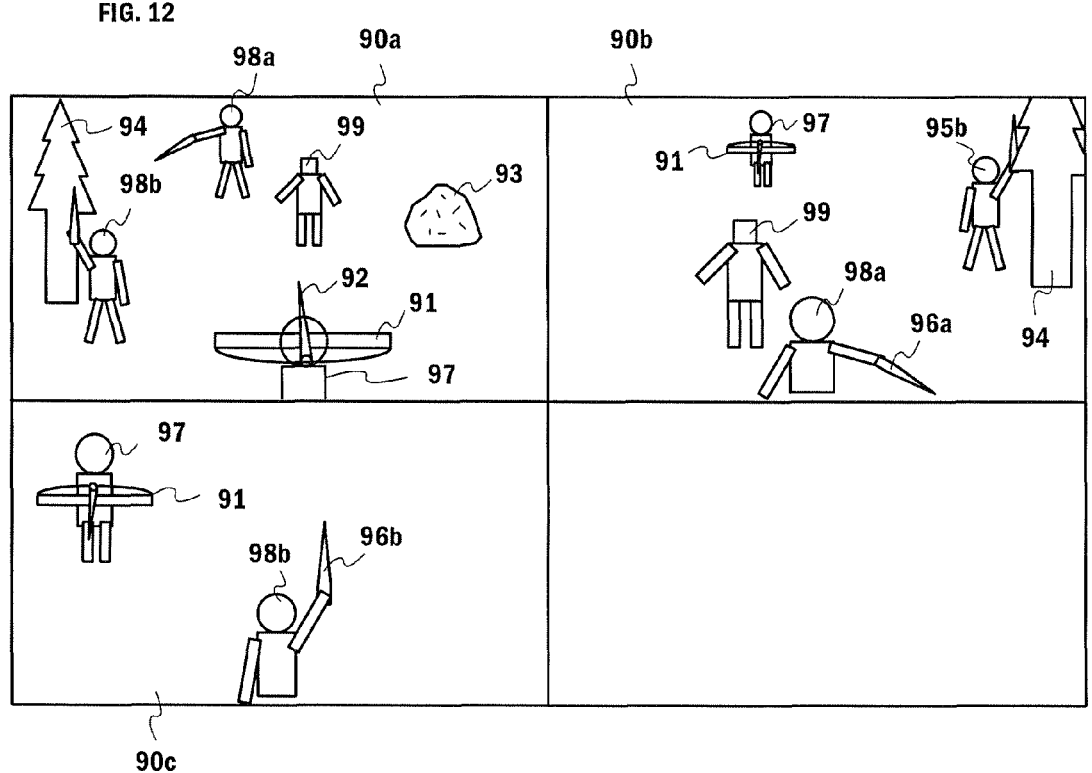
FIG. 12 is a diagram showing a non-limiting example of a television game image displayed on a television 2.
Figure 13:
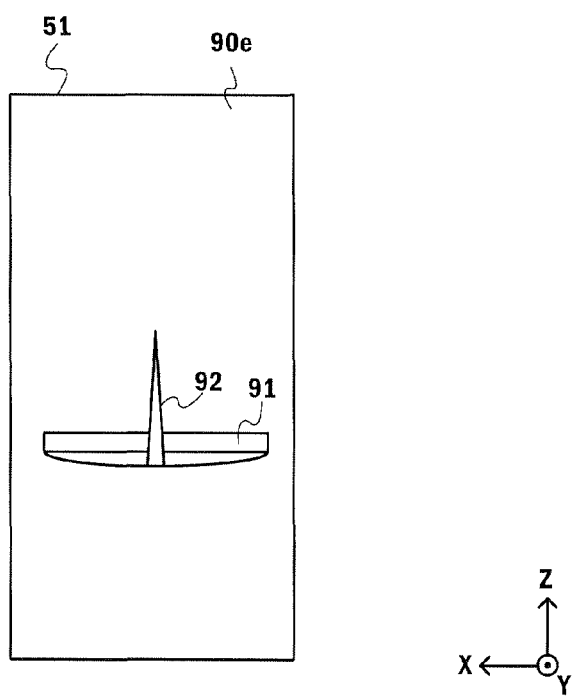
FIG. 13 is a diagram showing a non-limiting example of a terminal game image displayed on the terminal device 7.

FIG. 12 is a diagram showing a non-limiting example of the television game image displayed on the television 2. FIG. 13 is a diagram showing a non-limiting example of the terminal game image displayed on the terminal device 7.

As shown in FIG. 12, the following are displayed on the television 2: a first character 97; a second character 98*a*; a second character 98b; a bow object 91; an arrow object 92; a rock object 93; a tree object 94; a sword object 96a; a sword object 96b; and an enemy character 99.

The first character 97 is a virtual character located in a game space (virtual space), and is operated by the first player. The first character 97 holds the bow object 91 and the arrow object 92, and makes an attack on the enemy character 99 by firing the arrow object 92 into the game space. Further, the second character 98a is a virtual character located in the game space, and is operated by the second player A. The second character 98a holds the sword object 96a, and makes an attack on the enemy character 99, using the sword object 96a. Furthermore, the second character 98b is a virtual character located in the game space, and is operated by the second player B. The second character 98b holds the sword object 96b, and makes an attack on the enemy character 99, using the sword object 96b. The enemy character 99 is a virtual character controlled by the game apparatus 3. The game according to the present embodiment is a game whose object is for the first player, the second player A, and the second player B to cooperate to defeat the enemy character 99.

As shown in FIG. 12, on the television 2, images different from one another are displayed in the areas obtained by dividing the screen into four equal parts one above the other and side by side. Specifically, in the upper left area of the screen, an image 90a is displayed in which the game space is viewed from behind the first character 97 operated by the first player, using the terminal device 7. Specifically, the image 90a includes the first character 97, the bow object 91, and the arrow object 92. It should be noted that in the present embodiment, the first character 97 is displayed semi-transparently. Alternatively, the first character 97 may not be displayed. The image 90a is an image acquired by capturing the game space with a first virtual camera A set in the game space. A position in the game space is represented by coordinate values along each axis of a rectangular coordinate system (an xyz coordinate system) fixed in the game space. A y-axis is set in the vertically upward direction relative to the ground of the game space. An x-axis and a z-axis are set parallel to the ground of the game space. The first character 97 moves on the ground (the xz plane) of the game space while changing its facing direction (the facing direction parallel to the xz plane). The position and the facing direction (attitude) of the first character 97 in the game space are changed in accordance with a predetermined rule. It should be noted that the position and the attitude of the first character 97 may be changed in accordance with the operation performed on the terminal device 7 by the first player (e.g., the operation performed on the left analog stick 53A, or the operation performed on the cross button 54A). Further, the position of the first virtual camera A in the game space is defined in accordance with the position of the first character 97, and the attitude of the first virtual camera A in the game space is set in accordance with the attitude of the first character 97 and the attitude of the terminal device 7.

In addition, in the upper right area of the screen, an image 90b is displayed in which the game space is viewed from behind the second character 98a operated by the second player A, using a main controller 8a. The image 90b includes the second character 98a and the sword object 96a. It should be noted that in the present embodiment, the second character 98a is displayed semi-transparently. Alternatively, the second character 98a may not be displayed. The image 90b is an image acquired by capturing the game space with a first virtual camera B set in the game space. The second character 98a moves on the ground of the game space while changing its facing direction. The position and the facing direction (attitude) of the second character 98a are changed in accordance with a predetermined rule. It should be noted that the position and the attitude of the second character 98a may be changed in accordance with the operation performed on the main controller 8a by the second player A (e.g., the operation performed on the cross button 32a, or the operation performed on the analog joystick 81 if the sub-controller 9 is connected). Further, the position and the attitude of the first virtual camera B are defined in accordance with the position and the attitude of the second character 98a.

In addition, in the lower left area of the screen, an image 90c is displayed in which the game space is viewed from behind the second character 98b operated by the second player B, using a main controller 8b. The image 90c includes the second character 98b and the sword object 96b. It should be noted that in the present embodiment, the second character 98b is displayed semi-transparently. Alternatively, the second character 98b may not be displayed. The image 90c is an image acquired by capturing the game space with a first virtual camera C set in the game space. The second character 98b moves on the ground of the game space while changing its facing direction. The position and the facing direction (attitude) of the second character 98b are changed in accordance with a predetermined rule. It should be noted that the position and the attitude of the second character 98b may be changed in accordance with the operation performed on the main controller 8b by the second player B (e.g., the operation performed on the cross button 32a or the like). Further, the position and the attitude of the first virtual camera C are defined in accordance with the position and the attitude of the second character 98b. It should be noted that nothing is displayed in the lower right area of the screen; however, an image is displayed also in the lower right area of the screen when the number of second players are three.

It should be noted that the virtual cameras (the first virtual camera A through C) are set at predetermined positions behind the respective player characters (97, 98a, and 98b). Alternatively, the virtual cameras may be set to coincide with the viewpoints of the respective player characters.

Meanwhile, as shown in FIG. 13, on the terminal device 7, an image 90e is displayed that includes the bow object 91 and the arrow object 92. The image 90e is an image acquired by capturing the game space with a second virtual camera located in the game space. Specifically, the image 90e shown in FIG. 13 is an image in which the bow object 91 and the arrow object 92 are viewed from above in the game space. The second virtual camera is fixed to the bow object 91, and the position and the attitude of the second virtual camera in the game space are defined in accordance with the position and the attitude of the bow object 91.

As described above, the first player operates the terminal device 7 to thereby cause the first character 97 to fire the arrow object 92 into the game space. This causes the first character 97 to make an attack on the enemy character 99. Specifically, the first player changes the firing direction of the arrow object 92 and the capturing direction of the first virtual camera A by changing the attitude of the terminal device 7 from a reference attitude, and causes the arrow object 92 to be fired by performing a touch operation on the touch panel 52 of the terminal device 7.

Figure 14:
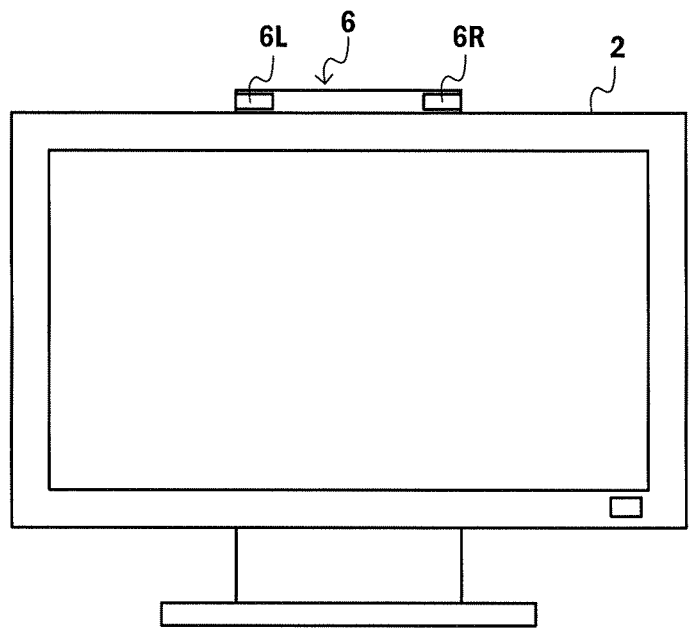
FIG. 14 is a diagram showing a non-limiting example of a reference attitude of the terminal device 7 when a game according to the present embodiment is performed.
Figure 14:
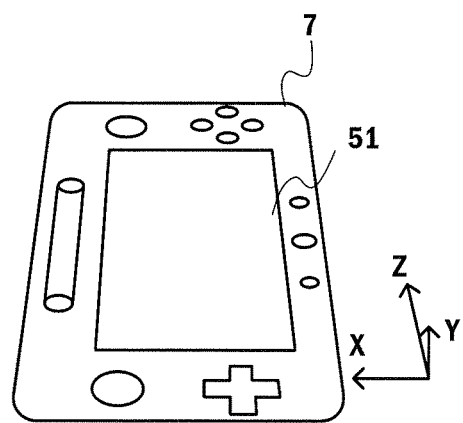

FIG. 14 is a diagram showing a reference attitude of the terminal device 7 when the game according to the present embodiment is performed. Here, the "reference attitude" is the attitude in which, for example, the screen of the LCD 51 of the terminal device 7 is horizontal to the ground, and the right side surface ((c) of FIG. 9) of the terminal device 7 is directed to the television 2. That is, the reference attitude is the attitude in which the Y-axis direction (the outward normal direction of the LCD 51) of the XYZ coordinate system based on the terminal device 7 coincides with the upward direction in real space, and the Z-axis (an axis parallel to the long side direction of the terminal device 7) is directed to the center of the screen of the television 2 (or the center of the image 90a).

As shown in FIG. 14, in an initial state, the terminal device 7 is held in the reference attitude by the first player. Then, the first player directs the terminal device 7 to the television 2 while viewing the game image displayed on the television 2, and also performs a touch operation on the touch panel 52 of the terminal device 7. The first player controls the firing direction (moving direction) of the arrow object 92 by changing the attitude of the terminal device 7 from the reference attitude to another attitude, and causes the arrow object 92 to be fired in the firing direction by performing a touch operation on the touch panel 52.

Figure 15:
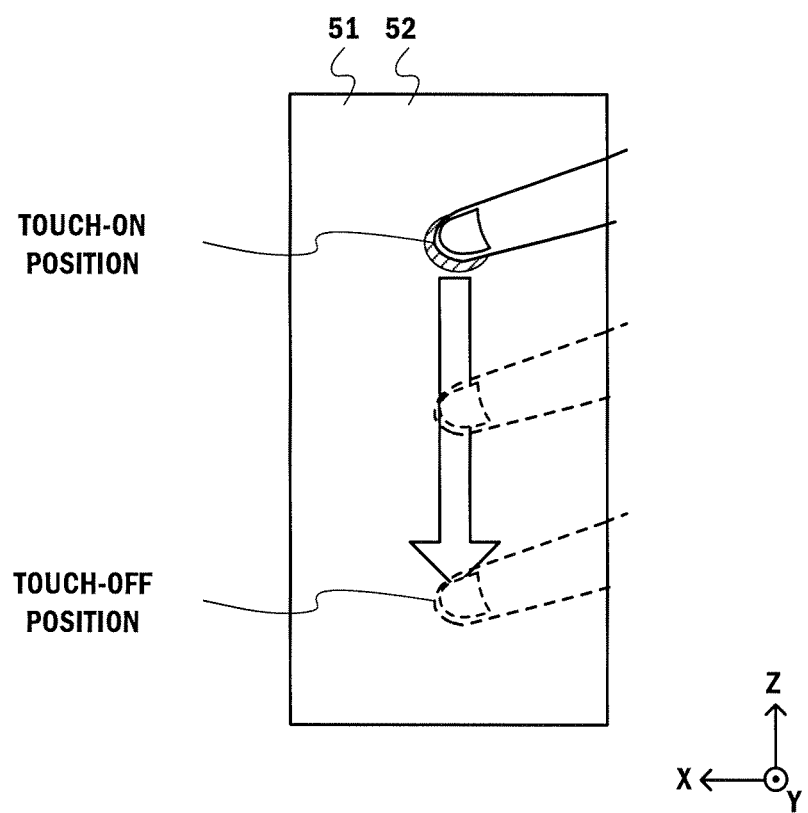
FIG. 15 is a diagram showing a non-limiting example of a touch operation performed on a touch panel 52 by a first player.

FIG. 15 is a diagram showing a non-limiting example of the touch operation performed on the touch panel 52 by the first player. It should be noted that in FIG. 15, the display of the bow object 91 and the arrow object 92 is omitted. As shown in FIG. 15, the first player performs a touch-on operation on a position on the touch panel 52 with their finger. Here, the touch-on operation is an operation of bringing the finger into contact with the touch panel 52 when the finger is not in contact with the touch panel 52. The position on which the touch-on operation has been performed is referred to as a "touch-on position". Next, the first player slides the finger in the direction of the arrow sign shown in FIG. 15 (the direction opposite to the direction of the television 2; the Z-axis negative direction) while maintaining the finger in contact with the touch panel 52. Then, the first player performs a touch-off operation on the touch panel 52. Here, the touch-off operation is an operation of separating (releasing) the finger from the touch panel 52 when the finger is in contact with the touch panel 52. The position on which the touch-off operation has been performed is referred to as a "touch-off position". In accordance with such a slide operation performed on the touch panel 52 by the first player, the image 90a displayed in the upper left area of the television 2 changes.

Figure 16A:
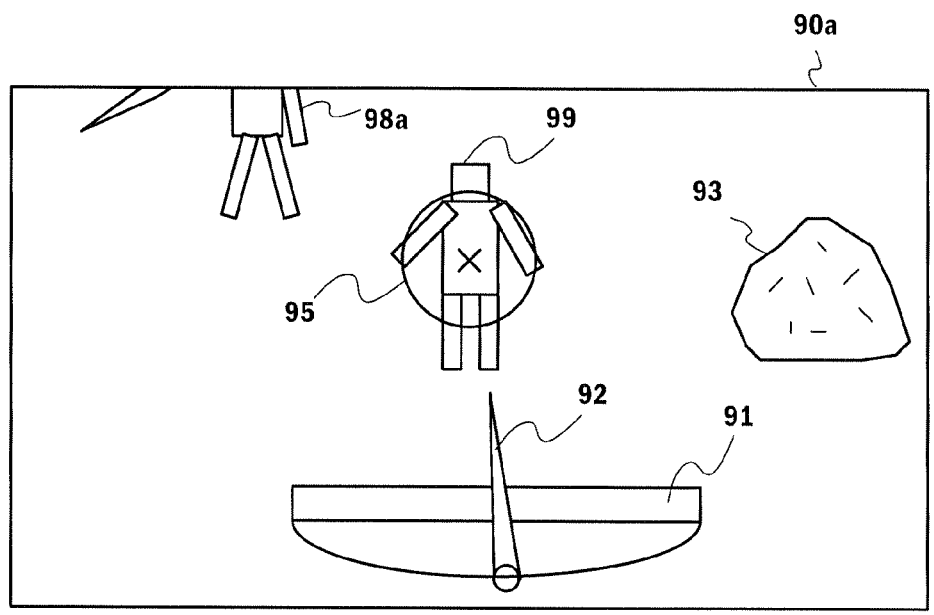
FIG. 16A is a diagram showing a non-limiting example of an image 90a displayed in an upper left area of the television 2 when, in the case where the first player has performed the touch operation on the touch panel 52, a finger of the first player is located between a touch-on position and a touch-off position.
Figure 16B:
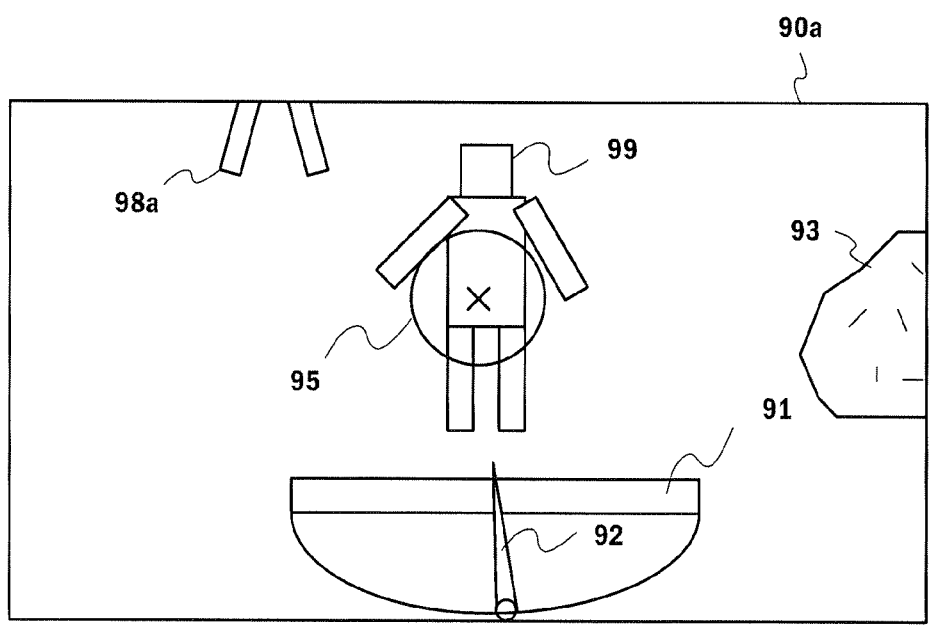
FIG. 16B is a diagram showing a non-limiting example of the image 90a displayed in the upper left area of the television 2 when, in the case where the first player has performed the touch operation on the touch panel 52, the finger of the first player is located at the touch-off position.

FIG. 16A is a diagram showing a non-limiting example of the image 90a displayed in the upper left area of the television 2 when, in the case where the first player has performed the touch operation on the touch panel 52, the finger of the first player is located between the touch-on position and the touch-off position. FIG. 16B is a diagram showing a non-limiting example of the image 90a displayed in the upper left area of the television 2 when, in the case where the first player has performed the touch operation on the touch panel 52, the finger of the first player is located at the touch-off position. It should be noted that in FIGS. 16A and 16B, the display of the first character 97 is omitted.

As shown in FIG. 16A, when the first player has brought their finger into contact with the touch panel 52, an aim 95 (an aim object 95) is displayed in the image 90a. The aim 95 has a circular shape, and the center of the circle indicates the position toward which the arrow object 92 will fly (the position of a target to be reached) when the arrow object 92 is fired into the game space. In the examples shown in FIGS. 16A and 16B, the center of the aim 95 is located on the enemy character 99. If the arrow object 92 is fired in this state, the arrow object 92 pierces the enemy character 99. It should be noted that the arrow object 92 may not necessarily reach the center of the aim 95, and the actual reached position may shift from the center of the aim 95 due to other factors (e.g., the effects of the force of gravity and wind). Further, the shape of the aim 95 is not limited to a circle, and may be any shape (a rectangle, a triangle, or a point).

In addition, when the first player has moved their finger in the direction of the arrow sign shown in FIG. 15 while maintaining the finger in contact with the touch panel 52, the zoom setting of the first virtual camera A changes in accordance with the moving distance of the finger. Specifically, when, as shown in FIG. 16A, the finger of the first player is located between the touch-on position and the touch-off position (see FIG. 15), the first virtual camera A zooms in, and the image 90a shown in FIG. 16A becomes an image obtained by enlarging a part of the game space in the image 90a shown in FIG. 12. Further, when, as shown in FIG. 16B, the first player has slid their finger to the touch-off position, the image 90a shown in FIG. 16B becomes an image obtained by further enlarging the part of the game space. It should be noted that the image 90a is an image displayed in the upper left area obtained by dividing the television 2 into four equal parts, and therefore, the size of the image 90a per se does not change in accordance with the moving distance described above.

In addition, as shown in FIGS. 16A and 16B, in accordance with the touch operation performed by the first player, the display of the bow object 91 and the arrow object 92 also changes. Specifically, the longer the moving distance of the finger, the closer the arrow object 92 is drawn to when displayed.

When the finger of the first player has separated from the touch panel 52, display is performed on the television 2 such that the arrow object 92 is fired and flies in the game space. Specifically, the arrow object 92 is fired from the current position of the arrow object 92 toward the position in the game space corresponding to the position indicated by the aim 95 in the image 90a, and flies in the game space.

Figure 17:
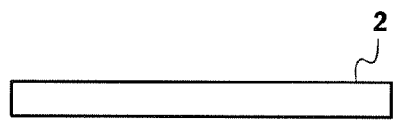
FIG. 17 is a diagram showing a non-limiting example of the terminal device 7 as viewed from above in real space when, in the case where the image 90a shown in FIG. 16A is displayed on the television 2, the terminal device 7 has been rotated about a Y-axis by an angle θ1 from the reference attitude.
Figure 17:
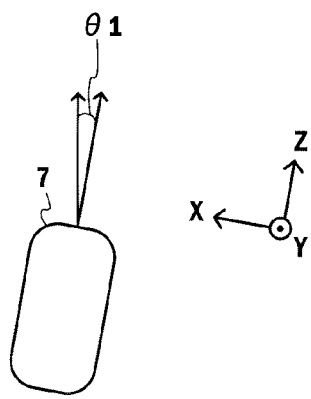
Figure 18:
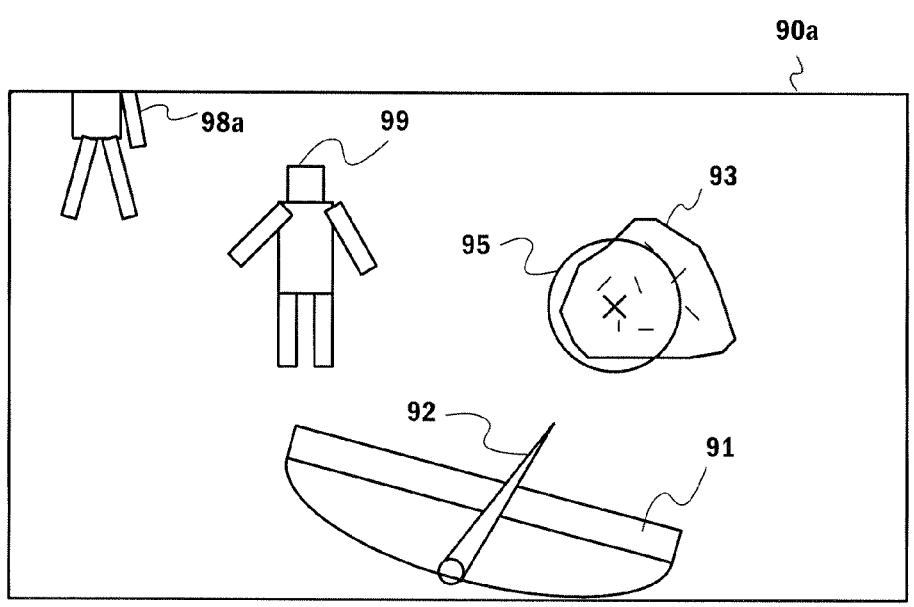
FIG. 18 is a diagram showing a non-limiting example of the image 90a displayed in the upper left area of the television 2 when, in the case where the image 90a shown in FIG. 16A is displayed on the television 2, the terminal device 7 has been rotated about the Y-axis by the angle θ1 from the reference attitude.

Next, a description is given of the case where the first player has changed the attitude of the terminal device 7. FIG. 17 is a diagram showing a non-limiting example of the terminal device 7 as viewed from above in real space when, in the case where the image 90a shown in FIG. 16A is displayed on the television 2, the terminal device 7 has been rotated about the Y-axis by an angle θ1 from the reference attitude. FIG. 18 is a diagram showing a non-limiting example of the image 90a displayed in the upper left area of the television 2 when, in the case where the image 90a shown in FIG. 16A is displayed on the television 2, the terminal device 7 has been rotated about the Y-axis by the angle θ1 from the reference attitude.

As shown in FIGS. 17 and 18, when the terminal device 7 has been rotated about the Y-axis by the angle θ1 from the reference attitude, the image 90a obtained by capturing a further rightward portion of the game space than the portion shown in FIG. 16A is displayed on the television 2. That is, when the attitude of the terminal device 7 has been changed such that the Z-axis of the terminal device 7 is directed to a position to the right of the center of the screen of the television 2 (or the center of the image 90a), the attitude of the first virtual camera A in the game space also changes. This causes the image 90a captured by the first virtual camera A to change.

Figure 19:
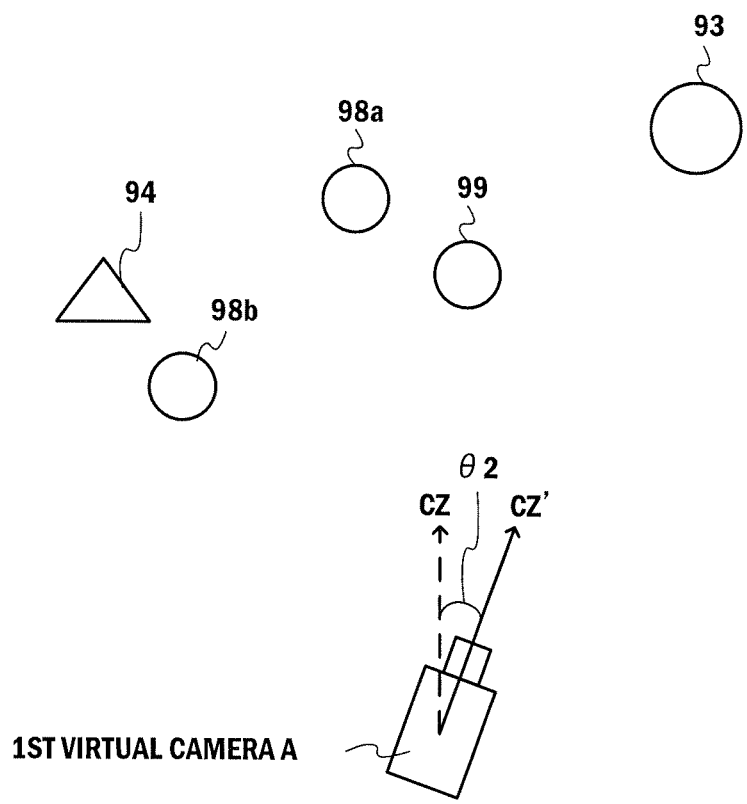
FIG. 19 is a diagram showing a non-limiting example of a first virtual camera A as viewed from above when the terminal device 7 has been rotated about the Y-axis by the angle θ1.

Specifically, when the terminal device 7 has been rotated about the Y-axis by the angle θ1 from the reference attitude, the capturing direction of the first virtual camera A (a CZ-axis direction of a coordinate system based on the first virtual camera A) rotates about the axis (y-axis) directed vertically upward in the game space. FIG. 19 is a diagram showing a non-limiting example of the first virtual camera A as viewed from above when the terminal device 7 has been rotated about the Y-axis by the angle θ1. In FIG. 19, an axis CZ indicates the capturing direction of the first virtual camera A when the terminal device 7 is in the reference attitude; and an axis CZ' indicates the capturing direction of the first virtual camera A when the terminal device 7 has been rotated about the Y-axis by the angle θ1. As shown in FIG. 19, when the terminal device 7 has been rotated about the Y-axis by the angle θ1, the first virtual camera A is rotated about the y-axis by an angle θ2 (>θ1). That is, the attitude of the first virtual camera A is changed such that the amount of change in the attitude of the first virtual camera A is greater than the amount of change in the attitude of the terminal device 7. Accordingly, for example, if the first player attempts to rotate the first virtual camera A by 90 degrees in order to cause the display of a portion of the game space that is to the right of the first character 97 and is not currently displayed, it is not necessary to rotate the terminal device 7 about the Y-axis by 90 degrees. In this case, the first player can rotate the first virtual camera A by 90 degrees and cause the display of a portion of the game space that is to the right of the first character 97 and is not currently displayed, by, for example, rotating the terminal device 7 about the Y-axis by only 45 degrees. This allows the first player to cause the display of an area, different from the currently displayed area of the game space, to be displayed on the first virtual camera A such that the direction in which the first player is directed does not shift significantly from the direction toward the screen of the television 2. This allows the first player to enjoy the game while viewing the screen of the television 2.

In addition, as shown in FIG. 18, the position of the aim 95 also changes in accordance with a change in the attitude of the terminal device 7. Specifically, when the terminal device 7 is in the reference attitude, the aim 95 is located at the center of the image 90a. When, however, the terminal device 7 has been rotated about the Y-axis by the angle θ1 from the reference attitude, the aim 95 also moves to a position to the right of the center of the image 90a. When the terminal device 7 has been further rotated about the Y-axis, the first virtual camera A further rotates, and the aim 95 also moves further to the right. When the terminal device 7 has been rotated about the Y-axis to a predetermined threshold, the angle of rotation of the first virtual camera A about the y-axis changes to the value corresponding to the predetermined threshold, and the aim 95 moves to the right end of the image 90a. Even if, however, the terminal device 7 has been rotated about the Y-axis so as to exceed the predetermined threshold, the angle of rotation of the first virtual camera A about the y-axis does not increase further, and the position of the aim 95 does not move further. This makes it unlikely that the first player operates the terminal device 7 such that the Z-axis of the terminal device 7 shifts significantly from the direction toward the television 2. This facilitates the operation of the terminal device 7.

As described above, the firing direction of the arrow object 92 is determined in accordance with the attitude of the terminal device 7, and the arrow object 92 is fired in accordance with the touch operation performed on the touch panel 52.

It should be noted that the second players swing the main controllers 8 to thereby cause the second characters to swing the sword objects 96. This causes each second character to make an attack on the enemy character 99. The attitudes of the sword objects 96 held by the second characters change in accordance with changes in the attitudes of the respective main controllers 8. For example, in the case where the main controller 8b is held such that the Z1-axis (see FIG. 3) of the main controller 8b is the direction opposite to the direction of gravity, the sword object 96b is directed in the y-axis direction in the game space. In this case, as shown in FIG. 12, display is performed such that the second character 98b raises the sword object 96b overhead. It should be noted that the sword objects 96 may be controlled in accordance not only with the attitudes of the main controllers 8, but also with the operations performed on operation buttons of the main controllers 8.

[6. Details of Game Processing]

Figure 20:
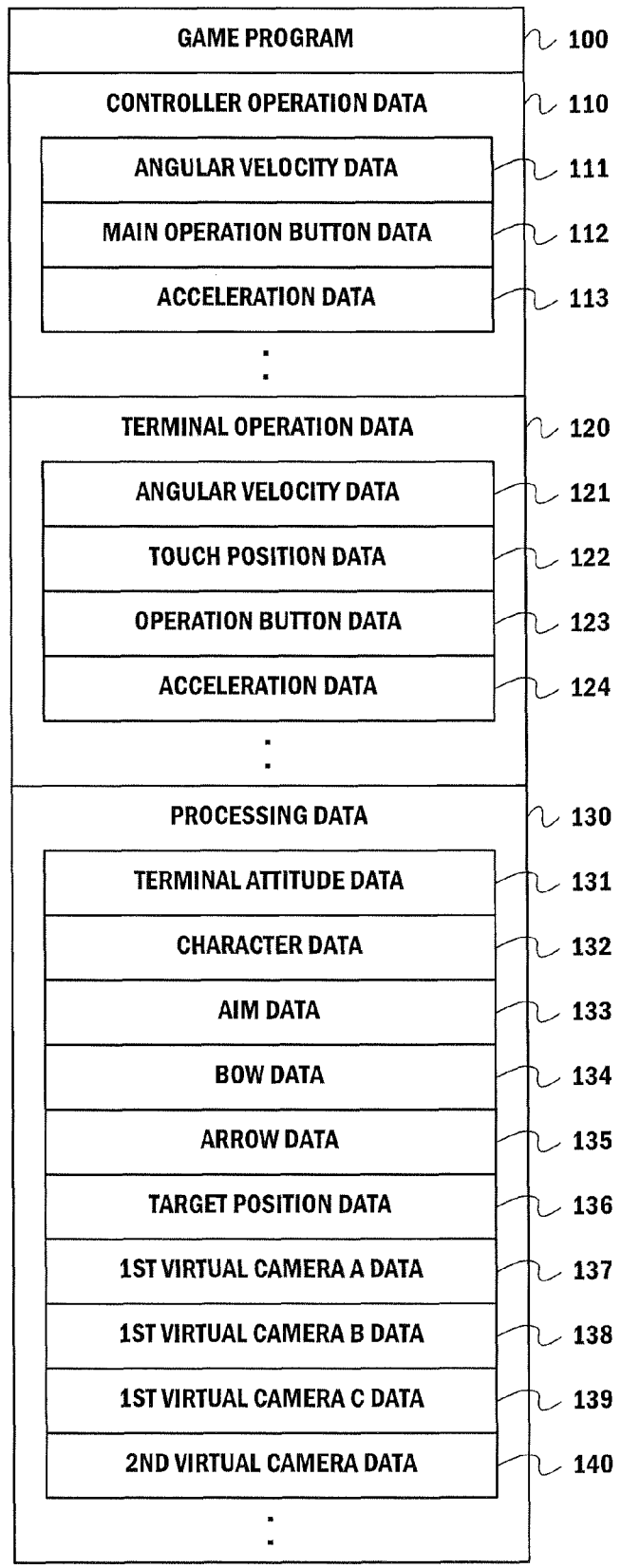
FIG. 20 is a diagram showing non-limiting various data used in game processing.

Next, a description is given of details of the game processing performed in the present game system. First, various data used in the game processing is described. FIG. 20 is a diagram showing non-limiting various data used in the game processing. FIG. 20 is a diagram showing main data stored in a main memory (the external main memory 12 or the internal main memory 11e) of the game apparatus 3. As shown in FIG. 20, the main memory of the game apparatus 3 stores a game program 100, controller operation data 110, terminal operation data 120, and processing data 130. It should be noted that the main memory stores, as well as the data shown in FIG. 20, data necessary for the game such as: image data of various objects that appear in the game; and audio data used in the game.

The game program 100 is stored in the main memory such that some or all of the game program 100 is loaded from the optical disk 4 at an appropriate time after the power to the game apparatus 3 has been turned on. It should be noted that the game program 100 may be acquired from the flash memory 17 or an external device of the game apparatus 3 (e.g., through the Internet), instead of from the optical disk 4. Further, some of the game program 100 (e.g., a program for calculating the attitudes of the main controller 8 and/or the terminal device 7) may be stored in advance in the game apparatus 3.

The controller operation data 110 is data representing the operation performed on each main controller 8 by a user (second player). The controller operation data 110 is output (transmitted) from the main controller 8 on the basis of the operation performed on the main controller 8. The controller operation data 110 is transmitted from the main controller 8, is acquired by the game apparatus 3, and is stored in the main memory. The controller operation data 110 includes angular velocity data 111, main operation button data 112, and acceleration data 113. It should be noted that the controller operation data 110 includes, as well as the above data, marker coordinate data indicating the coordinates calculated by the image processing circuit 41 of the main controller 8. Further, to acquire the operation data from a plurality of main controllers 8 (specifically, the main controllers 8a and 8b), the game apparatus 3 stores in the main memory the controller operation data 110 transmitted from each main controller 8. A predetermined number of pieces, starting from the most recent (the last acquired) one, of the controller operation data 110 may be stored in chronological order for each main controller 8.

The angular velocity data 111 is data representing the angular velocities detected by the gyro sensor 48 of the main controller 8. Here, the angular velocity data 111 represents the angular velocity about each axis of the X1-Y1-Z1 coordinate system (see FIG. 3) fixed in the main controller 8. Alternatively, in another embodiment, the angular velocity data 111 may only need to represent the angular velocities about one or more given axes. As described above, in the present embodiment, the main controller 8 includes the gyro sensor 48, and the controller operation data 110 includes the angular velocity data 111 as a physical amount used to calculate the attitude of the main controller 8. This enables the game apparatus 3 to accurately calculate the attitude of the main controller 8 on the basis of the angular velocities. Specifically, the game apparatus 3 can calculate the angle of rotation about each axis of the X1-Y1-Z1 coordinate system from an initial attitude by integrating, with respect to time, each of the angular velocities about the X1-axis, the Y1-axis, and the Z1-axis that have been detected by the gyro sensor 48.

The main operation button data 112 is data representing the input state of each of the operation buttons 32a through 32i provided in the main controller 8. Specifically, the main operation button data 112 represents whether or not each of the operation buttons 32a through 32i has been pressed.

The acceleration data 113 is data representing the accelerations detected by the acceleration sensor 37 of the main controller 8. Here, the acceleration data 113 represents the acceleration in each axis of the X1-Y1-Z1 coordinate system fixed in the main controller 8.

It should be noted that the controller operation data 110 may include data representing the operation performed on the sub-controller 9 by the player.

The terminal operation data 120 is data representing the operation performed on the terminal device 7 by a user (first player). The terminal operation data 120 is output (transmitted) from the terminal device 7 on the basis of the operation performed on the terminal device 7. The terminal operation data 120 is transmitted from the terminal device 7, is acquired by the game apparatus 3, and is stored in the main memory. The terminal operation data 120 includes angular velocity data 121, touch position data 122, operation button data 123, and acceleration data 124. It should be noted that the terminal operation data 120 includes, as well as the above data, the orientation data indicating the orientation detected by the magnetic sensor 62 of the terminal device 7. Further, when the game apparatus 3 acquires the terminal operation data from a plurality of terminal devices 7, the game apparatus 3 may store in the main memory the terminal operation data 120 transmitted from each terminal device 7.

The angular velocity data 121 is data representing the angular velocities detected by the gyro sensor 64 of the terminal device 7. Here, the angular velocity data 121 represents the angular velocity about each axis of the XYZ coordinate system (see FIG. 9) fixed in the terminal device 7. Alternatively, in another embodiment, the angular velocity data 121 may only need to represent the angular velocities about one or more given axes.

The touch position data 122 is data indicating the coordinates of the position (touch position) at which the touch operation has been performed on the touch panel 52 of the terminal device 7. The touch position data 122 includes, in addition to data indicating the coordinates of the most recent touch position, data indicating the coordinates of the touch positions detected in a predetermined period in the past. It should be noted that when the touch panel 52 has detected the touch position, the coordinate values of the touch position are in a predetermined range. When the touch panel 52 does not detect the touch position, the coordinate values of the touch position are predetermined values out of the range.

The operation button data 123 is data representing the input state of each of the operation buttons 54A through 54L provided in the terminal device 7. Specifically, the operation button data 123 represents whether or not each of the operation buttons 54A through 54L has been pressed.

The acceleration data 124 is data representing the accelerations detected by the acceleration sensor 63 of the terminal device 7. Here, the acceleration data 124 represents the acceleration in each axis of the XYZ coordinate system (see FIG. 9) fixed in the terminal device 7.

The processing data 130 is data used in the game processing (FIG. 21) described later. The processing data 130 includes terminal attitude data 131, character data 132, aim data 133, bow data 134, arrow data 135, target position data 136, first virtual camera A data 137, first virtual camera B data 138, first virtual camera C data 139, and second virtual camera data 140. It should be noted that the processing data 130 includes, as well as the data shown in FIG. 20, various data used in the game processing, such as data representing various parameters set for various objects that appear in the game.

The terminal attitude data 131 is data representing the attitude of the terminal device 7. The attitude of the terminal device 7, for example, may be represented by the rotation matrix representing the rotation from the reference attitude to the current attitude, or may be represented by three angles. The terminal attitude data 131 is calculated on the basis of the angular velocity data 121 included in the terminal operation data 120 from the terminal device 7. Specifically, the terminal attitude data 131 is calculated by integrating, with respect to time, each of the angular velocities about the X-axis, the Y-axis, and the Z-axis that have been detected by the gyro sensor 64. It should be noted that the attitude of the terminal device 7 may be calculated on the basis not only of the angular velocity data 121 indicating the angular velocities detected by the gyro sensor 64, but also of the acceleration data 124 representing the accelerations detected by the acceleration sensor 63, and of the orientation data indicating the orientation detected by the magnetic sensor 62. Alternatively, the attitude may be calculated by correcting, on the basis of the acceleration data and the orientation data, the attitude calculated on the basis of the angular velocities.

The character data 132 is data representing the position and the attitude of each character in the game space. Specifically, the character data 132 includes data representing the position and the attitude of the first character 97, data representing the position and the attitude of the second character 98a, and data representing the position and the attitude of the second character 98b.

The aim data 133 includes data indicating the position of the aim 95, and a flag indicating whether or not the aim 95 is to be displayed on the screen. The position of the aim 95 is a position in the image 90a displayed in the upper left area of the television 2, and is represented by coordinate values in an st coordinate system where: the origin is the center of the image 90a; an s-axis is set in the rightward direction; and a t-axis is set in the upward direction.

The bow data 134 is data indicating the position and the attitude (the position and the attitude in the game space) of the bow object 91. The position and the attitude of the bow object 91 are set in accordance with the position and the attitude of the first character 97, and the bow object 91 moves in accordance with the movement of the first character 97. Further, the attitude of the bow object 91 changes in accordance with the attitude of the terminal device 7.

The arrow data 135 includes data indicating the position and the attitude (the position and the attitude in the game space) of the arrow object 92, and data representing the state of movement of the arrow. The attitude of the arrow object 92 indicates the firing direction (moving direction) of the arrow object 92, and is represented by a three-dimensional vector in the game space. The firing direction of the arrow object 92 is the direction in which the arrow object 92 flies. Before being fired, the arrow object 92 moves in accordance with the movements of the first character 97 and the bow object 91. After being fired, the arrow object 92 moves in the firing direction from the position of the arrow object 92 when fired. Then, when the arrow object 92 has made contact with another object in the game space, the arrow object 92 stops at the position of the contact. The state of movement of the arrow is currently either in the state where the arrow object 92 has yet to be fired, or in the state where the arrow object 92 is moving. The arrow data 135 is data representing the position, the firing direction, and the state of movement of the arrow object 92, before the firing of the arrow object 92, and during the time from the firing to the stopping of the arrow object 92.

The target position data 136 is data indicating a target position in the game space, and is also data indicating the position of a target to be reached by the arrow object 92 in the game space. Specifically, the target position data 136 is data indicating the position in the game space calculated on the basis of the position of the aim 95 (the position represented by coordinate values in the st coordinate system).

The first virtual camera A data 137 includes: data indicating the position and the attitude of the first virtual camera A in the game space, the first virtual camera A set behind the first character 97; and data indicating the zoom setting of the first virtual camera A.

The first virtual camera B data 138 is data indicating the position and the attitude of the first virtual camera B in the game space, the first virtual camera B set behind the second character 98a.

The first virtual camera C data 139 is data indicating the position and the attitude of the first virtual camera C in the game space, the first virtual camera C set behind the second character 98b.

The second virtual camera data 140 is data indicating the position and the attitude of the second virtual camera fixed to the bow object 91. On the LCD 51 of the terminal device 7, an image (terminal game image) is displayed that is obtained by capturing the bow object 91 with the second virtual camera. The second virtual camera is fixed to the bow object 91, and therefore, the position and the attitude of the second virtual camera change in accordance with changes in the position and the attitude of the bow object 91.

Figure 21:
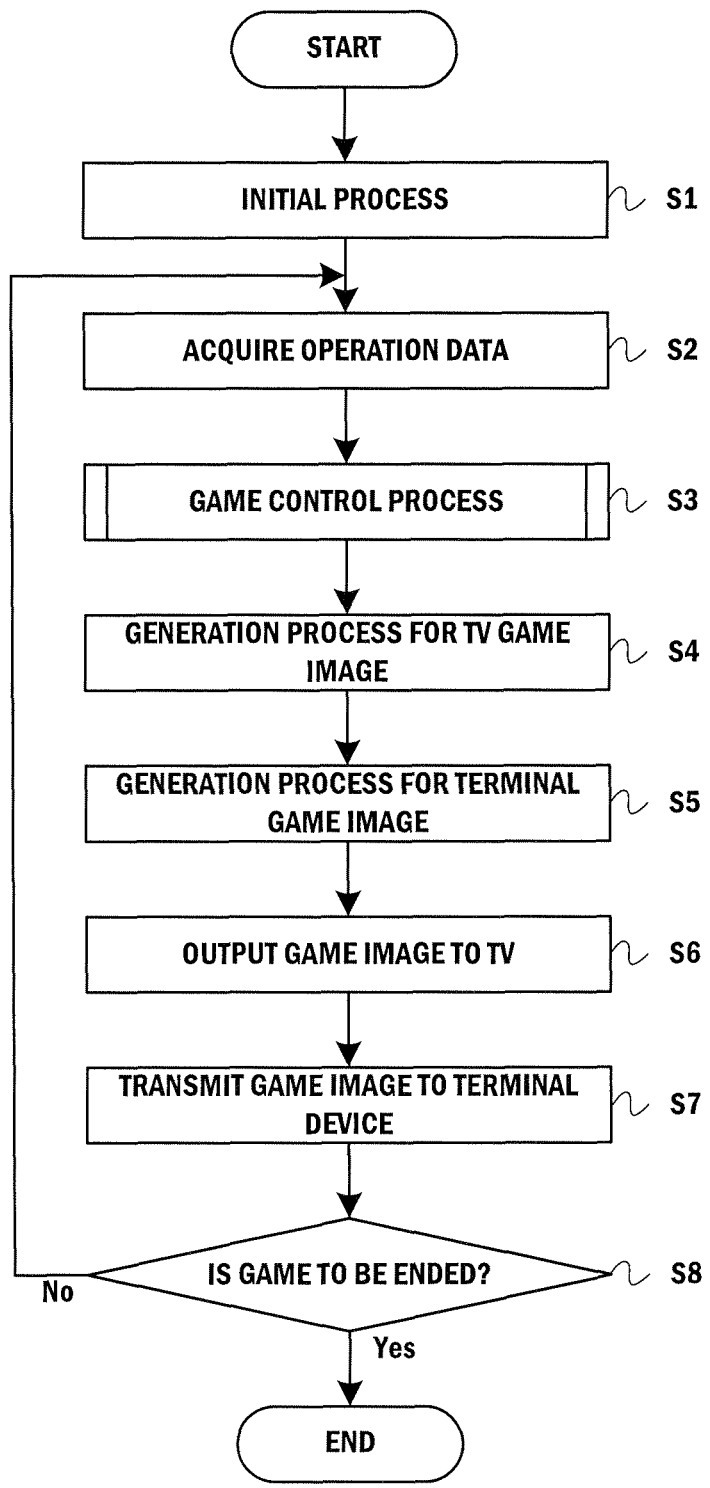
FIG. 21 is a main flow chart showing non-limiting exemplary steps of the game processing performed by the game apparatus 3.

Next, with reference to FIGS. 21 through 26, a description is given of details of the game processing performed by the game apparatus 3. FIG. 21 is a main flow chart showing non-limiting exemplary steps of the game processing performed by the game apparatus 3. When the power to the game apparatus 3 has been turned on, the CPU 10 of the game apparatus 3 executes a start-up program stored in the boot ROM not shown in the figures, thereby initializing units such as the main memory. Then, the game program stored in the optical disk 4 is loaded into the main memory, and the CPU 10 starts the execution of the game program. The flow chart shown in FIG. 21 is a flow chart showing the processes performed after the above processes have been completed. It should be noted that in the game apparatus 3, the game program may be executed immediately after the power to the game apparatus 3 has been turned on. Alternatively, after the power to the game apparatus 3 has been turned on, first, a stored program for displaying a predetermined menu screen may be executed. Thereafter, the game program may be executed, for example, in accordance with the giving of an instruction to start the game, as a result of the user performing a selection operation on the menu screen.

It should be noted that the processes of the steps in the flow chart shown in FIGS. 21 through 26 are merely illustrative. Alternatively, the processing order of the steps may be changed so long as similar results can be obtained. Further, the values such as variables and constants are also merely illustrative. Alternatively, other values may be employed where necessary. Furthermore, in the present embodiment, a description is given of the case where the CPU 10 performs the processes of the steps in the flow chart. Alternatively, a processor other than the CPU 10 or a dedicated circuit may perform the processes of some steps in the flow chart.

First, in step S1, the CPU 10 performs an initial process. The initial process is a process of: constructing a virtual game space; locating objects (the first and second characters, the bow object, the virtual cameras, and the like) that appear in the game space at initial positions; and setting the initial values of the various parameters used in the game processing. It should be noted that in the present embodiment, the first character 97 is located at a predetermined position and in a predetermined attitude, and the first virtual camera A, the bow object 91, the arrow object 92, and the second virtual camera are set in accordance with the position and the attitude of the first character 97. Further, the position and the attitude of the second character 98a are set, and the first virtual camera B is set in accordance with the position and the attitude of the second character 98a. Similarly, the position and the attitude of the second character 98b are set, and the first virtual camera C is set in accordance with the position and the attitude of the second character 98b.

In addition, in step S1, an initial process for the terminal device 7 and an initial process for each main controller 8 are performed. For example, on the television 2, an image is displayed that guides the first player to hold the terminal device 7 in the attitude shown in FIG. 14, and to press a predetermined operation button of the terminal device 7 while maintaining the attitude. Similarly, an image is displayed that guides, for example, the second player A and the second player B to each hold the corresponding main controller 8 in a predetermined attitude (e.g., the attitude in which the Z1-axis of the main controller 8 is directed to the television 2). Such an initial process for the terminal device 7 sets the reference attitude of the terminal device 7, and such an initial process for each main controller 8 sets the initial attitude of the main controller 8. That is, these initial processes set the angle of rotation of the terminal device 7 about each of the X, Y, and Z axes to 0, and set the angle of rotation of each main controller 8 about each of the X1, Y1, and Z1 axes to 0. When the initial process for the terminal device 7 has been completed as a result of the predetermined operation button of the terminal device 7 being pressed, and also when the initial process for each main controller 8 has been completed, the CPU 10 next performs the process of step S2. In step S2 and thereafter, a processing loop including a series of processes of steps S2 through S8 is executed every predetermined time (one frame time; 1/60 seconds, for example), and is repeated.

In step S2, the CPU 10 acquires the operation data transmitted from each of the terminal device 7 and the two main controllers 8. The terminal device 7 and the main controllers 8 each repeatedly transmit the operation data (the terminal operation data or the controller operation data) to the game apparatus 3. In the game apparatus 3, the terminal communication module 28 sequentially receives the terminal operation data, and the input/output processor 11a sequentially stores the received terminal operation data in the main memory. Further, the controller communication module 19 sequentially receives the controller operation data, and the input/output processor 11a sequentially stores the received controller operation data in the main memory. The interval between the transmission from each main controller 8 and the reception by the game apparatus 3, and the interval between the transmission from the terminal device 7 and the reception by the game apparatus 3, are preferably shorter than the processing time of the game, and is 1/200 seconds, for example. In step S2, the CPU 10 reads the most recent controller operation data 110 and the most recent terminal operation data 120 from the main memory. Subsequently to step S2, the process of step S3 is performed.

Figure 22:
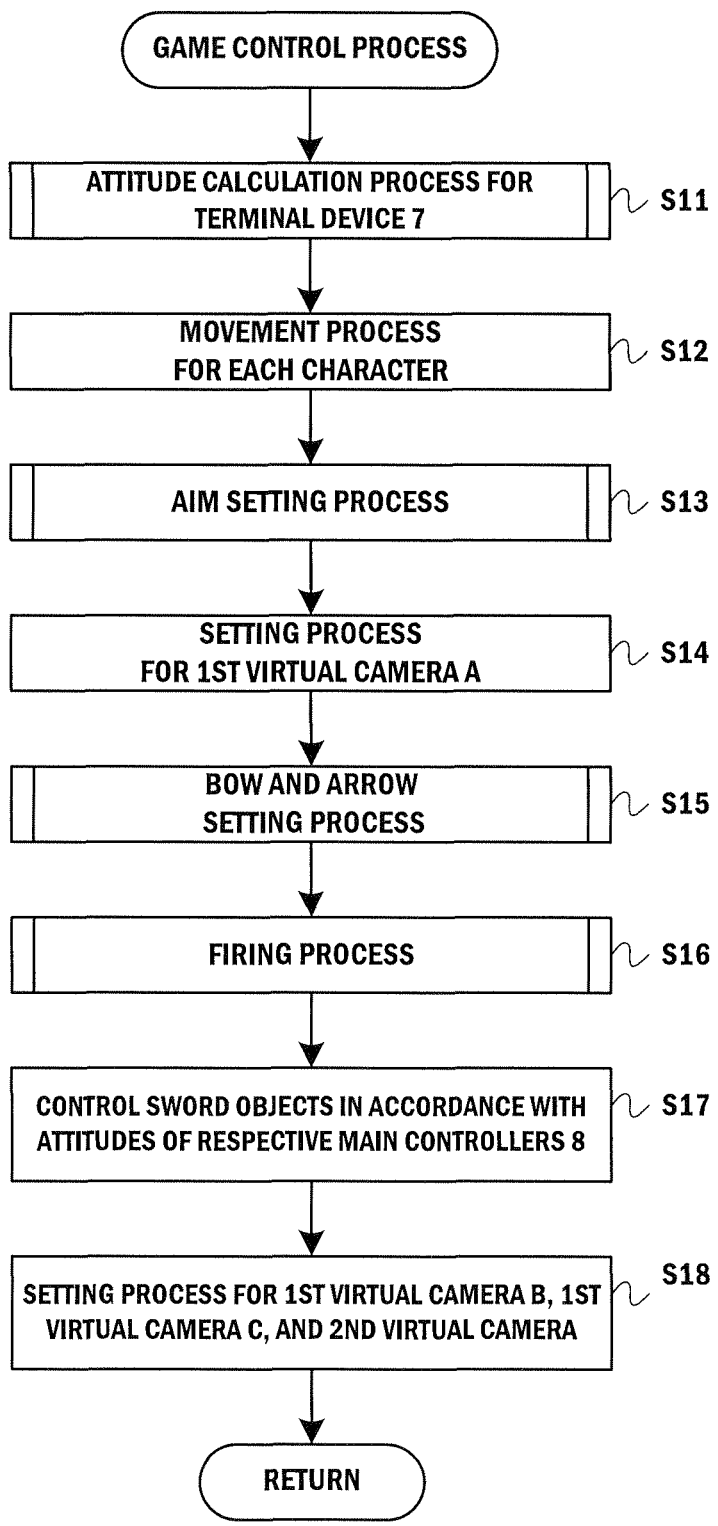
FIG. 22 is a flow chart showing non-limiting exemplary detailed steps of a game control process (step S3) shown in FIG. 21.

In step S3, the CPU 10 performs a game control process. The game control process is a process of advancing the game in accordance with the game operation performed by the player. Specifically, in the game control process according to the present embodiment, the following are performed in accordance mainly with the operation performed on the terminal device 7: a process of setting the aim 95; a process of setting the first virtual camera A; a process of setting the bow and the arrow; a firing process; and the like. With reference to FIG. 22, details of the game control process are described below.

FIG. 22 is a flow chart showing non-limiting exemplary detailed steps of the game control process (step S3) shown in FIG. 21.

Figure 23:
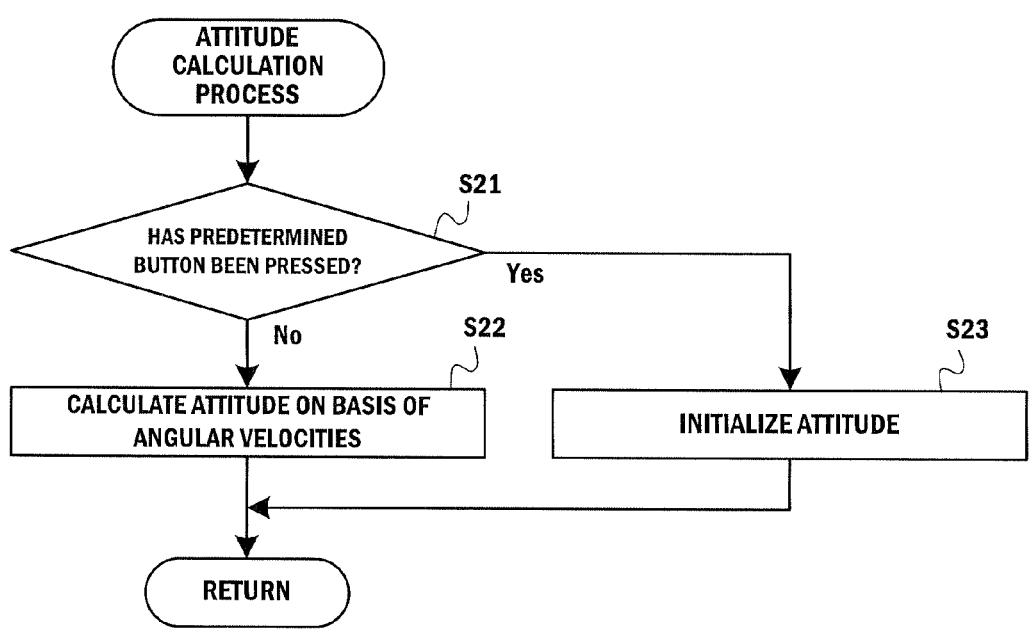
FIG. 23 is a flow chart showing non-limiting exemplary detailed steps of an attitude calculation process for the terminal device 7 (step S11) shown in FIG. 22.

In step S11, the CPU 10 performs an attitude calculation process for the terminal device 7. The attitude calculation process for the terminal device 7 in step S11 is a process of calculating the attitude of the terminal device 7 on the basis of the angular velocities included in the terminal operation data from the terminal device 7. With reference to FIG. 23, details of the attitude calculation process are described below. FIG. 23 is a flow chart showing detailed steps of the attitude calculation process for the terminal device 7 (step S11) shown in FIG. 22.

In step S21, the CPU 10 determines whether or not a predetermined button has been pressed. Specifically, with reference to the operation button data 123 of the terminal operation data 120 acquired in step S2, the CPU 10 determines whether or not a predetermined button (e.g., any one of the plurality of operation buttons 54) of the terminal device 7 has been pressed. When the determination result is negative, the CPU 10 next performs the process of step S22. On the other hand, when the determination result is positive, the CPU 10 next performs the process of step S23.

In step S22, the CPU 10 calculates the attitude of the terminal device 7 on the basis of the angular velocities. Specifically, the CPU 10 calculates the attitude of the terminal device 7 on the basis of the angular velocity data 121 acquired in step S2 and the terminal attitude data 131 stored in the main memory. More specifically, the CPU 10 calculates the angle of rotation about each axis (the X-axis, the Y-axis, and the Z-axis) obtained by multiplying, by one frame time, the angular velocity about each axis represented by the angular velocity data 121 acquired in step S2. The thus calculated angle of rotation about each axis is the angle of rotation about each axis of the terminal device 7 during the time from the execution of the previous processing loop until the execution of the current processing loop (the angle of rotation in one frame time). Next, the CPU 10 adds the calculated angle of rotation about each axis (the angle of rotation in one frame time) to the angle of rotation about each axis of the terminal device 7 indicated by the terminal attitude data 131, and thereby calculates the most recent angle of rotation about each axis of the terminal device 7 (the most recent attitude of the terminal device 7). It should be noted that the calculated attitude may be further corrected on the basis of the accelerations. Specifically, when the motion of the terminal device 7 is small, it is possible to assume the direction of the acceleration to be downward. Accordingly, the attitude may be corrected such that when the motion of the terminal device 7 is small, the downward direction of the attitude calculated on the basis of the angular velocities approximates the direction of the acceleration. Then, the CPU 10 stores, as the terminal attitude data 131 in the main memory, the most recent attitude of the terminal device 7 that has been calculated. The most recent attitude of the terminal device 7 calculated as described above indicates the angle of rotation about each axis of the terminal device 7 from the reference attitude, on the condition that the attitude when initialized (when initialized in step S1 or when initialized in step S23 described next) is defined as the reference attitude. Specifically, the terminal attitude data 131 indicating the attitude of the terminal device 7 is data representing the rotation matrix. After the process of step S22, the CPU 10 ends the attitude calculation process shown in FIG. 23.

In step S23, the CPU 10 initializes the attitude of the terminal device 7. Specifically, the CPU 10 sets the angle of rotation about each axis of the terminal device 7 to 0, and stores the set angle of rotation as the terminal attitude data 131 in the main memory. The process of step S23 is a process of setting, as the reference attitude, the attitude when a predetermined button of the terminal device 7 has been pressed. That is, it can be said that the predetermined button described above is a button set as a button for resetting the attitude. After the process of step S23, the CPU 10 ends the attitude calculation process shown in FIG. 23.

Referring back to FIG. 22, next, the process of step S12 is performed. In step S12, the CPU 10 performs a movement process for each character (the first character 97, the second character 98a, the second character 98b, and the enemy character 99). Specifically, the CPU 10 updates the character data 132 to thereby update the positions and the attitudes of the first character 97, the second character 98a, and the second character 98b in the game space. The positions and the attitudes of the first character 97, the second character 98a, and the second character 98b may be updated using a predetermined algorithm, or may be updated on the basis of the operations performed by the respective players (the operations performed on the terminal device 7 and the main controllers 8). For example, the first character 97 may move in the game space in accordance with the direction indicated by the cross button 54A of the terminal device 7 or the direction indicated by the left analog stick 53A of the terminal device 7. Further, the CPU 10 also updates the position and the attitude of the bow object 91 in accordance with the updates of the position and the attitude of the first character 97. It should be noted that the position and the attitude of the bow object 91 may be adjusted in accordance with, for example, the operation performed on the cross button 54A, the left analog stick 53A, the touch panel 52, or the like of the terminal device 7. For example, using a predetermined algorithm, the position and the attitude of the first character 97 may be set, and also the position and the attitude of the bow object 91 may be set. Then, the position and the attitude of the bow object 91 may be adjusted in accordance with the operation performed on the terminal device 7 by the first player (a direction input operation, a touch operation, a button operation, or the like).

In addition, if the arrow object 92 has yet to be fired, the CPU 10 also updates the position and the attitude of the arrow object 92 in accordance with the updates of the position and the attitude of the first character 97 (the bow object 91). Further, the CPU 10 also updates the positions of the first virtual camera A, the first virtual camera B, the first virtual camera C, and the second virtual camera in accordance with the updates of the positions of the first character 97, the second character 98a, and the second character 98b. Specifically, in accordance with the position of the first character 97, the CPU 10 sets the position of the first virtual camera A at a predetermined position in the direction opposite to the attitude (facing direction) of the first character 97. Similarly, the CPU 10 sets the position of the first virtual camera B in accordance with the position of the second character 98a, and sets the position of the first virtual camera C in accordance with the position of the second character 98b. Further, the CPU 10 updates the position and the attitude of the enemy character 99 using a predetermined algorithm. Next, the CPU 10 performs the process of step S13.

Figure 24:
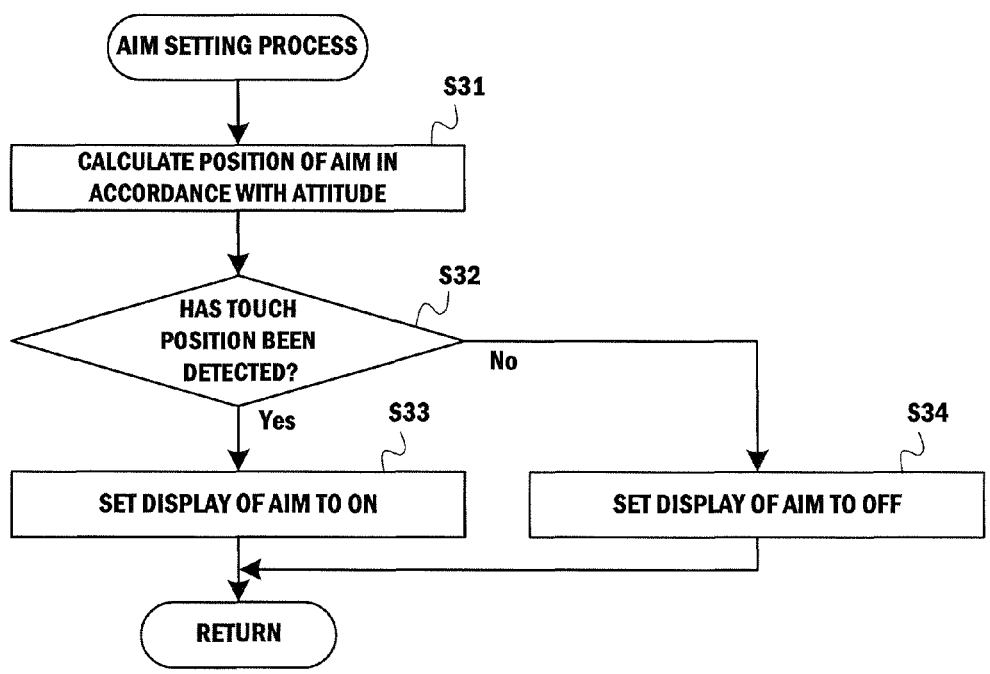
FIG. 24 is a flow chart showing non-limiting exemplary detailed steps of an aim setting process (step S13) shown in FIG. 22.

In step S13, the CPU 10 performs an aim setting process. The aim setting process in step S13 is a process of setting the aim 95 on the basis of the terminal operation data from the terminal device 7. With reference to FIG. 24, details of the aim setting process are described below. FIG. 24 is a flow chart showing non-limiting exemplary detailed steps of the aim setting process (step S13) in FIG. 22.

Figure 27:
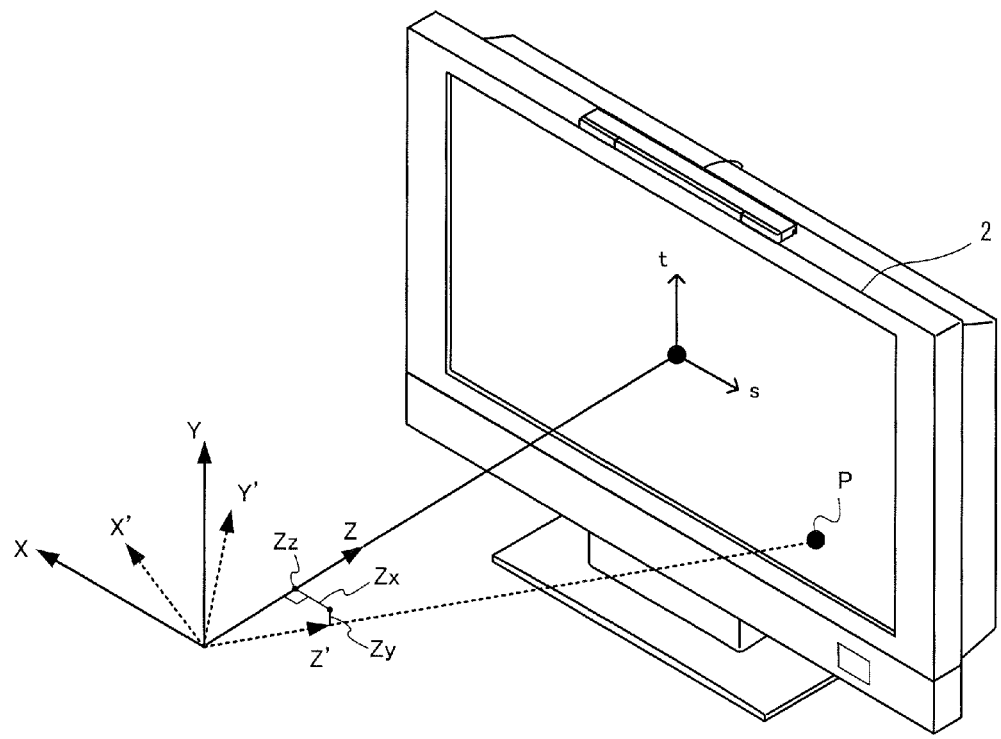
FIG. 27 is a diagram illustrating a non-limiting exemplary calculation method of the position of an aim 95 corresponding to the attitude of the terminal device 7.

In step S31, the CPU 10 calculates the position of the aim 95 in accordance with the attitude of the terminal device 7. Specifically, the CPU 10 calculates the position of the aim 95 in accordance with the attitude of the terminal device 7 that has been calculated in step S11. With reference to FIG. 27, a description is given of the position of the aim 95 that is calculated in step S31.

FIG. 27 is a diagram illustrating a non-limiting exemplary calculation method of the position of the aim 95 corresponding to the attitude of the terminal device 7. In FIG. 27, the X, Y, and Z axes indicated by solid lines represent the attitude (reference attitude) of the terminal device 7 before the attitude is changed; and the X', Y', and Z' axes indicated by dashed lines represent the attitude of the terminal device 7 after the attitude has been changed. The CPU 10 calculates the coordinates (s, t) on the basis of the following formulas (1) and (2).

$$s = (-Zx/Zz) \times k \quad (1)$$

$$t = (Zy/Zz) \times k \quad (2)$$

Here, when the components of a unit vector along the Z'-axis, which is used to represent a changed attitude of the terminal device 7, are transformed into the XYZ coordinate system that is used to represent the reference attitude of the device; Zz is the Z-axis coordinate value of the transformed vector. When the components of the unit vector along the Z'-axis, which is used to represent a changed attitude of the terminal device 7, are transformed into the XYZ coordinate system that is used to represent the reference attitude of the device; Zx is the X-axis coordinate value of the transformed vector. When the components of the unit vector along the Z'-axis, which is used to represent a changed attitude of the terminal device 7, are transformed into the XYZ coordinate system that is used to represent the reference attitude of the device; Zy is the Y-axis coordinate value of the transformed vector. More specifically, Zx, Zy, and Zz are each acquired on the basis of the rotation matrix indicating the attitude of the terminal device 7 calculated in step S11. Further, k is a predetermined coefficient. Specifically, k is a parameter for adjusting the degree of change in the position of the aim 95 in accordance with a change in the attitude of the terminal device 7. The case is considered where k is less than 1 (e.g., 0.1). Even if the attitude of the terminal device 7 is changed significantly from the reference attitude, the position of the aim 95 does not change significantly from the center of the image 90a. On the other hand, the case is considered where k is greater than 1 (e.g., 10). If the attitude of the terminal device 7 is changed even slightly from the reference attitude, the position of the aim 95 changes significantly from the center of the image 90a. In the present embodiment, k is set to 2, for example. It should be noted that the values of k in the formulas (1) and (2) may be different from each other.

It should be noted that the values s and t are set in predetermined ranges. If the values calculated by the formulas (1) and (2) exceed the respective ranges, the values s and t are each set at the upper limit or the lower limit (a boundary) of the corresponding range.

In the case where k is set to 1, the coordinates (s, t) calculated on the basis of the formulas (1) and (2) indicate a position on the screen of the television 2. For example, the coordinates (0, 0) indicate the center of the screen. As shown in FIG. 27, in the case where k is set to 1, the coordinates (s, t) indicate a point P which is the intersection of the screen of the television 2 and an imaginary line from the Z'-axis of the coordinate system fixed in the terminal device 7 in a changed attitude. The CPU 10 stores, as the position of the aim 95 of the aim data 133 in the main memory, the coordinates (s, t) calculated on the basis of the formulas (1) and (2). Next, the CPU 10 performs the process of step S32.

In step S32, the CPU 10 determines whether or not the touch panel 52 has detected the touch position. Specifically, with reference to the touch position data 122 of the terminal operation data 120 acquired in step S2, the CPU 10 determines whether or not the touch panel 52 has detected the touch position. When the touch panel 52 has not detected the touch position, a value indicating that the touch position has not been detected is stored in the touch position data 122. This enables the CPU 10 to determine, with reference to the touch position data 122, whether or not the touch panel 52 has detected the touch position. When the determination result is positive, the CPU 10 next performs the process of step S33. On the other hand, when the determination result is negative, the CPU 10 next performs the process of step S34.

In step S33, the CPU 10 sets the display of the aim 95 to on. Specifically, the CPU 10 sets the flag to on, the flag included in the aim data 133 and indicating whether or not the aim 95 is to be displayed on the screen. Thereafter, the CPU 10 ends the aim setting process shown in FIG. 24.

In step S34, the CPU 10 sets the display of the aim 95 to off. Here, the touch operation has not been performed on the touch panel 52, and therefore, the CPU 10 sets the display of the aim 95 to off in order to prevent the aim 95 from being displayed on the screen. Specifically, the CPU 10 sets the flag to off, the flag included in the aim data 133 and indicating whether or not the aim 95 is to be displayed on the screen. Thereafter, the CPU 10 ends the aim setting process shown in FIG. 24.

Referring back to FIG. 22, after the process of step S13, the CPU 10 next performs the process of step S14.

In step S14, the CPU 10 performs a setting process for the first virtual camera A. Here, the CPU 10 sets in the game space the attitude of the first virtual camera A set behind the first character 97, and also performs the zoom setting of the first virtual camera A. Specifically, the CPU 10 calculates: a unit vector CZ indicating the capturing direction of the first virtual camera A; a unit vector CX directed leftward relative to the capturing direction of the first virtual camera A; and a unit vector CY directed upward relative to the capturing direction of the first virtual camera A. More specifically, on the basis of the following formulas (3) through (5), the CPU 10 first calculates a unit vector CZ' indicating the capturing direction of the first virtual camera A based on the attitude of the first character 97.

$$CZ'x = -(s/k) \times \text{scale} \quad (3)$$

$$CZ'y = (t/k) \times \text{scale} \quad (4)$$

$$CZ'z = 1 \quad (5)$$

The CPU 10 normalizes (sets to 1 the length of) the vector CZ' calculated by the formulas (3) through (5), and thereby calculates the unit vector CZ'.

Here, a coefficient "scale" is a predetermined value, and is set to 2, for example. When the coefficient "scale" is set to less than 1, the amount of change in the attitude of the first virtual camera A is less than the amount of change in the attitude of the terminal device 7. On the other hand, when the coefficient "scale" is set to greater than 1, the amount of change in the attitude of the first virtual camera A is greater than the amount of change in the attitude of the terminal device 7. It should be noted that the values of "scale" in the formulas (3) and (4) may be different from each other.

After having calculated the vector CZ', the CPU 10 calculates the exterior product of a unit vector directed upward in the game space (a unit vector along the y-axis direction) and the vector CZ', and thereby calculates a vector orthogonal to, and directed leftward relative to, the capturing direction of the first virtual camera A. Then, the CPU 10 normalizes the calculated vector, and thereby calculates a unit vector CX'. Further, the CPU 10 calculates and normalizes the exterior product of the vector CZ' and the vector CX', and thereby calculates a unit vector CY' directed upward relative to the capturing direction of the first virtual camera A. As described above, the three vectors CX', CY', and CZ' are calculated that indicate the attitude of the first virtual camera A based on the attitude of the first character 97. Then, the CPU 10 performs a coordinate transformation (a coordinate transformation in which the coordinate system fixed in the first character 97 is transformed into the xyz coordinate system fixed in the game space) on the three calculated vectors CX', CY', and CZ', and thereby calculates the three vectors CX, CY, and CY indicating the attitude of the first virtual camera A in the game space. The CPU 10 stores the calculated attitude of the first virtual camera A in the game space, as the first virtual camera A data 137 in the main memory.

In addition, in step S14, the CPU 10 performs the zoom setting of the first virtual camera A. Specifically, when the display of the aim 95 is set to on (i.e., when it is determined in step S32 that the touch position has been detected), the CPU 10 performs the zoom setting of the first virtual camera A with reference to the touch position data 122. More specifically, with reference to the touch position data 122, the CPU 10 calculates the distance (a sliding distance) between the position at which the touch-on operation has been performed in the past and the most recent touch position. Then, in accordance with the calculated distance, the CPU 10 performs the zoom setting (adjusts the range of the field of view) of the first virtual camera A while maintaining the position of the first virtual camera A. Consequently, display is performed in the upper left area of the television 2 such that the longer the distance of the slide operation performed on the touch panel 52, the more enlarged (zoomed in) the game space is. After the process of step S14, the CPU 10 next performs the process of step S15.

Figure 25:
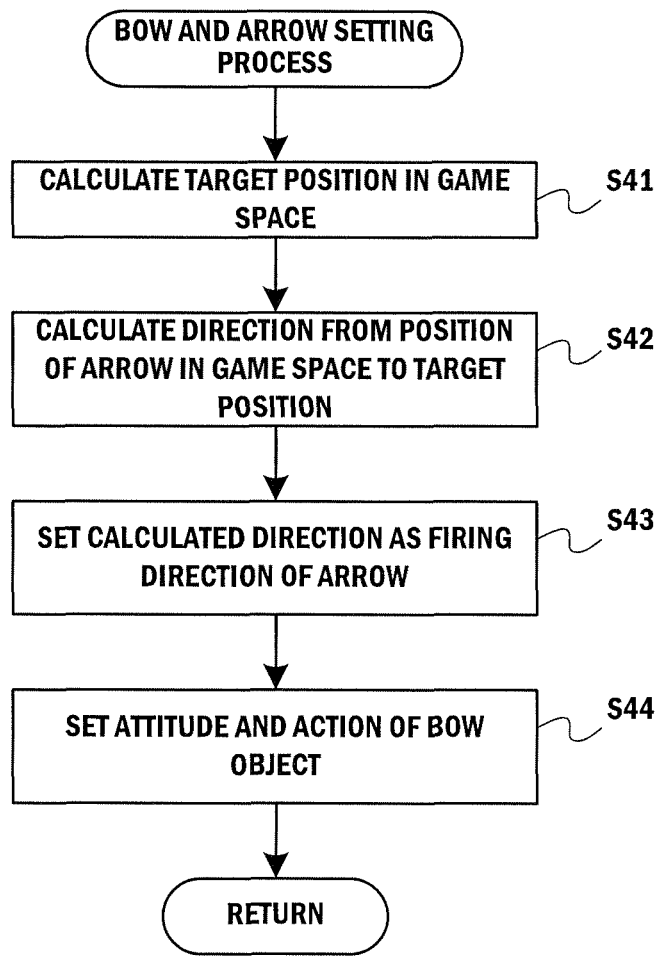
FIG. 25 is a flow chart showing non-limiting exemplary detailed steps of a bow and arrow setting process (step S15) shown in FIG. 22.

In step S15, the CPU 10 performs a bow and arrow setting process. The process of step S15 is a process of calculating the attitudes of the bow object 91 and the arrow object 92 on the basis of the attitude of the terminal device 7. With reference to FIG. 25, details of the bow and arrow setting process are described below. FIG. 25 is a flow chart showing non-limiting exemplary detailed steps of the bow and arrow setting process (step S15) shown in FIG. 22.

In step S41, the CPU 10 calculates a target position in the game space. The target position in the game space is the position in the game space (coordinate values in the xyz coordinate system) corresponding to the position of the aim 95 calculated in step S13 (coordinate values in the st coordinate system). Specifically, with reference to the aim data 133 and the first virtual camera A data 137, the CPU 10 calculates the target position in the game space. As described above, the position (a two-dimensional position) of the aim 95 indicated by the aim data 133 represents a position in the image obtained by capturing the game space with the first virtual camera A. The CPU 10 can calculate the position in the game space (a three-dimensional position) corresponding to the position of the aim 95, on the basis of the position (a two-dimensional position) of the aim 95 and the position and the attitude of the first virtual camera A. For example, the CPU 10 calculates a three-dimensional straight line extending in the capturing direction of the first virtual camera A from the position, on a virtual plane in the game space (the virtual plane is a plane perpendicular to the capturing direction of the first virtual camera A), corresponding to the position of the aim 95. Then, the CPU 10 may calculate, as the target position in the game space, the position where the three-dimensional straight line is in contact with an object in the game space. Further, for example, the CPU 10 may calculate the position in the game space corresponding to the position of the aim 95 on the basis of: the depth values of pixels at the position of the aim 95 in the image obtained by capturing the game space with the first virtual camera A; and the position of the aim 95. On the basis of the position and the attitude of the first virtual camera A in the game space and the position of the aim 95, the CPU 10 can calculate CX coordinate values and CY coordinate values in the coordinate system based on the first virtual camera A (the coordinate system whose axes are the CX axis, the CY axis, and the CZ axis calculated in step S14). Furthermore, on the basis of the depth values, the CPU 10 can calculate CZ coordinate values in the coordinate system based on the first virtual camera A. The thus calculated position in the game space corresponding to the position of the aim 95 may be calculated as the target position. The CPU 10 stores the calculated target position as the target position data 136 in the main memory, and next performs the process of step S42.

In step S42, the CPU 10 calculates the direction from the position of the arrow object 92 in the game space to the target position calculated in step S41. Specifically, the CPU 10 calculates a vector whose starting point is the position of the arrow object 92 indicated by the arrow data 135 and whose end point is the target position calculated in step S41. Next, the CPU 10 performs the process of step S43.

In step S43, the CPU 10 sets the direction calculated in step S42, as the firing direction of the arrow object 92. Specifically, the CPU 10 stores the calculated vector in the main memory as data included in the arrow data 135 and indicating the attitude (firing direction) of the arrow object 92. Next, the CPU 10 performs the process of step S44.

Figure 28A:
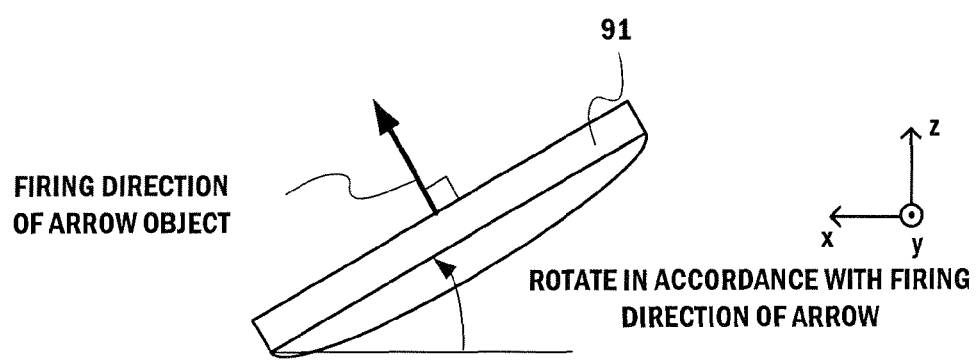
FIG. 28A is a diagram showing a non-limiting example of a bow object 91 as viewed from above in a game space.
Figure 28B:
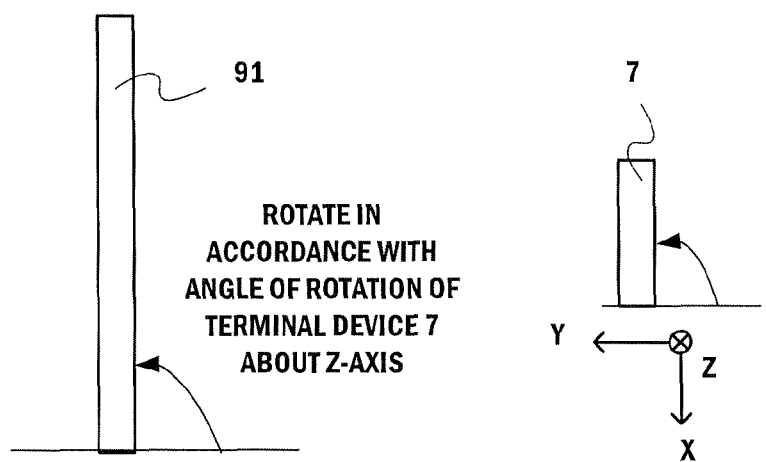
FIG. 28B is a diagram showing a non-limiting example of the bow object 91 as viewed from directly behind (from the first virtual camera A).

In step S44, the CPU 10 sets the attitude of the bow object 91 and the action of the bow object 91. Specifically, the CPU 10 sets the attitude of the bow object 91 on the basis of the firing direction of the arrow object 92 and the rotation of the terminal device 7 about the Z-axis. FIG. 28A is a diagram showing a non-limiting example of the bow object 91 as viewed from above in the game space. FIG. 28B is a diagram showing a non-limiting example of the bow object 91 as viewed from directly behind (from the first virtual camera A). As shown in FIG. 28A, the CPU 10 rotates the bow object 91 about the y-axis (the axis directed vertically upward from the ground) in the game space (the xyz coordinate system) such that the bow object 91 is perpendicular to the arrow object 92. Further, as shown in FIG. 28B, the CPU 10 rotates the bow object 91 in accordance with the angle of rotation of the terminal device 7 about the Z-axis. FIG. 28B shows the attitude of the bow object 91 when the terminal device 7 has been rotated counterclockwise about the Z-axis by 90 degrees from the reference attitude shown in FIG. 14. As described above, the attitude of the bow object 91 is set such that the leftward-rightward tilt of the bow object 91 displayed on the television 2 coincides with the tilt of the terminal device 7 relative to the X-axis. The CPU 10 stores, as the bow data 134 in the main memory, the attitude of the bow object 91 calculated in accordance with the attitude of the arrow object 92 and the rotation of the terminal device 7 about the Z-axis. Further, on the basis of the touch position data 122, the CPU 10 determines the distance at which the bow object 91 is to be drawn. Consequently, display is performed on the LCD 51 such that the string of the bow object 91 extends in the sliding direction in accordance with the distance of the slide operation performed on the touch panel 52. After the process of step S44, the CPU 10 ends the bow and arrow setting process shown in FIG. 25.

Referring back to FIG. 22, after the process of step S15, the CPU 10 next performs the process of step S16.

Figure 26:
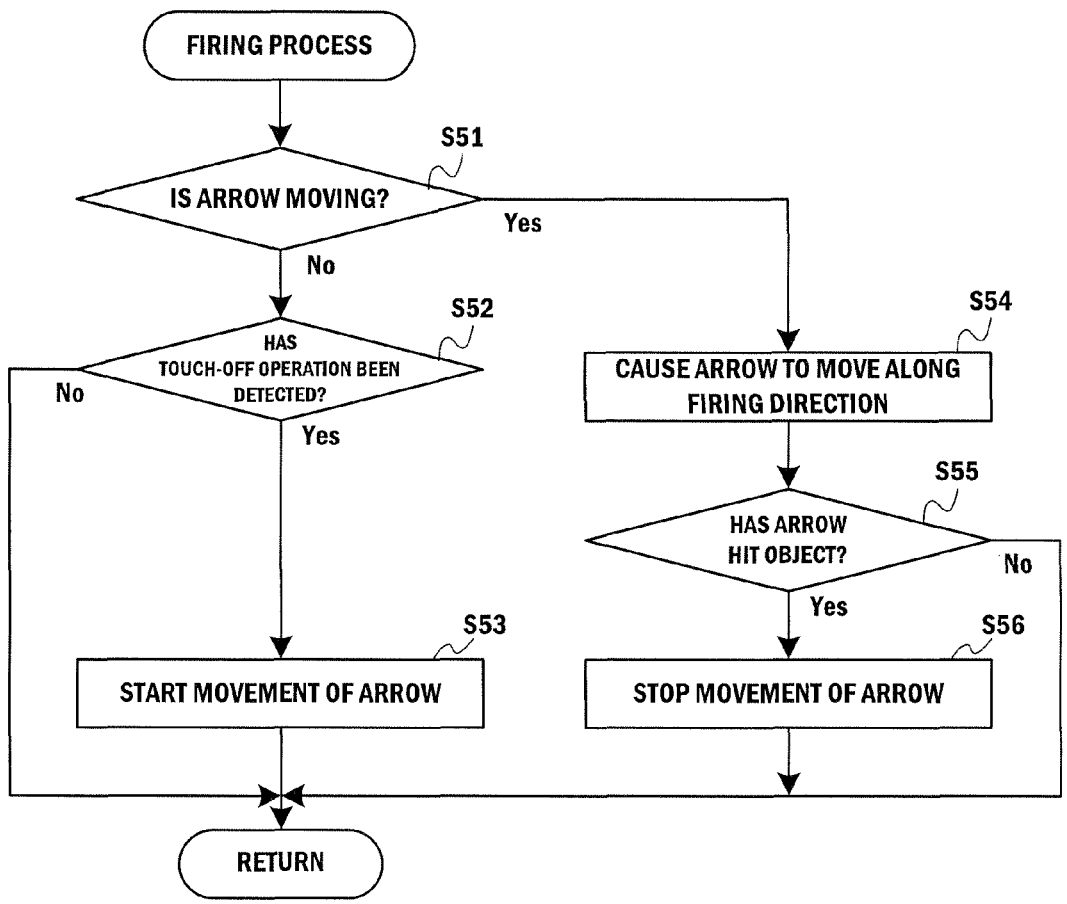
FIG. 26 is a flow chart showing non-limiting exemplary detailed steps of a firing process (step S16) shown in FIG. 22.

In step S16, the CPU 10 performs a firing process. The firing process in step S16 is a process of firing the arrow object 92 into the game space, and moving the already fired arrow object 92. With reference to FIG. 26, details of the firing process are described below.

FIG. 26 is a flow chart showing non-limiting exemplary detailed steps of the firing process (step S16) shown in FIG. 22.

In step S51, the CPU 10 determines whether or not the arrow object 92 is moving in the game space. Specifically, with reference to the arrow data 135, the CPU 10 determines whether or not the arrow object 92 is moving. When the determination result is negative, the CPU 10 next performs the process of step S52. On the other hand, when the determination result is positive, the CPU 10 next performs the process of step S54.

In step S52, the CPU 10 determines whether or not the touch-off operation has been detected. Specifically, with reference to the touch position data 122, the CPU 10 determines that the touch-off operation has been detected, when the touch position has been detected in the previous processing loop and the touch position has not been detected in the current processing loop. When the determination result is positive, the CPU 10 next performs the process of step S53. On the other hand, when the determination result is negative, the CPU 10 ends the firing process shown in FIG. 26.

In step S53, the CPU 10 starts the movement of the arrow object 92. Specifically, the CPU 10 updates the arrow data 135 by setting a value indicating that the arrow object 92 is moving. It should be noted that even in the case where the CPU 10 has determined in step S52 that the touch-off operation has been detected, if the distance of the slide operation (the distance between the touch-on position and the touch-off position) is less than a predetermined threshold, the CPU 10 may not need to start the movement of the arrow object 92. After the process of step S53, the CPU 10 ends the firing process shown in FIG. 26.

On the other hand, in step S54, the CPU 10 causes the arrow object 92 to move along the firing direction of the arrow object 92. Specifically, the CPU 10 adds, to the current position of the arrow object 92, a movement vector having a predetermined length (the length of the vector represents the speed of the arrow object 92) in the same direction as the firing direction of the arrow object 92, and thereby causes the arrow object 92 to move. It should be noted that the speed of the arrow object 92 may be set to a predetermined value, or may be defined in accordance with the distance of the slide operation performed when the arrow object 92 has been fired. Alternatively, the movement of the arrow object 92 may be controlled, taking into account the effects of the force of gravity and wind. Specifically, the effect of the force of gravity causes the arrow object 92 to move further in the y-axis negative direction, and the effect of wind causes the arrow object 92 to move in the direction in which the wind blows. The CPU 10 next performs the process of step S55.

In step S55, the CPU 10 determines whether or not the arrow object 92 has hit an object in the game space. When the determination result is positive, the CPU 10 next performs the process of step S56. On the other hand, when the determination result is negative, the CPU 10 ends the firing process shown in FIG. 26.

In step S56, the CPU 10 stops the movement of the arrow object 92. Further, the CPU 10 performs a process corresponding to the stopping position of the arrow object 92. For example, when the arrow object 92 has hit the enemy character 99, the CPU 10 reduces the parameter indicating the life force of the enemy character 99. Furthermore, the CPU 10 updates the arrow data 135 (generates a new arrow object 92) by setting a value indicating that the arrow object 92 has yet to move. After the process of step S56, the CPU 10 ends the firing process shown in FIG. 26.

Referring back to FIG. 22, after the process of step S16, the CPU 10 next performs the process of step S17.

In step S17, the CPU 10 controls the sword objects 96 in accordance with the attitudes of the respective main controllers 8. Specifically, first, with reference to controller operation data 110, the CPU 10 calculates the attitudes of the main controller 8*a* and the main controller 8*b*. The attitude of each main controller 8 can be obtained by integrating the angular velocities with respect to time as described above. Next, the CPU 10 sets the attitude of the sword object 96*a* in accordance with the attitude of the main controller 8*a*, and sets the attitude of the sword object 96*b* in accordance with the attitude of the main controller 8*b*. Then, the CPU 10 controls the actions of the second characters in accordance with the positions and the attitudes of the respective sword objects 96. Consequently, for example, when the main controller 8*a* is directed upward, display is performed on the television 2 such that the second character 98*a* raises the sword object 96*a* so as to direct the sword object 96*a* upward in the game space. In this case, the position of the sword object 96*a* is adjusted such that the second character 98*a* holds the sword object 96*a* by hand. Further, the CPU 10 determines whether or not the sword object 96*a* has hit another object, and performs a process corresponding to the determination result. For example, when the sword object 96*a* has hit the enemy character 99, the CPU 10 reduces the parameter indicating the life force of the enemy character 99. The CPU 10 next performs the process of step S18.

In step S18, the CPU 10 performs a setting process for the first virtual camera B, the first virtual camera C, and the second virtual camera. Specifically, the CPU 10 sets the position and the attitude of the first virtual camera B in accordance with the position and the attitude of the second character 98*a*, and sets the position and the attitude of the first virtual camera C in accordance with the position and the attitude of the second character 98*b*. Further, the CPU 10 sets the position and the attitude of the second virtual camera in accordance with the position and the attitude of the bow object 91. The second virtual camera and the bow object 91 have a predetermined positional relationship. That is, the second virtual camera is fixed to the bow object 91, and therefore, the position of the second virtual camera is defined in accordance with the position of the bow object 91, and the attitude of the second virtual camera is also defined in accordance with the attitude of the bow object 91. After the process of step S18, the CPU 10 ends the game control process shown in FIG. 22.

Referring back to FIG. 21, after the game control process in step S3, the CPU 10 next performs the process of step S4.

In step S4, the CPU 10 performs a generation process for the television game image. In step S4, the image 90a, the image 90b, and the image 90c to be displayed on the television 2 are generated. Specifically, the CPU 10 acquires an image by capturing the game space with the first virtual camera A. Then, with reference to the aim data 133, the CPU 10 superimposes an image of the aim 95 on the generated image, and thereby generates the image 90a to be displayed in the upper left area of the television 2. That is, when the display of the aim 95 is set to on, the CPU 10 superimposes, on the image acquired by capturing the game space with the first virtual camera A, a circular image which is indicated by the aim data 133 and whose center is at the coordinates (s, t). Consequently, the image 90a is generated that includes the first character 97, the bow object 91, the aim 95, and the like. It should be noted that when the display of the aim 95 is set to off, the aim 95 is not displayed. Further, the CPU 10 generates the image 90b by capturing the game space with the first virtual camera B, and generates the image 90c by capturing the game space with the first virtual camera C. Then, the CPU 10 generates one television game image including the three generated images 90a through 90c. The image 90a is located in the upper left area of the television game image; the image 90b is located in the upper right area; and the image 90c is located in the lower left area. The CPU 10 next performs the process of step S5.

In step S5, the CPU 10 performs a generation process for the terminal game image. Specifically, the CPU 10 generates the terminal game image by capturing the game space with the second virtual camera. The CPU 10 next performs the process of step S6.

In step S6, the CPU 10 outputs the television game image generated in step S4 to the television 2. Consequently, the image as shown in FIG. 12 is displayed on the television 2. Further, in step S6, audio data is output together with the television game image to the television 2, and a game sound is output from the loudspeaker 2a of the television 2. The CPU 10 next performs the process of step S7.

In step S7, the CPU 10 transmits the terminal game image to the terminal device 7. Specifically, the CPU 10 sends the terminal game image generated in step S5 to the codec LSI 27, and the codec LSI 27 performs a predetermined compression process on the terminal game image. Data of the image subjected to the compression process is transmitted from the terminal communication module 28 to the terminal device 7 through the antenna 29. The terminal device 7 receives, by the wireless module 70, the data of the image transmitted from the game apparatus 3. The codec LSI 66 performs a predetermined decompression process on the received image data. The image data subjected to the decompression process is output to the LCD 51. Consequently, the terminal game image is displayed on the LCD 51. Further, in step S7, audio data may be transmitted together with the terminal game image to the terminal device 7, and a game sound may be output from the loudspeakers 67 of the terminal device 7. The CPU 10 next performs the process of step S8.

In step S8, the CPU 10 determines whether or not the game is to be ended. The determination of step S8 is made on the basis of, for example, whether or not the game is over, or whether or not the user has given an instruction to cancel the game. When the determination result of the step S8 is negative, the process of step S2 is performed again. On the other hand, when the determination result of step S8 is positive, the CPU 10 ends the game processing shown in FIG. 21.

As described above, the first player can control the firing direction of the arrow object 92 by changing the attitude of the terminal device 7. Further, the first player can change the attitude of the first virtual camera A to change the display of the game space by changing the attitude of the terminal device 7. More specifically, the attitude of the first virtual camera A is changed such that the amount of change in the attitude of the first virtual camera A is greater than the amount of change in the attitude of the terminal device 7. This allows the first player to change the attitude of the terminal device 7 in the range where the screen of the television 2 can be viewed, and thereby cause a wider range of the game space to be displayed on the television 2.

In addition, the aim 95 is displayed on the television 2, and the position of the aim 95 changes in accordance with the attitude of the terminal device 7. The aim 95 is not always displayed at the center of the screen (the image 90a), and the position of the aim 95 to be displayed is determined in accordance with the attitude of the terminal device 7. Specifically, the aim 95 is moved such that the amount of movement of the aim 95 is greater than the amount of change in the attitude of the terminal device 7. For example, when the first player has directed the terminal device 7 to the right of the screen, the aim 95 moves to the right end of the screen. This makes it possible to prevent the first player from rotating the terminal device 7 out of range.

In addition, on the television 2, images are displayed in each of which the game space is viewed from the viewpoint of the character operated by the corresponding player. Also on the terminal device 7, an image of the game space including the bow object 91 is displayed. Specifically, the first virtual camera A is set behind the first character 97 operated on the basis of the operation data from the terminal device 7. Accordingly, on the television 2, an image is displayed that is obtained by capturing the game space with the first virtual camera A. Further, the first virtual cameras B and C are set behind the second characters 98a and 98b operated on the basis of the operation data from the main controllers 8a and 8b, respectively. Accordingly, on the television 2, images are displayed that are obtained by capturing the game space with the first virtual cameras B and C. Furthermore, on the terminal device 7, an image is displayed that is obtained by capturing the game space with the second virtual camera fixed to the bow object 91. As described above, in the game according to the present embodiment, images in which the game space is viewed from various viewpoints can be displayed on the television 2 and the display device of the terminal device 7 different from the television 2.

[7. Variations]

It should be noted that the above embodiment is an example of carrying out the exemplary embodiments. In another embodiment, the exemplary embodiments can also be carried out, for example, with the configurations described below.

For example, in the present embodiment, the case is described where arrow objects 92 are fired into the game space one by one (i.e., after an arrow object 92 has been fired, another arrow object 92 is not fired before the fired arrow object 92 stops). Alternatively, in another embodiment, arrow objects 92 may be continuously fired (i.e., after an arrow object 92 has been fired, another arrow object 92 may be fired before the arrow object 92 stops). Yet alternatively, a plurality of arrow objects 92 may be simultaneously fired. For example, an object may be locked on by performing a predetermined operation (e.g., pressing a predetermined button of the terminal device 7) while taking the aim 95 at the object, and another object may be locked on by performing a similar operation while taking the aim 95 at said another object. Then, a plurality of arrow objects 92 may be simultaneously fired at the plurality of objects that are locked on.

In addition, in the present embodiment, the arrow object is moved in accordance with the operation performed on the terminal device 7. Alternatively, in another embodiment, a physical body to be moved may be any physical body, such as a spherical object, e.g., a ball, a bullet, a shell, a spear, or a boomerang.

In addition, in the present embodiment, on the basis of the attitude of the terminal device 7, the firing direction (moving direction) of the arrow is set, and also the capturing direction of the first virtual camera A is set. In another embodiment, on the basis of the attitude of the terminal device 7, another control direction may be set, and the game processing may be performed on the basis of said another control direction. For example, the control direction may be the moving direction of an object as described above, the capturing direction of a virtual camera, the direction of the line of sight of a character, or the direction in which the movement of a moving object is changed (e.g., the direction in which a thrown ball curves).

In addition, in the present embodiment, images different from one another are displayed in the areas obtained by dividing the screen of the television 2 into four equal parts. In another embodiment, any number of divisions of the screen and any sizes of division areas may be used. For example, the screen of a display device may be divided into two equal parts, or may be divided into a plurality of areas of different sizes. Then, images different from one another (images in each of which the game space is viewed from the corresponding character) may be displayed in the plurality of areas. For example, the game may be performed by two players, namely a player who operates the terminal device 7 and a player who operates the controller 5. In this case, the screen of the television 2 may be divided into two equal parts. Alternatively, a plurality of display devices may be prepared, and the game apparatus 3 may be connected to the plurality of display devices, such that images different from one another may be displayed on the display devices.

In addition, in the present embodiment, the case is described where one player operates a terminal device 7, and up to three players operate main controllers 8, whereby up to four players perform the game. In another embodiment, the game may be performed such that a plurality of players may operate terminal devices 7, and a plurality of players may operate main controllers 8.

In addition, in the present embodiment, the game apparatus 3 generates the terminal game image, and transmits the generated image to the terminal device 7 by wireless communication, whereby the terminal game image is displayed on the terminal device 7. In another embodiment, the terminal device 7 may generate the terminal game image, and the generated image may be displayed on the display section of the terminal device 7. In this case, to the terminal device 7, information about the characters and the virtual cameras in the game space (information about the positions and the attitudes of the characters and the virtual cameras) is transmitted from the game apparatus 3, and the game image is generated in the terminal device 7 on the basis of the information.

In addition, in the present embodiment, on the LCD 51 of the terminal device 7, an image is displayed that is acquired in a dynamic manner by capturing the bow object 91 with the second virtual camera fixed to the bow object 91. In another embodiment, on the LCD 51 of the terminal device 7, a static image of the bow object 91 (an image stored in advance in the game apparatus 3) or another static image may be displayed. For example, the action of the bow object 91 is determined in accordance with the operation performed on the terminal device 7, and one image is selected in accordance with the determined action from among a plurality of images stored in advance, whereby an image of the bow object 91 is acquired. Then, the image of the bow object 91 is displayed on the LCD 51 of the terminal device 7.

In addition, in the present embodiment, when the touch-off operation (the cessation of the touch operation) has been performed on the touch panel 52 of the terminal device 7, the arrow object 92 is fired into the game space. In another embodiment, when the touch-on operation has been performed on the touch panel 52 of the terminal device 7, the arrow object 92 may be fired. Alternatively, when a predetermined touch operation has been performed on the touch panel 52, the arrow object 92 may be fired. The predetermined touch operation may be an operation of drawing a predetermined pattern.

In addition, in the present embodiment, when the slide operation has been performed on the touch panel 52 of the terminal device 7, the zoom setting of the first virtual camera A is performed (specifically, zooming in is performed while the position of the first virtual camera A is maintained). In another embodiment, when a predetermined touch operation has been performed on the touch panel 52 of the terminal device 7, the zoom setting (zooming in or zoom out) of the first virtual camera A may be performed. For example, the zoom setting may change in accordance with the touch position. Specifically, a position closer to the television 2, other than a position further from the television 2, has been touched, zooming in may be performed on the game space.

In addition, in another embodiment, the game space may be displayed on the television 2 in an enlarged manner by moving the first virtual camera A in the capturing direction. The longer the distance of the slide operation, the more enlarged (or more reduced) the game space can be in the image generated by moving the first virtual camera A in the capturing direction (or in the direction opposite to the capturing direction). That is, the setting of the first virtual camera A may be changed (the first virtual camera A may be moved in the capturing direction, or the range of the field of view of the first virtual camera A may be adjusted) in accordance with the slide operation performed on the touch panel 52 or the touch operation performed on a predetermined position, whereby zooming in (display in an enlarged manner) or zooming out (display in a reduced manner) is performed on the game space.

In addition, in another embodiment, the terminal device 7 may include, instead of the touch panel 52 provided on the screen of the LCD 51, a touch pad located at a position different from that of the screen of the LCD 51.

In addition, in another embodiment, a process performed in accordance with the operation performed on the terminal device 7 may be performed in accordance with the operation performed on the controller 5 (the main controller 8). That is, the controller 5 may be used instead of the terminal device 7 described above, and game processing corresponding to the attitude of the terminal device 7 described above (the process of determining the moving direction of the arrow, the process of determining the attitudes of the virtual cameras, and the process of determining the position of the aim) may be performed in accordance with the attitude of the controller 5.

In addition, in the present embodiment, the attitude of the terminal device 7 is calculated on the basis of the angular velocities detected by an angular velocity sensor, and the attitude of the terminal device 7 is corrected on the basis of the accelerations detected by an acceleration sensor. That is, the attitude of the terminal device 7 is calculated using both the physical amounts detected by the two inertial sensors (the acceleration sensor and the angular velocity sensor). In another embodiment, the attitude of the terminal device 7 may be calculated on the basis of the orientation detected by a magnetic sensor (the bearing indicated by the geomagnetism detected by the magnetic sensor). The magnetic sensor can detect the direction in which the terminal device 7 is directed (a direction parallel to the ground). In this case, the further use of an acceleration sensor makes it possible to detect the tilt relative to the direction of gravity, and therefore calculate the attitude of the terminal device 7 in a three-dimensional space.

In addition, in another embodiment, the terminal device 7 may capture the markers of the marker device 6, whereby the attitude of the terminal device 7 relative to the television 2 is calculated. In this case, for example, image data is generated by receiving the infrared light from the markers 6R and 6L of the marker device 6, with the camera 56 of the terminal device 7 or a capturing section different from the camera 56. Then, on the basis of the positions of the markers included in the image, it is possible to detect whether the terminal device 7 is directed in the direction of the television 2, or detect the degree of the tilt of the terminal device 7 relative to the horizontal direction. Further, in another embodiment, a camera that acquires an image by receiving the infrared light from the marker section 55 of the terminal device 7, or a camera that acquires an image of the terminal device 7 per se, may be located at a predetermined position in real space. Then, the attitude of the terminal device 7 may be detected on the basis of the image from the camera. For example, a camera may be located above the television 2, and the game apparatus 3 may detect, by pattern matching or the like, the terminal device 7 included in the image captured by the camera. This enables the game apparatus 3 to calculate the attitude of the terminal device 7 in real space.

In addition, in the present embodiment, the game processing is performed on the basis of the angles of rotation of the terminal device 7 about three axes, namely the X, Y, and Z axes. In another embodiment, the game processing may be performed on the basis of the angle of rotation about one axis, or the angles of rotation about two axes.

In addition, in another embodiment, the attitude of the terminal device 7 may be calculated on the basis of the physical amounts detected in the terminal device 7 by the gyro sensor 64 and the like, and data concerning the attitude may be transmitted to the game apparatus 3. Then, the game apparatus 3 may receive the data from the terminal device 7, and acquire the attitude of the terminal device 7. Thus, the game apparatus 3 may determine the position of the aim, the firing direction of the arrow, and the like as described above on the basis of the attitude of the terminal device 7. That is, the game apparatus 3 may calculate the attitude of the terminal device 7 on the basis of the data corresponding to the physical amounts detected by the gyro sensor 64 and the like from the terminal device 7, and thereby acquire the attitude of the terminal device 7. Alternatively, the game apparatus 3 may acquire the attitude of the terminal device 7 on the basis of the data concerning the attitude calculated in the terminal device 7.

In addition, in another embodiment, the terminal device 7 may perform some of the game processing performed by the game apparatus 3. For example, the terminal device 7 may determine the positions, the attitudes, and the actions of the objects in the game space that are operated by the terminal device 7, and the determined information may be transmitted to the game apparatus 3. The game apparatus 3 may perform another type of game processing on the basis of the received information.

In addition, in another embodiment, in a game system having a plurality of information processing apparatuses capable of communicating with one another, the plurality of information processing apparatuses may perform, in a shared manner, the game processing performed by the game apparatus 3 as described above. For example, the game system as described above may include a plurality of information processing apparatuses connected to a network such as the Internet. In this case, for example, the player performs a game operation on an operation device including an inertial sensor (an acceleration sensor or an angular velocity sensor) that can be connected to the network and detect an attitude, or a sensor that detects a direction, such as a magnetic sensor. Operation information corresponding to the game operation is transmitted to another information processing apparatus through the network. Then, said another information processing apparatus performs game processing on the basis of the received operation information, and transmits the results of the game processing to the operation device.

In addition, in another embodiment, the game apparatus 3 may be connected to the main controllers 8 (the controllers 5) and the terminal device 7 in a wired manner, instead of a wireless manner, whereby data is transmitted and received.

The programs described above may be executed by an information processing apparatus, other than the game apparatus 3, that is used to perform various types of information processing, such as a personal computer.

In addition, the game program may be stored not only in an optical disk but also in a storage medium such as a magnetic disk or a nonvolatile memory, or may be stored in a RAM on a server connected to a network or in a computer-readable storage medium such as a magnetic disk, whereby the program is provided through the network. Further, the game program may be loaded into an information processing apparatus as source code, and may be compiled and executed when a program is executed.

In addition, in the above embodiment, the processes in the flow charts described above are performed as a result of the CPU 10 of the game apparatus 3 executing the game program. In another embodiment, some or all of the processes described above may be performed by a dedicated circuit included in the game apparatus 3, or may be performed by a general-purpose processor other than the CPU 10. At least one processor may operate as a "programmed logic circuit" for performing the processes described above.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above. The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art. Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game system including a game apparatus and an operation device having an input surface,
the operation device comprising:
attitude data acquirer which outputs attitude data that changes in accordance with a change in an attitude of the operation device;
touch position determiner that outputs touch data representing a surface position at which a player performs a touch operation on the input surface of the operation device; and
operation data transmitter that transmits the touch data and the attitude data to the game apparatus, and
the game apparatus comprising:
a processing system, including at least one compute processor, the processing system being configured to:
receive transmitted touch data and the attitude data;
calculate the attitude of the operation device on the basis of the attitude data;
calculate a control direction in a virtual game space on the basis of the attitude of the operation device, and perform, on the basis of the touch data, game processing based on the control direction;
generate a first game image by capturing an image of the virtual game space by using a first virtual camera set in the virtual game space; and
output the first game image to a first display device different from the operation device.

2. The game system according to claim 1, wherein
the game apparatus processing system is further configured to set a moving direction of a predetermined object in the virtual game space on the basis of the control direction.

3. The game system according to claim 2, wherein
the game apparatus processing system is further configured to cause the predetermined object to move on the basis of the touch data.

4. The game system according to claim 3, wherein
the game apparatus processing system is further configured to determine, on the basis of the touch data, whether a touch operation on the input surface has ceased, and to cause the predetermined object to move in response to cessation of the touch operation.

5. The game system according to claim 2, wherein
the game apparatus processing system is further configured to control an attitude of the predetermined object in accordance with the attitude of the operation device.

6. The game system according to claim 1, wherein
the game apparatus processing system is further configured to set an attitude of the first virtual camera on the basis of the attitude of the operation device.

7. The game system according to claim 6, wherein
the game apparatus processing system is further configured to perform zooming in or zooming out on an image of the virtual game space obtained by the first virtual camera by changing a setting of the first virtual camera on the basis of the touch data.

8. The game system according to claim 7, wherein
the game apparatus processing system is further configured to determine, on the basis of the touch data, whether a slide operation is performed on the input surface, and, when the slide touch operation is performed, changes the setting of the first virtual camera.

9. The game system according to claim 6, wherein
the game apparatus processing system is further configured to set the attitude of the first virtual camera such that an amount of change in the attitude of the first virtual camera is greater than an amount of change in the attitude of the operation device.

10. The game system according to claim 2, wherein
the game apparatus processing system is further configured to set a position of an aim object in the first game image on the basis of the attitude of the operation device, and to control the moving direction of the predetermined object on the basis of the position of the aim object.

11. The game system according to claim 10, wherein
the game apparatus processing system is further configured to set the position of the aim object in a predetermined range in accordance with the attitude of the operation device, and, when the position of the aim object is out of the predetermined range, sets the position of the aim object at a boundary of the predetermined range.

12. The game system according to claim 10, wherein
the game apparatus processing system is further configured to:
define the attitude of the operation device as a reference attitude when a predetermined portion of the operation device is directed to a screen of the first display device; and
when the operation device is in the reference attitude, set the position of the aim object to a predetermined position in the first game image; and,
when the operation device is in an attitude different from the reference attitude, set the position of the aim object to a position shifted from the predetermined position in the first game image, in accordance with an amount of change in the attitude of the operation device from the reference attitude.

13. The game system according to claim 6, wherein
the game apparatus processing system is further configured to set a position of an aim object in the first game image on the basis of the attitude of the operation device, and to set a capturing direction of the first virtual camera on the basis of the position of the aim object.

14. The game system according to claim 13, wherein
the game apparatus processing system is further configured to set, as a capturing direction of the first virtual camera, a direction from a position of the first virtual camera to a position located in the virtual game space or a direction to a position corresponding to the position of the aim object.

15. The game system according to claim 1, wherein
the game apparatus
processing system is further configured to output to the operation device a second game image different from the first game image, and
the operation device further comprises:
a receiver for receiving the second game image from the game apparatus; and
a processing system, including at least one computer processor, configured to cause the second game image to be displayed on a second display device provided in the operation device.

16. The game system according to claim 15, wherein
the game apparatus
processing system is further configured to generate the second game image by capturing an image of the virtual game space with a second virtual camera set in the virtual game space.

17. The game system according to claim 16, wherein
the game apparatus
processing system is further configured to generate an attitude of the second virtual camera in accordance with the attitude of the operation device.

18. The game system according to claim 15, wherein
the touch position determiner is a touch panel provided on a screen of the second display device.

19. The game system according to claim 1, wherein
the attitude data acquirer is an inertial sensor.

20. A game apparatus capable of communicating with an operation device, the game apparatus comprising:
a processing system, including at least one computer processor, the processing system being configured to:
receive, from the operation device, transmitted attitude data that changes in accordance with a change in an attitude of the operation device, and touch data representing a surface position at which a player performs a touch operation on an input surface of the operation device;
calculate the attitude of the operation device on the basis of the attitude data;
calculate a control direction in a virtual game space on the basis of the attitude of the operation device, and perform, on the basis of the touch data, game processing based on the control direction;
generate a first game image by capturing an image of the virtual game space by using a first virtual camera set in the virtual game space; and
output the first game image to a first display device different from the operation device.

21. A non-transitory computer-readable storage medium having stored therein a game program to be executed by a computer of a game apparatus capable of communicating with an operation device, the game program causing the computer to function and perform operations as:
a transmitted data receiver which receives, from the operation device, attitude data that changes in accordance with a change in an attitude of the operation device and touch data representing a surface position at which a player performs a touch operation on an input surface of the operation device;
an attitude determiner which calculates the attitude of the operation device on the basis of the attitude data;
a game process control which calculates a control direction in a virtual game space on the basis of the attitude of the operation device, and performs, on the basis of the touch data, game processing based on the control direction;
a game image generator which generates a first game image by capturing an image of the virtual game space by using a first virtual camera set in the virtual game space; and
a game image outputter which outputs the first game image to a first display device different from the operation device.

22. A game processing method performed in a game system including a game apparatus having at least one computer processor and an operation device having an input surface,
the operation device performing:
outputting attitude data that changes in accordance with a change in an attitude of the operation device;
outputting touch data representing a surface position at which a player performs a touch operation on the input surface; and
transmitting the touch data and the attitude data to the game apparatus, and
the game apparatus performing:
receiving the touch data and the attitude data;
determining an attitude of the operation device on the basis of the attitude data;
calculating, using said at least one computer processor, a control direction in a virtual game space on the basis of the attitude of the operation device, and performing, on the basis of the touch data, one or more game processes based on the control direction;
generating a first game image by capturing an image of the viral game space with a first virtual camera set in the game space; and
outputting the first game image to a first display device different from the operation device.

23. The game processing method according to claim 22, wherein
the game apparatus is further configured to set a moving direction of a predetermined object in the virtual game space on the basis of the control direction.

24. The game processing method according to claim 23, wherein
the predetermined object is caused to move on the basis of the touch data.

25. The game processing method according to claim 24, wherein
the game apparatus is further configured to determine, on the basis of the touch data, whether a touch operation on the input surface has ceased, and to cause the predetermined object to move in response to a cessation of the touch operation.

26. The game processing method according to claim 23, wherein
an attitude of the predetermined object is controlled in accordance with the attitude of the operation device.

27. The game processing method according to claim 22, wherein
the game apparatus is further configured to set an attitude of the first virtual camera on the basis of the attitude of the operation device.

28. The game processing method according to claim 27, wherein
zooming in or zooming out is performed on an image of the virtual game space obtained by the first virtual camera by changing a zoom setting of the first virtual camera on the basis of the touch data.

29. The game processing method according to claim 28, wherein
the game apparatus is further configured to determine, on the basis of the touch data, whether a slide touch operation is performed on the input surface, and when the slide touch operation is performed, the setting of the first virtual camera is changed.

30. The game processing method according to claim 27, wherein
the attitude of the first virtual camera is set such that an amount of change in the attitude of the first virtual camera is greater than an amount of change in the attitude of the operation device.

31. The game processing method according to claim 23, wherein
the game apparatus is further configured to set a position of an aim object in the first game image on the basis of the attitude of the operation device, and
control the moving direction of the predetermined object on the basis of the position of the aim object.

32. The game processing method according to claim 31, wherein
the position of the aim object is set in a predetermined range in accordance with the attitude of the operation device, and when the position of the aim object is out of the predetermined range, the position of the aim object is set at a boundary of the predetermined range.

33. The game processing method according to claim 31, wherein
the attitude of the operation device is defined as a reference attitude when a predetermined portion of the operation device is directed to a screen of the first display device; and
when the operation device is in the reference attitude, the position of the aim object is set to a center of the first game image; and
when the operation device is in an attitude different from the reference attitude, the position of the aim object is set to a position shifted from the center of the first game image, in accordance with an amount of change in the attitude of the operation device from the reference attitude.

34. The game processing method according to claim 27, wherein
the game apparatus is further configured to set a position of an aim object in the first game image on the basis of the attitude of the operation device, and
to set a capturing direction of the first virtual camera is set on the basis of the position of the aim object.

35. The game processing method according to claim 34, wherein
a direction from a position of the first virtual camera to a position located in the virtual game space, or a direction to a position corresponding to the position of the aim object, is set as a capturing direction of the first virtual camera.

36. The game processing method according to claim 22, wherein
the game apparatus
is further configured output to the operation device a second game image different from the first game image, and
the operation device further performs:
receiving the second game image from the game apparatus; and
causing the second game image to be displayed on a second display device provided in the operation device.

37. The game processing method according to claim 36, wherein
the game apparatus
is further configured to generate the second game image by capturing an image of the virtual game space with a second virtual camera set in the game space.

38. The game processing method according to claim 37, wherein
the game apparatus
is further configured to set an attitude of the second virtual camera in accordance with the attitude of the operation device.

39. The game processing method according to claim 36, wherein the touch data is output from a touch panel provided on a screen of the second display device.

40. The game processing method according to claim 22, wherein the attitude data is output from an inertial sensor provided in the operation device.

* * * * *